(12) United States Patent
Imaoka et al.

(10) Patent No.: US 11,513,325 B2
(45) Date of Patent: Nov. 29, 2022

(54) PROJECTION LENS SYSTEM AND IMAGE PROJECTION DEVICE

(71) Applicant: Panasonic Intellectual Property Management Co., Ltd., Osaka (JP)

(72) Inventors: Takuya Imaoka, Kanagawa (JP); Hideo Onishi, Osaka (JP); Kenji Ikeo, Osaka (JP); Katsu Yamada, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 204 days.

(21) Appl. No.: 16/905,745

(22) Filed: Jun. 18, 2020

(65) Prior Publication Data

US 2020/0319434 A1 Oct. 8, 2020

Related U.S. Application Data

(63) Continuation of application No. PCT/JP2018/044810, filed on Dec. 6, 2018.

(30) Foreign Application Priority Data

Dec. 19, 2017 (JP) .................................. 2017-243055

(51) Int. Cl.
*G02B 13/00* (2006.01)
*G02B 13/16* (2006.01)
(Continued)

(52) U.S. Cl.
CPC ......... *G02B 13/16* (2013.01); *G02B 13/0095* (2013.01); *G02B 13/22* (2013.01); *G02B 15/143507* (2019.08); *G02B 15/15* (2013.01)

(58) Field of Classification Search
CPC ........ G02B 13/15; G02B 13/16; G02B 13/22; G02B 15/143507
(Continued)

(56) References Cited

U.S. PATENT DOCUMENTS 9,835,835 B1 12/2017 Hudyma et al.
10,620,411 B2 * 4/2020 Imaoka .................. G02B 13/18
(Continued)

FOREIGN PATENT DOCUMENTS

JP 2006-330241 A 12/2006
JP 2010-091751 A 4/2010
(Continued)

*Primary Examiner* — Thong Q Nguyen
(74) *Attorney, Agent, or Firm* — McDermott Will & Emery LLP

(57) ABSTRACT

A projection lens system that projects an image of a reduction side into a magnification side includes a diaphragm, a plurality of positive lenses, and a plurality of negative lenses. The plurality of positive lenses include a first positive lens closer to the magnification side than the diaphragm is and closest to the diaphragm, a second positive lens second closest to the diaphragm after the first positive lens on the magnification side, a third positive lens closer to the reduction side than the diaphragm is and closest to the diaphragm. The plurality of negative lenses include a first negative lens closer to the magnification side than the diaphragm is and closest to the diaphragm, and a second negative lens closer to the reduction side than the diaphragm is and closest to the diaphragm. The lenses have transmittances larger than threshold values, respectively.

11 Claims, 31 Drawing Sheets

(51) Int. Cl.
  *G02B 15/14* (2006.01)
  *G02B 13/22* (2006.01)
  *G02B 15/15* (2006.01)

(58) Field of Classification Search
  USPC ......... 359/362, 676–692, 745–795, 434–435
  See application file for complete search history.

(56) References Cited

U.S. PATENT DOCUMENTS

| | | |
|---|---|---|
| 2010/0085550 A1 | 4/2010 | Aoki |
| 2011/0032606 A1 | 2/2011 | Imaoka |
| 2015/0226946 A1 | 8/2015 | Miyazaki |
| 2015/0268453 A1* | 9/2015 | Oe .................... H04N 5/23212 359/434 |
| 2017/0351050 A1 | 12/2017 | Sugita et al. |
| 2017/0357147 A1 | 12/2017 | Takehana et al. |
| 2019/0025561 A1 | 1/2019 | Imaoka |
| 2019/0129285 A1 | 5/2019 | Masui et al. |

FOREIGN PATENT DOCUMENTS

| | | |
|---|---|---|
| JP | 2010-256818 A | 11/2010 |
| JP | 2010-276860 A | 12/2010 |
| JP | 2011-053663 A | 3/2011 |
| JP | 2013-073129 A | 4/2013 |
| JP | 2014-240909 A | 12/2014 |
| JP | 2015-166851 A | 9/2015 |
| JP | 2017-037165 A | 2/2017 |
| JP | 2017-215490 A | 12/2017 |
| JP | 2017-219785 A | 12/2017 |
| WO | 2017/195561 A1 | 11/2017 |
| WO | 2017/195857 A1 | 11/2017 |

* cited by examiner

FIG. 4

| PL1 | First, second, third positive lenses and first, second negative lenses | Lens material | Power | α | T (460nm) | vd | Condition (9) | Condition (10) | dn/dt | Condition (11) | | Conditions for first, second, third positive lenses and first, second negative lenses | | | |
|---|---|---|---|---|---|---|---|---|---|---|---|---|---|---|---|
| L1 | | SNPH1W | N | 83 | 97.8% | 22.76 | / | ○ | -0.3 | / | | Condition (1) | Tp1 | L10 | 99.7% |
| L2 | | FD60W | P | 93 | 97.7% | 25.46 | ○ | / | 0.5 | / | | Condition (2) | Tp2 | L8 | 99.7% |
| L3 | | FD60W | P | 93 | 97.7% | 25.46 | ○ | / | 0.5 | / | | Condition (3) | Tp3 | L12 | 99.1% |
| L4 | | TAC8 | N | 60 | 99.7% | 54.67 | / | / | 3.4 | / | | Condition (4) | Tn1 | L9 | 99.4% |
| L5 | | FCD1 | N | 132 | 99.7% | 81.61 | / | / | -6.4 | / | | Condition (5) | Tn2 | L11 | 99.9% |
| L6 | | FCD1 | N | 132 | 99.7% | 81.61 | / | / | -6.4 | / | | Condition (6) | αn | L9 | 74 |
| L7 | | BSC7 | P | 76 | 99.9% | 64.20 | / | / | 2.7 | ○ | | Condition (7) | dn/dt | L8 | -6.4 |
| L8 | Second positive lens | FCD1 | P | 132 | 99.7% | 81.61 | / | / | -6.4 | / | | | | L10 | -6.4 |
| L9 | First negative lens | STIL27 | N | 74 | 99.4% | 41.50 | / | / | 3.3 | ○ | | Condition (8) | fp/fw | L8 | 13.23 |
| L10 | First positive lens | FCD1 | P | 132 | 99.7% | 81.61 | / | / | -6.4 | / | | | | L10 | 4.86 |
| L11 | Second negative lens | SFSL5 | N | 90 | 99.9% | 70.24 | ○ | / | -0.7 | / | | | | | |
| L12 | Third positive lens | FF5 | P | 86 | 99.1% | 35.45 | ○ | / | 0.8 | ○ | | | | | |
| L13 | | FF5 | P | 86 | 99.1% | 35.45 | / | / | 0.8 | / | | | | | |
| L14 | | FCD10A | P | 141 | 99.7% | 90.19 | / | / | -6.5 | ○ | | | | | |
| L15 | | SLAH55VS | N | 63 | 99.1% | 42.74 | / | / | 5.0 | / | | | | | |
| L16 | | FCD100 | P | 149 | 99.8% | 95.10 | / | / | -6.7 | ○ | | | | | |
| L17 | | SNBH53V | N | 71 | 99.1% | 32.33 | / | ○ | 5.1 | / | | | | | |
| L18 | | FCD10A | P | 141 | 99.7% | 90.19 | / | / | -6.5 | ○ | | | | | |
| | | | | | | Total | 4 | 2 | | 5 | | | | | |

FIG. 7

| PL2 | First, second, third positive lenses and first, second negative lenses | Lens material | Power | α | T (460nm) | vd | Condition (9) | Condition (10) | dn/dt | Condition (11) |
|---|---|---|---|---|---|---|---|---|---|---|
| L1 | | SNPH1W | N | 83 | 97.8% | 22.76 | / | | -0.3 | / |
| L2 | | FDS90SG | P | 90 | 96.6% | 23.78 | o | | 0.6 | / |
| L3 | | TAC8 | N | 60 | 99.7% | 54.67 | / | | 3.4 | / |
| L4 | | FCD705 | N | 116 | 99.3% | 75.50 | / | | -5.1 | / |
| L5 | | FCD1 | N | 132 | 99.7% | 81.61 | / | | -6.4 | / |
| L6 | Second positive lens | SFSL5 | P | 90 | 99.9% | 70.24 | / | | -0.7 | / |
| L7 | First negative lens | STIL25 | N | 74 | 99.3% | 40.75 | / | | 3.5 | / |
| L8 | First positive lens | FCD1 | P | 132 | 99.7% | 81.61 | / | | -6.4 | o |
| L9 | Second negative lens | SFSL5 | N | 90 | 99.9% | 70.24 | / | | -0.7 | / |
| L10 | Third positive lens | FF5 | P | 86 | 99.1% | 35.45 | o | | 0.8 | / |
| L11 | | FF5 | P | 86 | 99.1% | 35.45 | o | | 0.8 | o |
| L12 | | FCD10A | P | 141 | 99.7% | 90.19 | / | | -6.5 | / |
| L13 | | SLAH55VS | N | 63 | 99.1% | 42.74 | / | | 5.0 | / |
| L14 | | FCD100 | P | 149 | 99.8% | 95.10 | / | | -6.7 | o |
| L15 | | SNBH53V | N | 71 | 99.1% | 32.33 | / | o | 5.1 | / |
| L16 | | FCD10A | P | 141 | 99.7% | 90.19 | / | / | -6.5 | o |
| | | | | | | Total | 3 | 2 | | 4 |

| Conditions for first, second, third positive lenses and first, second negative lenses | | | |
|---|---|---|---|
| Condition (1) | Tp1 | L8 | 99.7% |
| Condition (2) | Tp2 | L6 | 99.9% |
| Condition (3) | Tp3 | L10 | 99.1% |
| Condition (4) | Tn1 | L7 | 99.3% |
| Condition (5) | Tn2 | L9 | 99.9% |
| Condition (6) | αn | L7 | 74 |
| Condition (7) | dn/dt | L8 | -6.4 |
| Condition (8) | fp/fw | L8 | 4.94 |

FIG. 10

| PL3 | First, second, third positive lenses and first, second negative lenses | Lens material | Power | α | T (460nm) | vd | Condition (9) | Condition (10) | dn/dt | Condition (11) | | Conditions for first, second, third positive lenses and first, second negative lenses | | |
|---|---|---|---|---|---|---|---|---|---|---|---|---|---|---|
| L1 | | FD60W | N | 93 | 97.7% | 25.46 | / | ○ | 0.5 | / | Condition (1) | Tp1 | L9 | 99.7% |
| L2 | | SNBH53V | P | 71 | 99.1% | 32.33 | ○ | / | 5.1 | / | Condition (2) | Tp2 | L7 | 99.7% |
| L3 | | SFSL5 | N | 90 | 99.9% | 70.24 | / | / | -0.7 | / | Condition (3) | Tp3 | L11 | 99.1% |
| L4 | | FCD1 | N | 132 | 99.7% | 81.61 | / | / | -6.4 | / | Condition (4) | Tn1 | L8 | 99.5% |
| L5 | | FCD1 | N | 132 | 99.7% | 81.61 | / | / | -6.4 | ○ | Condition (5) | Tn2 | L10 | 99.9% |
| L6 | | PCD51 | P | 93 | 99.7% | 67.00 | / | / | -0.7 | / | Condition (6) | αn | L8 | 79 |
| L7 | Second positive lens | FCD1 | P | 132 | 99.5% | 81.61 | / | / | -6.4 | ○ | Condition (7) | dn/dt | L7 | -6.4 |
| L8 | First negative lens | STIL26 | N | 79 | 99.9% | 42.82 | / | / | 2.8 | / | | | L9 | -6.4 |
| L9 | First positive lens | FCD1 | P | 132 | 99.7% | 81.61 | / | / | -6.4 | / | Condition (8) | fp/fw | L7 | 16.72 |
| L10 | Second negative lens | SFSL5 | N | 90 | 99.9% | 70.24 | ○ | / | -0.7 | / | | | L9 | 3.28 |
| L11 | Third positive lens | FF5 | P | 86 | 99.1% | 35.45 | ○ | / | 0.8 | / | | | | |
| L12 | | FF5 | P | 86 | 99.1% | 35.45 | / | / | 0.8 | / | | | | |
| L13 | | FCD10A | P | 141 | 99.7% | 90.19 | / | / | -6.5 | ○ | | | | |
| L14 | | SLAH55VS | N | 63 | 99.1% | 42.74 | / | / | 5.0 | / | | | | |
| L15 | | FCD100 | P | 149 | 99.8% | 95.10 | / | / | -6.7 | ○ | | | | |
| L16 | | SNBH53V | N | 71 | 99.1% | 32.33 | / | ○ | 5.1 | / | | | | |
| L17 | | FCD10A | P | 141 | 99.7% | 90.19 | / | / | -6.5 | ○ | | | | |
| | | | | | | Total | 3 | 2 | | 5 | | | | |

FIG. 14

| PL4 | First, second, third positive lenses and first, second negative lenses | Lens material | Power | α | T (460nm) | vd | Condition (9) | Condition (10) | dn/dt | Condition (11) | | Conditions for first, second, third positive lenses and first, second negative lenses | | | |
|---|---|---|---|---|---|---|---|---|---|---|---|---|---|---|---|
| L1 | | TAFD25 | N | 76 | 96.9% | 31.31 | / | ○ | 3.6 | / | Condition (1) | Tp1 | L16 | 99.1% |
| L2 | | TAF3D | N | 62 | 99.4% | 46.50 | / | / | 3.9 | / | Condition (2) | Tp2 | L14 | 99.5% |
| L3 | | PCD51 | N | 93 | 99.7% | 67.00 | / | / | -0.7 | / | Condition (3) | Tp3 | L18 | 99.7% |
| L4 | | FCD1 | P | 132 | 99.7% | 81.61 | / | / | -6.4 | ○ | Condition (4) | Tn1 | L15 | 99.8% |
| L5 | | FCD1 | P | 132 | 99.7% | 81.61 | / | / | -6.4 | ○ | Condition (5) | Tn2 | L17 | 99.1% |
| L6 | | FF5 | N | 86 | 99.1% | 35.45 | / | ○ | 0.8 | / | Condition (6) | αn | L15 | 93 |
| L7 | | FCD1 | P | 132 | 99.7% | 81.61 | / | / | -6.4 | ○ | Condition (7) | dn/dt | L18 | -6.5 |
| L8 | | FCD1 | P | 132 | 99.7% | 81.61 | / | ○ | -6.4 | ○ | | | | |
| L9 | | EFD2 | N | 88 | 98.6% | 33.84 | / | / | 1.4 | / | Condition (8) | fp/fw | L18 | -8.85 |
| L10 | | FD225 | P | 95 | 97.5% | 22.76 | ○ | / | -3.1 | / | | | | |
| L11 | | FD225 | P | 95 | 97.5% | 22.76 | ○ | / | -3.1 | / | | | | |
| L12 | | FC5 | P | 93 | 99.8% | 70.44 | / | / | -1.4 | / | | | | |
| L13 | | EFD10 | N | 90 | 97.3% | 28.32 | / | ○ | 1.3 | / | | | | |
| L14 | Second positive lens | SNBH52V | P | 77 | 99.5% | 38.26 | ○ | / | 3.8 | / | | | | |
| L15 | First negative lens | FC5 | N | 93 | 99.8% | 70.44 | / | / | -1.4 | / | | | | |
| L16 | First positive lens | FF5 | P | 86 | 99.1% | 35.45 | / | ○ | 0.8 | / | | | | |
| L17 | Second negative lens | SNBH53V | N | 71 | 99.1% | 32.33 | / | / | 5.1 | ○ | | | | |
| L18 | | FCD10A | P | 141 | 99.7% | 90.19 | / | / | -6.5 | ○ | | | | |
| L19 | | SNBH53V | N | 71 | 99.1% | 32.33 | / | / | 5.1 | / | | | | |
| L20 | | FCD10A | P | 141 | 99.7% | 90.19 | / | / | -6.5 | ○ | | | | |
| L21 | Third positive lens | SNBH53V | N | 71 | 99.1% | 32.33 | / | / | 5.1 | / | | | | |
| L22 | | TAF3D | P | 62 | 99.4% | 46.50 | / | / | 3.9 | / | | | | |
| | | | | | | Total | 4 | 7 | | 6 | | | | |

FIG. 18

| PL5 | First, second, third positive lenses and first, second negative lenses | Lens material | Power | α | T (460nm) | vd | Condition (9) | Condition (10) | dn/dt | Condition (11) | | Conditions for first, second, third positive lenses and first, second negative lenses | | |
|---|---|---|---|---|---|---|---|---|---|---|---|---|---|---|
| L1 | | TAFD25 | N | 76 | 96.9% | 31.31 | / | ○ | 3.6 | | | Condition (1) | Tp1 | L16 | 99.1% |
| L2 | | EFDS1W | N | 63 | 97.6% | 20.88 | / | ○ | 1.1 | / | | Condition (2) | Tp2 | L14 | 99.5% |
| L3 | | PCD51 | N | 93 | 99.7% | 67.00 | / | | -0.7 | / | | Condition (3) | Tp3 | L18 | 99.7% |
| L4 | | FCD1 | P | 132 | 99.7% | 81.61 | / | | -6.4 | ○ | | Condition (4) | Tn1 | L15 | 99.8% |
| L5 | | FCD1 | P | 132 | 99.7% | 81.61 | / | | -6.4 | ○ | | Condition (5) | Tn2 | L17 | 99.1% |
| L6 | | FF5 | N | 86 | 99.1% | 35.45 | / | | 0.8 | / | | Condition (6) | αn | L15 | 93 |
| L7 | | FCD1 | P | 132 | 99.7% | 81.61 | / | | -6.4 | ○ | | | | L18 | -6.5 |
| L8 | | FCD1 | P | 132 | 99.7% | 81.61 | / | | -6.4 | ○ | | Condition (7) | dn/dt | | |
| L9 | | EFD2 | N | 88 | 98.6% | 33.84 | / | ○ | 1.4 | / | | | | | |
| L10 | | FD225 | P | 95 | 97.5% | 22.76 | ○ | / | -3.1 | / | | Condition (8) | fp/fw | L18 | -8.00 |
| L11 | | FD225 | P | 95 | 97.5% | 22.76 | ○ | / | -3.1 | / | | | | | |
| L12 | | FC5 | P | 93 | 99.8% | 70.44 | / | ○ | -1.4 | / | | | | | |
| L13 | | EFD10 | N | 90 | 97.3% | 28.32 | / | ○ | 1.3 | / | | | | | |
| L14 | Second positive lens | SNBH52V | P | 77 | 99.5% | 38.26 | ○ | / | 3.8 | / | | | | | |
| L15 | First negative lens | FC5 | N | 93 | 99.8% | 70.44 | / | / | -1.4 | / | | | | | |
| L16 | First positive lens | FF5 | P | 86 | 99.1% | 35.45 | ○ | / | 0.8 | / | | | | | |
| L17 | Second negative lens | SNBH53V | N | 71 | 99.1% | 32.33 | / | ○ | 5.1 | / | | | | | |
| L18 | Third positive lens | FCD10A | P | 141 | 99.7% | 90.19 | / | / | -6.5 | ○ | | | | | |
| L19 | | SNBH53V | N | 71 | 99.1% | 32.33 | / | ○ | 5.1 | / | | | | | |
| L20 | | FCD10A | P | 141 | 99.7% | 90.19 | / | / | -6.5 | ○ | | | | | |
| L21 | | SNBH53V | N | 71 | 99.1% | 32.33 | / | ○ | 5.1 | / | | | | | |
| L22 | | TAF3D | P | 62 | 99.4% | 46.50 | / | / | 3.9 | / | | | | | |
| | | | | | | Total | 4 | 8 | | 6 | | | | | |

FIG. 22

| PL6 | First, second, third positive lenses and first, second negative lenses | Lens material | Power | α | T (460nm) | vd | Condition (9) | Condition (10) | dn/dt | Condition (11) | | Conditions for first, second, third positive lenses and first, second negative lenses | | |
|---|---|---|---|---|---|---|---|---|---|---|---|---|---|---|
| L1 | | TAFD25 | N | 76 | 96.9% | 31.31 | / | ○ | 3.6 | / | Condition (1) | Tp1 | L16 | 99.1% |
| L2 | | TAC8 | N | 60 | 99.7% | 54.67 | / | | 3.4 | / | Condition (2) | Tp2 | L14 | 99.5% |
| L3 | | BACD16 | N | 60 | 99.6% | 60.34 | / | | 2.4 | / | Condition (3) | Tp3 | L18 | 99.7% |
| L4 | | FCD1 | P | 132 | 99.7% | 81.61 | | | -6.4 | ○ | Condition (4) | Tn1 | L15 | 99.9% |
| L5 | | FCD1 | P | 132 | 99.7% | 81.61 | | | -6.4 | ○ | Condition (5) | Tn2 | L17 | 99.1% |
| L6 | | FF5 | N | 86 | 99.1% | 35.45 | / | ○ | 0.8 | / | Condition (6) | αn | L15 | 90 |
| L7 | | FCD1 | P | 132 | 99.7% | 81.61 | / | | -6.4 | ○ | | | L18 | -6.5 |
| L8 | | FCD1 | P | 132 | 99.7% | 81.61 | / | | -6.4 | ○ | Condition (7) | dn/dt | | |
| L9 | | EFD2 | N | 88 | 98.6% | 33.84 | / | ○ | 1.4 | / | | | | |
| L10 | | FD225 | P | 95 | 97.5% | 22.76 | ○ | | -3.1 | / | | | L18 | -8.97 |
| L11 | | FD225 | P | 95 | 97.5% | 22.76 | ○ | | -3.1 | / | Condition (8) | fp/fw | | |
| L12 | | FC5 | P | 93 | 99.8% | 70.44 | | ○ | -1.4 | / | | | | |
| L13 | | EFD10 | N | 90 | 97.3% | 28.32 | / | ○ | 1.3 | / | | | | |
| L14 | Second positive lens | SNBH52V | P | 77 | 99.5% | 38.26 | ○ | | 3.8 | / | | | | |
| L15 | First negative lens | SFSL5 | N | 90 | 99.9% | 70.24 | | | -0.7 | / | | | | |
| L16 | First positive lens | FF5 | P | 86 | 99.1% | 35.45 | ○ | | 0.8 | / | | | | |
| L17 | Second negative lens | SNBH53V | N | 71 | 99.1% | 32.33 | / | ○ | 5.1 | / | | | | |
| L18 | Third positive lens | FCD10A | P | 141 | 99.7% | 90.19 | / | | -6.5 | ○ | | | | |
| L19 | | SNBH53V | N | 71 | 99.1% | 32.33 | / | ○ | 5.1 | / | | | | |
| L20 | | FCD10A | P | 141 | 99.7% | 90.19 | / | | -6.5 | ○ | | | | |
| L21 | | SNBH53V | N | 71 | 99.1% | 32.33 | / | ○ | 5.1 | / | | | | |
| L22 | | TAF3D | P | 62 | 99.4% | 46.50 | / | | 3.9 | / | | | | |
| | | | | | | Total | 4 | 7 | | 6 | | | | |

FIG. 25

| PL7 | First, second, third positive lenses and first, second negative lenses | Lens material | Power | α | T (460nm) | vd | Condition (9) | Condition (10) | dn/dt | Condition (11) | | Conditions for first, second, third positive lenses and first, second negative lenses | | |
|---|---|---|---|---|---|---|---|---|---|---|---|---|---|---|
| L1 | | SNBH53V | N | 71 | 99.1% | 32.33 | / | ○ | 5.1 | / | Condition (1) | Tp1 | L5 | 99.1% |
| L2 | Second positive lens | SFSL5 | P | 90 | 99.9% | 70.24 | / | / | -0.7 | / | Condition (2) | Tp2 | L2 | 99.9% |
| L3 | | FCD10A | N | 141 | 99.7% | 90.19 | / | / | -6.5 | / | Condition (3) | Tp3 | L7 | 99.7% |
| L4 | First negative lens | FCD100 | N | 149 | 99.8% | 95.10 | / | / | -6.7 | / | Condition (4) | Tn1 | L4 | 99.8% |
| L5 | First positive lens | SLAH55VS | P | 63 | 99.1% | 42.74 | / | / | 5.0 | / | Condition (5) | Tn2 | L6 | 99.9% |
| L6 | Second negative lens | BSC7 | N | 76 | 99.9% | 64.20 | / | / | 2.7 | ○ | Condition (6) | αn | L4 | 149 |
| L7 | Third positive lens | FCD1 | P | 132 | 99.7% | 81.61 | / | / | -6.4 | / | | | L7 | -6.4 |
| L8 | | BSC7 | N | 76 | 99.9% | 64.20 | / | / | 2.7 | ○ | Condition (7) | dn/dt | | |
| L9 | | FCD705 | P | 116 | 99.3% | 75.50 | / | / | -5.1 | / | | | | |
| L10 | | FF5 | P | 86 | 99.1% | 35.45 | ○ | / | 0.8 | / | Condition (8) | fp/fw | L7 | 2.73 |
| L11 | | SNBH52V | N | 77 | 99.5% | 38.26 | / | ○ | 3.8 | / | | | | |
| L12 | | FCD100 | P | 149 | 99.8% | 95.10 | / | / | -6.7 | / | | | | |
| L13 | | SNBH52V | N | 77 | 99.5% | 38.26 | / | ○ | 3.8 | / | | | | |
| L14 | | FCD100 | P | 149 | 99.8% | 95.10 | / | / | -6.7 | / | | | | |
| L15 | | SNBH53V | N | 71 | 99.1% | 32.33 | / | ○ | 5.1 | / | | | | |
| L16 | | FCD100 | P | 149 | 99.8% | 95.10 | / | / | -6.7 | ○ | | | | |
| | | | | | | Total | 1 | 4 | | 5 | | | | |

FIG. 28

| PL8 | First, second, third positive lenses and first, second negative lenses | Lens material | Power | α | T (460 nm) | vd | Condition (9) | Condition (10) | dn/dt | Condition (11) | | Conditions for first, second, third positive lenses and first, second negative lenses | | |
|---|---|---|---|---|---|---|---|---|---|---|---|---|---|---|
| L1 | | FD60W | N | 93 | 97.7% | 25.46 | / | ○ | 0.5 | / | Condition (1) | Tp1 | L8 | 99.1% |
| L2 | | LAC8 | P | 59 | 99.8% | 53.94 | / | / | 4.0 | / | Condition (2) | Tp2 | L6 | 99.0% |
| L3 | | BACD16 | N | 60 | 99.6% | 60.34 | / | / | 2.4 | / | Condition (3) | Tp3 | L10 | 99.7% |
| L4 | | FCD1 | N | 132 | 99.7% | 81.61 | / | / | -6.4 | / | Condition (4) | Tn1 | L7 | 99.9% |
| L5 | | FCD1 | N | 132 | 99.7% | 81.61 | / | / | -6.4 | / | Condition (5) | Tn2 | L9 | 99.9% |
| L6 | Second positive lens | STIL6 | P | 82 | 99.0% | 48.84 | / | / | 1.9 | / | Condition (6) | α.n | L7 | 76 |
| L7 | First negative lens | BSC7 | N | 76 | 99.9% | 64.20 | / | / | 2.7 | / | Condition (7) | dn/dt | L10 | -6.5 |
| L8 | First positive lens | SNBH53V | P | 71 | 99.1% | 32.33 | ○ | / | 5.1 | / | | | | |
| L9 | Second negative lens | BSC7 | N | 76 | 99.9% | 64.20 | / | / | 2.7 | / | Condition (8) | fp/fw | L10 | 3.02 |
| L10 | Third positive lens | FCD10A | P | 141 | 99.7% | 90.19 | / | / | -6.5 | ○ | | | | |
| L11 | | FCD10A | P | 141 | 99.7% | 90.19 | / | / | -6.5 | ○ | | | | |
| L12 | | BACD16 | N | 60 | 99.6% | 60.34 | / | / | 2.4 | / | | | | |
| L13 | | FCD10A | P | 141 | 99.7% | 90.19 | / | / | -6.5 | ○ | | | | |
| L14 | | STIL26 | N | 79 | 99.5% | 42.82 | / | / | 2.8 | / | | | | |
| L15 | | FCD10A | P | 141 | 99.7% | 90.19 | / | / | -6.5 | ○ | | | | |
| L16 | | STIL27 | N | 74 | 99.4% | 41.50 | / | / | 3.3 | / | | | | |
| L17 | | FCD10A | P | 141 | 99.7% | 90.19 | / | / | -6.5 | ○ | | | | |
| | | | | | | Total | 1 | 1 | | 5 | | | | |

FIG. 31

| PL9 | | Lens material | Power | α | T (460nm) | vd | Condition (9) | Condition (10) | dn/dt | Condition (11) |
|---|---|---|---|---|---|---|---|---|---|---|
| L1 | First, second, third positive lenses and first, second negative lenses | FCD1 | P | 132 | 99.7% | 81.61 | | | -6.4 | ○ |
| L2 | | TAC8 | P | 60 | 99.7% | 54.67 | | | 3.4 | / |
| L3 | | FF5 | N | 86 | 99.1% | 35.45 | / | ○ | 0.8 | / |
| L4 | | TAF3D | P | 62 | 99.4% | 46.50 | | | 3.9 | / |
| L5 | Second positive lens | SNBH53V | P | 71 | 99.1% | 32.33 | ○ | / | 5.1 | / |
| L6 | | BSC7 | N | 76 | 99.9% | 64.20 | / | / | 2.7 | / |
| L7 | | BSC7 | N | 76 | 99.9% | 64.20 | / | / | 2.7 | / |
| L8 | First negative lens | BSC7 | N | 76 | 99.9% | 64.20 | / | / | 2.7 | / |
| L9 | First positive lens | SNBH52V | P | 77 | 99.5% | 38.26 | ○ | / | 3.8 | / |
| L10 | Second negative lens | FCD1 | P | 132 | 99.7% | 81.61 | | | -6.4 | ○ |
| L11 | Third positive lens | SNBH52V | N | 77 | 99.5% | 38.26 | / | / | 3.8 | / |
| L12 | | FF5 | P | 86 | 99.1% | 35.45 | ○ | / | 0.8 | / |
| L13 | | SNBH52V | N | 77 | 99.5% | 38.26 | / | ○ | 3.8 | ○ |
| L14 | | FCD10A | P | 141 | 99.7% | 90.19 | | | -6.5 | / |
| L15 | | SNBH53V | N | 71 | 99.1% | 32.33 | / | ○ | 5.1 | / |
| L16 | | STIL25 | P | 74 | 99.3% | 40.75 | | | 3.5 | / |
| L17 | | SNBH53V | P | 71 | 99.1% | 32.33 | ○ | / | 5.1 | / |
| L18 | | FCD10A | P | 141 | 99.7% | 90.19 | | | -6.5 | ○ |
| L19 | | FCD10A | P | 141 | 99.7% | 90.19 | | | -6.5 | ○ |
| | | | | | | Total | 4 | 4 | | 5 |

| Conditions for first, second, third positive lenses and first, second negative lenses | | | |
|---|---|---|---|
| Condition (1) | Tp1 | L9 | 99.5% |
| Condition (2) | Tp2 | L5 | 99.1% |
| Condition (3) | Tp3 | L10 | 99.7% |
| Condition (4) | Tn1 | L8 | 99.9% |
| Condition (5) | Tn2 | L11 | 99.5% |
| Condition (6) | αn | L8 | 76 |
| | | | -6.4 |
| Condition (7) | dn/dt | | |
| | | L10 | 1.45 |
| Condition (8) | fp/fw | | |

PROJECTION LENS SYSTEM AND IMAGE PROJECTION DEVICE

CROSS-REFERENCE OF RELATED APPLICATIONS

This application is a continuation of International Patent Application No. PCT/JP2018/044810, filed on Dec. 6, 2018, which claims the benefit of Japanese Patent Application No. 2017-243055, filed on Dec. 19, 2017, the contents all of which are incorporated herein by reference.

TECHNICAL FIELD

The present disclosure relates to a projection lens system that projects an image of a reduction side into a magnification side, and an image projection device including the projection lens system.

BACKGROUND ART

PTL 1 discloses an optical system for successfully correcting chromatic aberrations and reducing a shift in focus position due to a temperature change in an image projection device and an imaging device. In the optical system of PTL 1, at least two positive lenses in which the Abbe number, anomalous dispersion property, rate of change in refractive index with respect to temperature changes, and the like are set in appropriate ranges are disposed closer to the reduction side than a diaphragm. As a result, the shift in the focus position caused by the change in refractive index due to the temperature change can be reduced, while the axial chromatic aberration is successfully corrected by increasing the width of an axial light flux. PTL 1 describes that a lamp used as a light source is a cause of high temperature in the image projection device.

CITATION LIST

Patent Literature

PTL 1: Unexamined Japanese Patent Publication No. 2011-053663

SUMMARY

The present disclosure provides a projection lens system and an image projection device that can improve the image quality of an image when the brightness of the image projection device is increased.

A projection lens system according to the present disclosure is a lens system that projects an image of a reduction side into a magnification side. The projection lens system includes a diaphragm, a plurality of positive lenses, and a plurality of negative lenses. The plurality of positive lenses include a first positive lens that is closer to the magnification side than the diaphragm is and is closest to the diaphragm, a second positive lens that is second closest to the diaphragm after the first positive lens on the magnification side, and a third positive lens that is closer to the reduction side than the diaphragm is and is closest to the diaphragm. The first to third positive lenses satisfy following conditions (1) to (3). The plurality of negative lenses include a first negative lens that is closer to the magnification side than the diaphragm is and is closest to the diaphragm and a second negative lens that is closer to the reduction side than the diaphragm is and is closest to the diaphragm. The first and second negative lenses satisfy following conditions (4) to (6). At least one positive lens of the first to third positive lenses satisfies following conditions (7) and (8), $$Tp1 > 99\% \tag{1}$$

$$Tp2 > 99\% \tag{2}$$

$$Tp3 > 99\% \tag{3}$$

$$Tn1 > 99\% \tag{4}$$

$$Tn2 > 99\% \tag{5}$$

$$\alpha n1 < 100 \times 10^{-7} [/^\circ C.] \tag{6}$$

$$dn/dt < -4.5 \times 10^{-6} \tag{7}$$

$$|fp/fw| > 1.3 \tag{8}$$

where

Tp1 indicates an internal transmittance of light having a wavelength of 460 nm when a lens material of the first positive lens has a thickness of 10 mm, Tp2 indicates an internal transmittance of light having a wavelength of 460 nm when a lens material of the second positive lens has the thickness mentioned above, Tp3 indicates an internal transmittance of light having a wavelength of 460 nm when a lens material of the third positive lens has the thickness mentioned above, Tn1 indicates an internal transmittance of light having a wavelength of 460 nm when a lens material of the first negative lens has the thickness mentioned above, Tn2 indicates an internal transmittance of light having a wavelength of 460 nm when a lens material of the second negative lens has the thickness mentioned above, $\alpha n1$ indicates a linear expansion coefficient of the lens material of the first negative lens at room temperature, dn/dt indicates a temperature coefficient of a relative refractive index of a lens material of the at least one positive lens at room temperature, fp indicates a focal length of the at least one positive lens, and fw indicates a focal length at the wide-angle end of a whole system.

An image projection device according to the present disclosure includes the projection lens system described above and an image forming element. The image forming element forms an image.

According to the projection lens system and the image projection device according to the present disclosure, it is possible to improve the image quality of an image when the brightness of the image projection device is increased.

BRIEF DESCRIPTION OF DRAWINGS

FIG. 4 is a table illustrating sufficiency of various conditions in the projection lens system according to the first example.

FIG. 7 is a table illustrating sufficiency of various conditions in the projection lens system according to the second example.

FIG. 10 is a table illustrating sufficiency of various conditions in the projection lens system according to the third example.

FIG. 14 is a table illustrating sufficiency of various conditions in the projection lens system according to the fourth example.

FIG. 18 is a table illustrating sufficiency of various conditions in the projection lens system according to the fifth example.

FIG. 22 is a table illustrating sufficiency of various conditions in the projection lens system according to the sixth example.

FIG. 25 is a table illustrating sufficiency of various conditions in the projection lens system according to the seventh example.

FIG. 28 is a table illustrating sufficiency of various conditions in the projection lens system according to the eighth example.

FIG. 31 is a table illustrating sufficiency of various conditions in the projection lens system according to the ninth example.

DESCRIPTION OF EMBODIMENTS

Exemplary embodiments will be described below in detail with reference to the drawings as appropriate. Here, excessively detailed description will be omitted in some cases. For example, detailed description of already well-known matters and duplicated description of the substantially same configurations will be omitted in some cases. This is to prevent the following description from becoming unnecessarily redundant, thereby facilitating the understanding of those skilled in the art.

Here, the applicant provides the accompanying drawings and the following description such that those skilled in the art can fully understand the present disclosure, and therefore, does not intend to limit the subject matters described in the claims by the accompanying drawings and the following description.

First Exemplary Embodiment

Hereinafter, a first exemplary embodiment of a projection lens system and an image projection device according to the present disclosure will be described with reference to the drawings.

1. Outline

Figure 1:
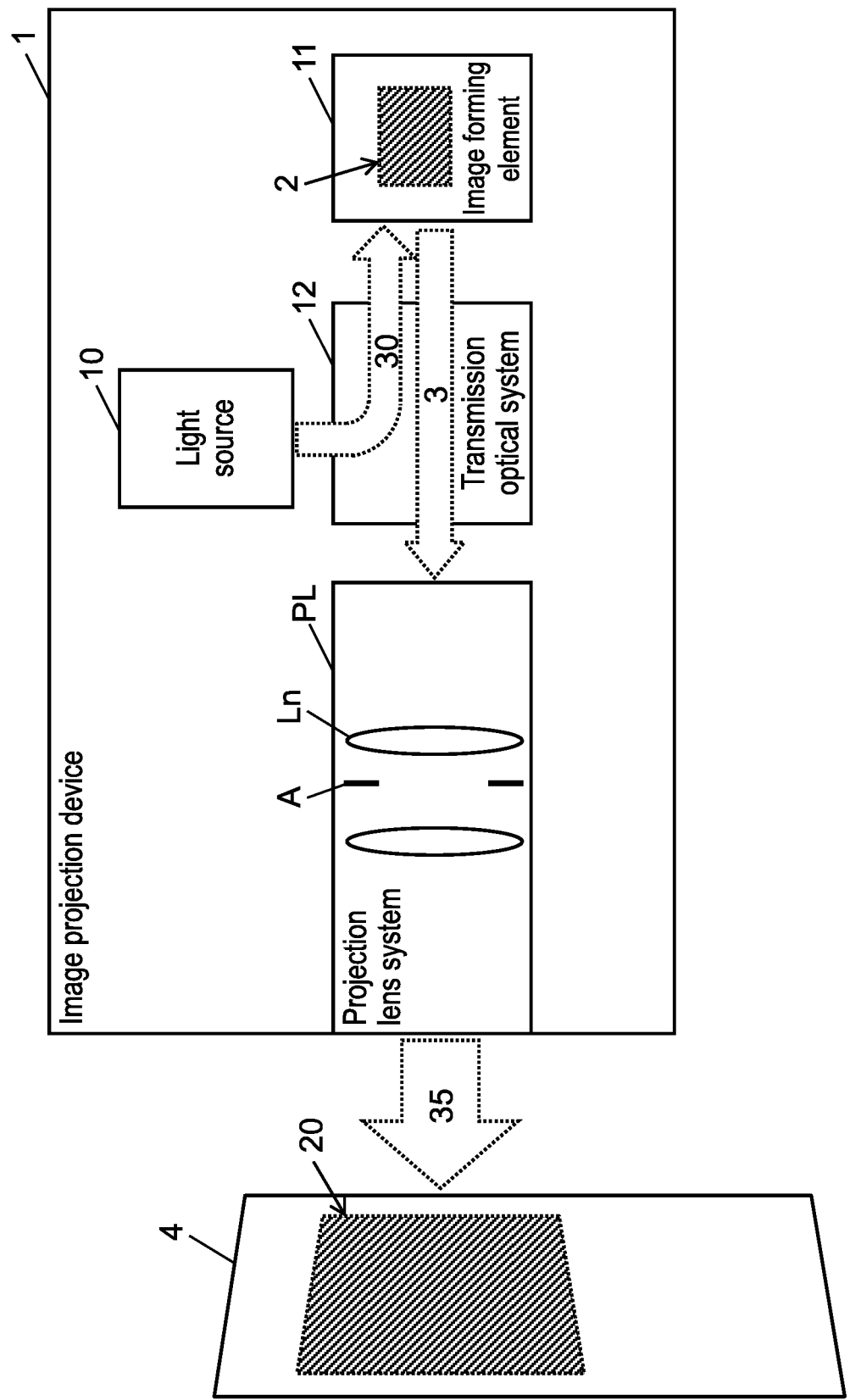
FIG. 1 is a block diagram illustrating an image projection device according to a first exemplary embodiment of the present disclosure.

An outline of an image projection device including a projection lens system according to the first exemplary embodiment of the present disclosure will be described with reference to FIG. 1. FIG. 1 is a block diagram illustrating image projection device 1 according to the present exemplary embodiment.

Image projection device 1 according to the present exemplary embodiment is, for example, a high brightness projector having a light output of 20,000 lumens or more. In image projection device 1, as illustrated in FIG. 1, image light 3 showing various images 2 is generated by using image forming element 11 and the like, and image light 3 enters projection lens system PL. Projection lens system PL emits projection light 35 so as to magnify image 2 of entering image light 3. Projection light 35 from projection lens system PL projects projection image 20 obtained by magnifying image 2 on external screen 4 or the like.

In image projection device 1 as described above, it is required to increase brightness so as to project projection image 20 more brightly. In increasing the brightness of image projection device 1, it is assumed that image quality of projection image 20 is degraded by following factors.

That is, it is assumed in image projection device 1 that, when image light 3 having high brightness travels in projection lens system PL, a significant temperature change occurs in particular lens element Ln near diaphragm A or the like in projection lens system PL by concentration of rays or the like. The temperature change of lens element Ln changes a shape and a refractive index of lens element Ln, and thus may have various influences on performance of projection lens system PL, such as a shift in focus position, occurrence of spherical aberrations, and a variation in back focus.

In addition, the heat distribution of lens element Ln due to image light 3 may occur either uniformly or locally. It is considered that an influence of heat, such as a shift direction of the focus position, in a uniform case is different from that in a local case. As described above, in increasing the brightness of image projection device 1, it is assumed that the performance of projection lens system PL becomes unstable due to the influence of heat according to the brightness of image 2 to be projected, and the image quality of projection image 20 is degraded.

Consequently, in the present exemplary embodiment, projection lens system PL is configured so as to reduce the influence of heat due to image light 3 with high brightness. As a result, it is possible to reduce the influence of heat in increasing the brightness of image projection device 1, stabilize the performance of projection lens system PL, and improve the image quality of projection image 20.

2. About Image Projection Device

A configuration of image projection device 1 according to the present exemplary embodiment will be described below with reference to FIG. 1.

As illustrated in FIG. 1, image projection device 1 according to the present exemplary embodiment includes light source 10, image forming element 11, transmission optical system 12, and projection lens system PL. Image projection device 1 is configured with, for example, a DLP system. The light output of image projection device 1 may be more than or equal to 30,000 lumens.

Light source 10 is, for example, a laser light source. Light source 10 includes, for example, a blue LD (semiconductor laser) element and has a peak wavelength near 450 nm. Light source 10 emits white illumination light 30 by, for example, combining various colors. Illumination light 30 is irradiated to image forming element 11 via transmission optical system 12 with a uniform illuminance distribution. Light source 10 may include a Koehler illumination optical system.

Image forming element 11 is, for example, a digital mirror device (DMD). Image forming element 11 has, for example, an image forming surface including a mirror element for each pixel, and forms image 2 on the image forming surface based on an external video signal or the like. Image forming element 11 spatially modulates illumination light 30 on the image forming surface to generate image light 3. Image light 3 has directionality for each pixel on the image forming surface, for example.

Image projection device 1 may include a plurality of image forming elements 11 such as three chips corresponding to RGB. Image forming element 11 is not limited to the DMD and may be, for example, a liquid crystal element. In this case, image projection device 1 may be configured with a 3LCD system or an LCOS system.

Transmission optical system 12 includes a translucent optical element and the like, and is disposed between image forming element 11 and projection lens system PL. Transmission optical system 12 guides illumination light 30 from light source 10 to image forming element 11. Further, transmission optical system 12 guides image light 3 from image forming element 11 to projection lens system PL. Transmission optical system 12 may include various optical elements such as a total internal reflection (TIR) prism, a color separation prism, a color combination prism, an optical filter, a parallel plate glass, a crystal low-pass filter, and an infrared cut filter. Hereinafter, the optical element in transmission optical system 12 is referred to as "back glass" in some cases.

Projection lens system PL is mounted on image projection device 1, for example, as a module. Hereinafter, in projection lens system PL, a side facing outside of image projection device 1 is referred to as a "magnification side", and a side opposite to the magnification side is referred to as a "reduction side". Various back glasses of transmission optical system 12 are disposed on the reduction side of projection lens system PL.

Projection lens system PL includes a plurality of lens elements Ln and diaphragm A. A number of lens elements Ln is, for example, more than or equal to 15. This makes it possible to successfully correct various aberrations in projection lens system PL. Diaphragm A is, for example, an aperture diaphragm. In projection lens system PL, an aperture degree of diaphragm A is fixed in advance to, for example, an open state. Projection lens system PL may be incorporated in image projection device 1 without being modularized. Hereinafter, details of projection lens system PL according to the present exemplary embodiment will be described.

3. About Projection Lens System

In the first exemplary embodiment, first to third examples in which projection lens system PL configuring a negative-lead zoom lens system will be described as a specific example. The negative-lead zoom lens system is a lens system that includes a plurality of lens groups that move during zooming and in which a lens group on a most magnification side has a negative power.

3-1. First Example

Projection lens system PL1 of the first example will be described with reference to FIGS. 2 to 3.

Figure 2:
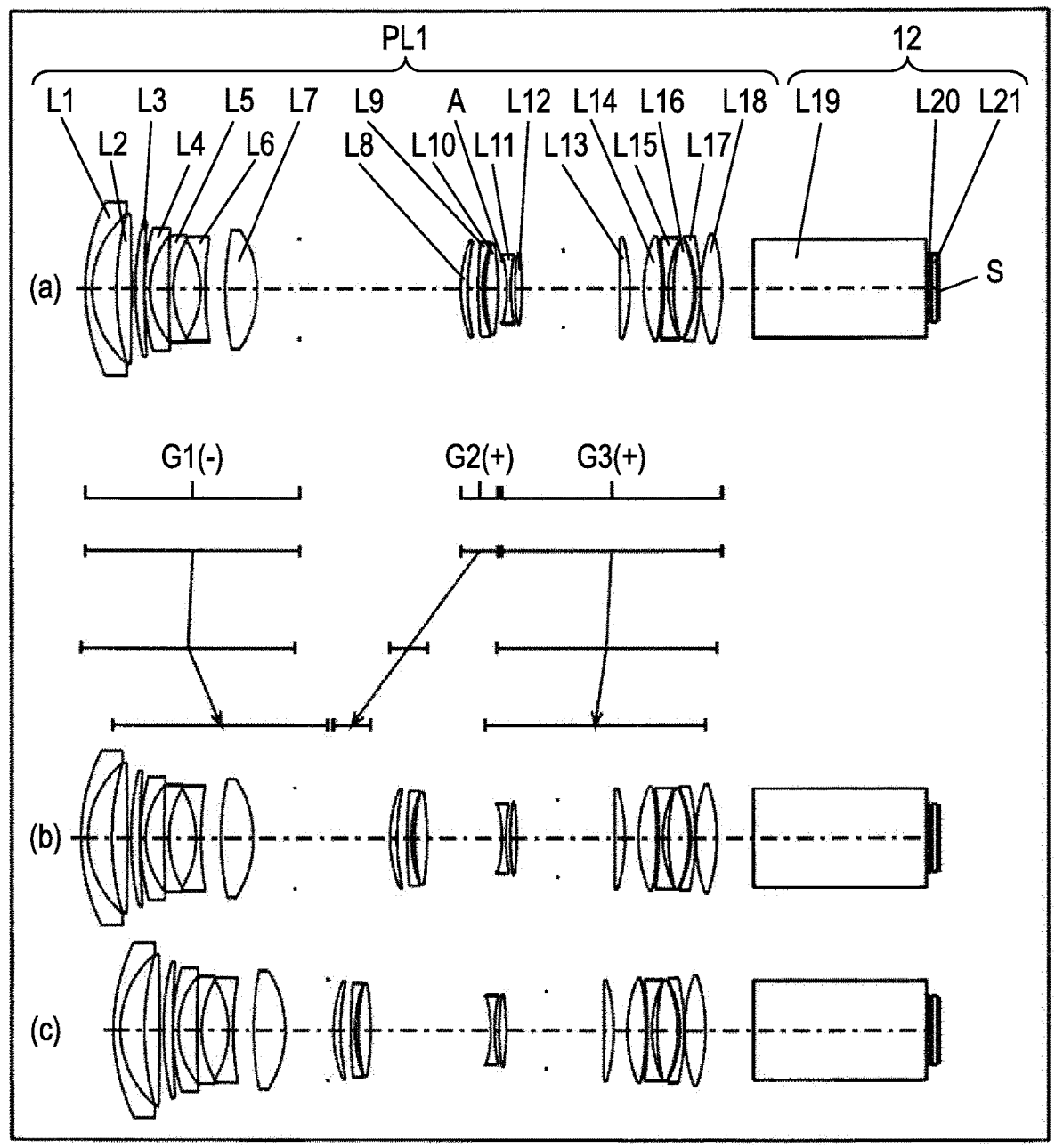
FIG. 2 is a lens arrangement diagram in various states of a projection lens system according to a first example.

FIG. 2 is a lens arrangement diagram in various states of projection lens system PL1 according to the first example. Following lens arrangement diagrams each illustrate an arrangement of various lenses when a whole system such as projection lens system PL1 is focused at 4,000 mm. A left side in the figure is a magnification side or object side of the whole system. A right side in the figure is a reduction side or image side of the whole system. In each figure, a position of image plane S is illustrated on a rightmost side, that is, on the reduction side. Image plane S corresponds to the image forming surface of image forming element 11.

FIG. 2(a) is a lens arrangement diagram at a wide-angle end of projection lens system PL1 according to the first example. FIG. 2 (b) is a lens arrangement diagram at an intermediate position of projection lens system PL1 according to the first example. FIG. 2(c) is a lens arrangement diagram at a telephoto end of projection lens system PL1 according to the first example. The wide-angle end means a shortest focal length state where the whole system has shortest focal length fw. The intermediate position means an intermediate focal length state between the wide-angle end and the telephoto end. The telephoto end means a longest focal length state where the whole system has longest focal length ft. Based on focal length fw at the wide-angle end and focal length ft at the telephoto end, a focal length at the intermediate position is defined as fm=√(fw×ft).

Line arrows indicated between FIG. 2(a) and FIG. 2(b) are lines obtained by connecting positions of lens groups at the wide-angle end, the intermediate position, and the telephoto end in this order from a top of the figure. The wide-angle end and the intermediate position, and the intermediate position and the telephoto end are simply connected by straight lines, which is different from an actual movement of each lens group. Symbols (+) and (−) attached to reference signs of the respective lens groups indicate positive and negative of the power of each lens group.

Projection lens system PL1 of the first example includes 18 lens elements L1 to L18 constituting three lens groups G1 to G3. As illustrated in FIG. 2(a), first, second, and third lens groups G1, G2, G3 are arranged in order from the magnification side to the reduction side of projection lens system PL1. Projection lens system PL1 functions as a zoom lens system by moving each of first to third lens groups G1 to G3 along an optical axis of projection lens system PL1 during zooming.

In projection lens system PL1, first to eighteenth lens elements L1 to L18 are arranged in order from the magnification side to the reduction side. Each of first to eighteenth lens elements L1 to L18 configures a positive lens or a negative lens. The positive lens has a biconvex shape or a positive meniscus shape and thus has a positive power. The negative lens has a biconcave shape or a negative meniscus shape and thus has a negative power.

First lens group G1 includes first to seventh lens elements L1 to L7, and has a negative power. First lens element L1 has a negative meniscus shape, and is arranged with its convex surface facing the magnification side. Second lens element L2 has a biconvex shape. Third lens element L3 has a positive meniscus shape, and is arranged with its convex surface facing the magnification side. Fourth lens element L4 has a negative meniscus shape, and is arranged with its convex surface facing the magnification side. Fifth lens element L5 has a negative meniscus shape, and is arranged with its convex surface facing the magnification side. Sixth lens element L6 has a biconcave shape. Seventh lens element L7 has a biconvex shape.

Second lens group G2 includes eighth to tenth lens elements L8 to L10, and has a positive power. Eighth lens element L8 has a positive meniscus shape, and is arranged with its convex surface facing the magnification side. Ninth lens element L9 has a negative meniscus shape, and is arranged with its convex surface facing the magnification side. Tenth lens element L10 has a biconvex shape.

Third lens group G3 includes eleventh to eighteenth lens elements L11 to L18, and has a positive power. Diaphragm A is disposed on the magnification side of eleventh lens element L11. Eleventh lens element L11 has a biconcave shape. Twelfth lens element L12 has a biconvex shape. Thirteenth lens element L13 has a positive meniscus shape, and is arranged with its convex surface facing the reduction side. Fourteenth lens element L14 has a biconvex shape. Fifteenth lens element L15 has a biconcave shape. Sixteenth lens element L16 has a biconvex shape. Seventeenth lens element L17 has a negative meniscus shape, and is arranged with its convex surface facing the reduction side. Eighteenth lens element L18 has a biconvex shape.

FIGS. 2(a) to 2(c) illustrate, as an example of transmission optical system 12, three back glasses L19, L20, L21 arranged between eighteenth lens element L18 on the most reduction side in projection lens system PL1 and image plane S. Back glasses L19 to L21 are, for example, various prisms, filters, cover glasses, and the like. In each figure, back glasses L19 to L21 for one image plane S corresponding to one image forming element 11 are illustrated for convenience of description. Projection lens system PL1 can be used for various transmission optical systems 12 when a plurality of image forming elements 11 are used.

Projection lens system PL1 constitutes a substantially telecentric system on the reduction side to which light from image plane S enters through back glasses L19 to L21. It is thus possible to reduce a color shift and the like due to a coating of a prism in transmission optical system 12. Further, the light from image plane S of image forming element 11 can be efficiently taken into projection lens system PL1.

Figure 3:
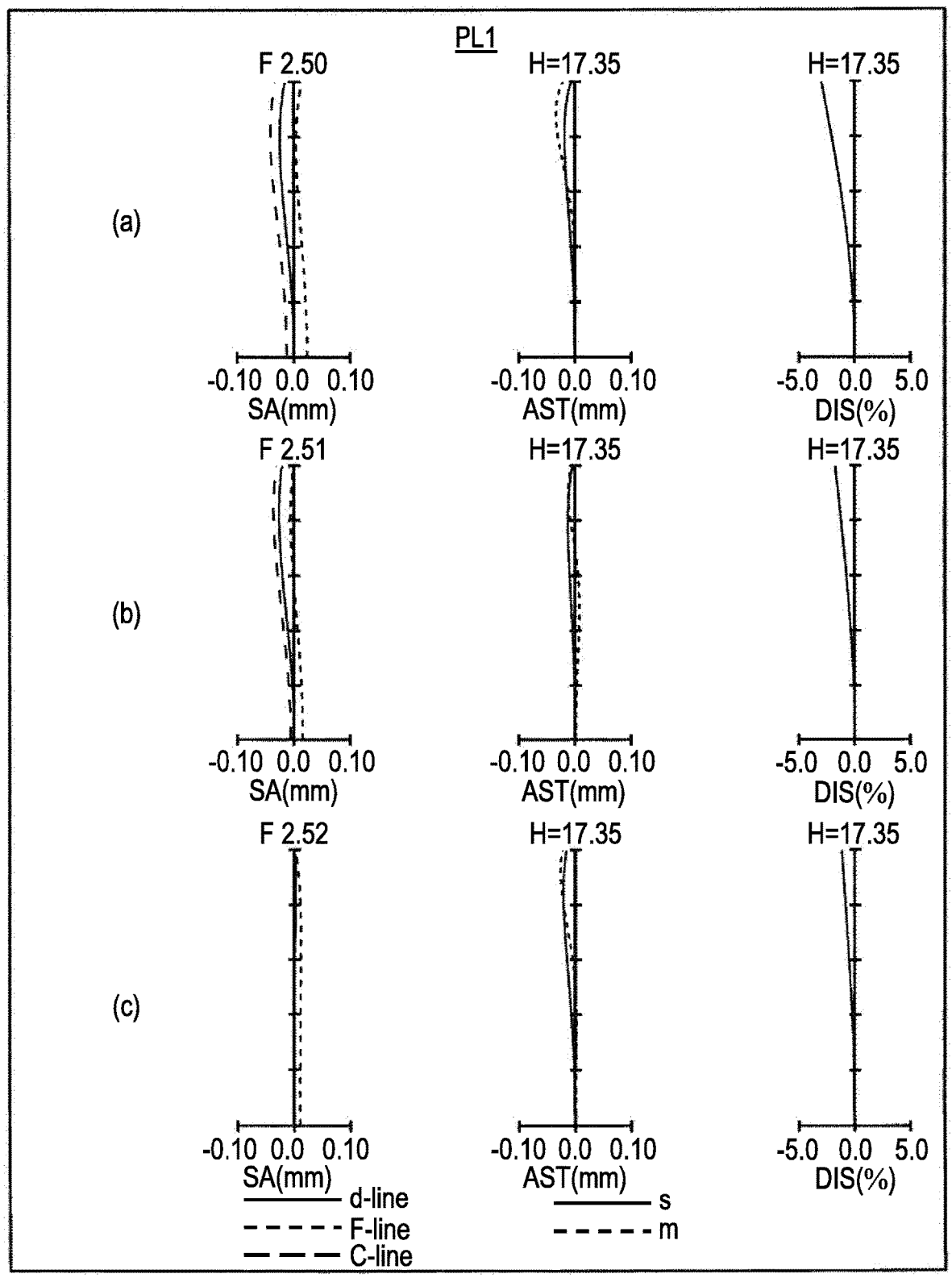
FIG. 3 is an aberration diagram illustrating longitudinal aberrations of the projection lens system according to the first example.

FIG. 3 is an aberration diagram illustrating various longitudinal aberrations of projection lens system PL1 according to the first example. Following aberration diagrams exemplify various longitudinal aberrations in a focused state at 4,000 mm.

FIG. 3(a) illustrates aberrations at the wide-angle end of projection lens system PL1 according to the first example. FIG. 3(b) illustrates aberrations at the intermediate position of projection lens system PL1 according to the first example. FIG. 3(c) illustrates aberrations at the telephoto end of projection lens system PL1 according to the first example. FIGS. 3(a), 3(b), 3(c) each include a spherical aberration diagram showing a spherical aberration on horizontal axis "SA (mm)", an astigmatism diagram showing an astigmatism on horizontal axis "AST (mm)", and a distortion aberration diagram showing a distortion aberration on horizontal axis "DIS (%)" in this order from the left side in the respective figures.

In each spherical aberration diagram, vertical axis "F" represents an F number. Also, a solid line denoted by "d-line" in the figures indicates properties of a d-line. A broken line denoted by "F-line" indicates properties of an F-line. A broken line denoted by "C-line" indicates properties of a C-line. In the respective astigmatism diagrams and the respective distortion aberration diagrams, vertical axis "H" indicates an image height. In addition, a solid line denoted by "s" in the figures indicates properties of a sagittal plane. A broken line denoted by "m" indicates properties of a meridional plane.

The aberrations in various states illustrated in FIGS. 3(a), 3(b), 3(c) are based on a first numerical example in which projection lens system PL1 of the first example is specifically implemented. The first numerical example of projection lens system PL1 will be described later.

3-2. About Measures for Heat in Increasing Brightness

Using projection lens system PL1 of the first example described above, measures for heat of projection lens system PL1 in increasing the brightness of image projection device 1 according to the present exemplary embodiment will be described with reference to FIG. 4. FIG. 4 is a table illustrating sufficiency of various conditions in projection lens system PL1 according to the first example.

The table illustrated in FIG. 4 shows which of all lens elements L1 to L18 in projection lens system PL1 of the first example satisfies following conditions (1) to (11). The symbol "○" in items for each lens indicates that the corresponding condition is satisfied, and the blank indicates that the corresponding condition is not satisfied. In addition, the symbol "/" indicates that the lens is not a target lens for determining the corresponding condition from the viewpoint of the power of the lens or the like.

FIG. 4 also shows various parameters related to conditions (1) to (11). The various parameters include α, T (460 nm), vd, and dn/dt, which will be described later. Regarding the power of the lens, the positive lens is denoted by "P", and the negative lens is denoted by "N". Further, lens materials of the lens elements L1 to L18 are also shown.

In the present exemplary embodiment, it is configured that a particular lens that is assumed to be easily affected by heat of image light 3 in image projection device 1 and easily affect the performance of projection lens system PL1 satisfies following conditions (1) to (6). The particular lens is located near diaphragm A in projection lens system PL1, and includes first, second and third positive lenses and first and second negative lenses.

The first positive lens is a positive lens that is closer to the magnification side than diaphragm A is and is the closest to the diaphragm A among all the positive lenses in projection lens system PL1. In the first example, as illustrated in FIG. 2, diaphragm A is disposed between tenth lens element L10 and eleventh lens element L11. Consequently, tenth lens element L10 of the first example is the first positive lens in projection lens system PL1 and satisfies following condition (1).

Condition (1) is expressed by a following inequality.

$$Tp1>99\% \tag{1}$$

Here, Tp1 indicates an internal transmittance obtained by removing a surface reflection loss from a transmittance at which light having a wavelength of 460 nm passes through a lens material of the first positive lens having a thickness of 10 mm. FIG. 4 shows internal transmittance T (460 nm) of light having a wavelength of 460 nm when a lens material of each of lens elements L1 to L18 has a thickness of 10 mm. In general, the lens material is more likely to absorb energy of light having a shorter wavelength, and a light source having a particularly strong peak intensity for blue light is usually used in an image projection device. A reference transmittance is thus set to the wavelength mentioned above.

According to condition (1), it is possible to achieve high internal transmittance Tp1 of the first positive lens where rays may be concentrated near diaphragm A and reduce energy absorbed by the first positive lens when a ray passes through the first positive lens. If internal transmittance Tp1 of the first positive lens is less than a lower limit value of condition (1), that is, 99%, the energy absorbed by the first positive lens becomes large, and the influence of heat is excessively exerted on the first positive lens.

The second positive lens is a positive lens that is closer to the magnification side than diaphragm A is and is the second closest to diaphragm A after the first positive lens, among all the positive lenses in projection lens system PL1. In the first example, the positive lens that is the second closest to diaphragm A after tenth lens element L10 on the magnification side is eighth lens element L8, as illustrated in FIG. 2. Consequently, eighth lens element L8 of the first example is the second positive lens in projection lens system PL1 as illustrated in FIG. 4, and satisfies following condition (2).

Condition (2) is expressed by the following inequality.

$$Tp2>99\% \tag{2}$$

Here, Tp2 indicates the internal transmittance of light having a wavelength of 460 nm when a lens material of the second positive lens has a thickness of 10 mm, like the internal transmittance of the first positive lens. If internal transmittance Tp2 of the second positive lens is less than the lower limit value of condition (2), the energy absorbed by the second positive lens becomes large, and the influence of heat is excessively exerted on the second positive lens.

The third positive lens is a positive lens that is closer to the reduction side than diaphragm A is and is the closest to diaphragm A among all the positive lenses in projection lens system PL1. In the first example, since eleventh lens element L11 adjacent to the reduction side of diaphragm A is a negative lens, the positive lens closest to diaphragm A on the reduction side is twelfth lens element L12. Consequently, twelfth lens element L12 of the first example is the third positive lens in projection lens system PL1 as illustrated in FIG. 4, and satisfies following condition (3).

Condition (3) is expressed by the following inequality.

$$Tp3>99\% \tag{3}$$

Here, Tp3 indicates the internal transmittance of light having a wavelength of 460 nm when a lens material of the third positive lens has a thickness of 10 mm, like the internal transmittance of the first positive lens. If internal transmittance Tp3 of the third positive lens is less than the lower limit value of condition (3), the energy absorbed by the third positive lens becomes large, and the influence of heat is excessively exerted on the third positive lens.

The first negative lens is a negative lens that is closer to the magnification side than diaphragm A is and is the closest to diaphragm A among all the negative lenses in projection lens system PL1. In the first example, since tenth lens element L10 adjacent to the magnification side of diaphragm A is a positive lens, the negative lens closest to diaphragm A on the magnification side is ninth lens element L9. Consequently, ninth lens element L9 of the first example is the first negative lens in projection lens system PL1 as illustrated in FIG. 4, and satisfies following condition (4).

Condition (4) is expressed by the following inequality.

$$Tn1>99\% \tag{4}$$

Here, Tn1 indicates the internal transmittance of light having a wavelength of 460 nm when a lens material of the first negative lens has a thickness of 10 mm, like the internal transmittance of the first positive lens. The first negative lens satisfies following condition (4). If internal transmittance Tn1 of the first negative lens is less than a lower limit value of condition (4), the energy absorbed by the first negative lens becomes large, and the influence of heat is excessively exerted on the first negative lens.

The second negative lens is a negative lens that is closer to the reduction side than diaphragm A is and is the closest to diaphragm A among all the negative lenses in projection lens system PL1. In the first example, eleventh lens element L11 is the second negative lens in projection lens system PL1 as illustrated in FIG. 4, and satisfies following condition (5).

Condition (5) is expressed by the following inequality.

$$Tn2>99\% \tag{5}$$

Here, Tn2 indicates the internal transmittance of light having a wavelength of 460 nm when a lens material of the second negative lens has a thickness of 10 mm, like the internal transmittance of the first positive lens. If internal transmittance Tn2 of the second negative lens is less than the lower limit value of condition (5), the energy absorbed by the second negative lens becomes large, and the influence of heat is excessively exerted on the second negative lens.

According to conditions (2) to (5), the energy absorbed from a ray can be reduced and the influence of heat in projection lens PL1 can also be reduced in the second and third positive lenses and the first and second negative lenses, as in the case of condition (1).

Condition (6) is expressed by the following inequality.

$$\alpha n1 < 100 \times 10^{-7} [/^\circ\ C.] \tag{6}$$

Here, αn1 indicates a linear expansion coefficient of the lens material of the first negative lens at room temperature. The room temperature ranges from 20° C. to 30° C., for example. In FIG. 4, linear expansion coefficient α of the lens material of each of lens elements L1 to L18 at room temperature is shown in a unit [$10^{-7}$/° C.].

According to condition (6), in the negative lenses where a sensitive shift in focus position due to a temperature change is supposed to occur, a change in the shape of the first negative lens which easily rises in temperature particularly near diaphragm A can be reduced, and thus performance of projection lens system PL1 can be stabilized. If linear expansion coefficient α of the first negative lens exceeds an upper limit value of condition (6), the shape of the first negative lens is easily changed locally due to the rise in the temperature of the first negative lens, and the influence of heat is excessively exerted on the first negative lens.

Further, it is configured in the present exemplary embodiment that at least one of the first to third positive lenses satisfies following conditions (7) and (8). In projection lens system PL1 of the first example, as illustrated in FIG. 4, two lens elements, that is, eighth lens element L8 (second positive lens) and tenth lens element L10 (first positive lens) satisfy conditions (7) and (8).

Condition (7) is expressed by the following inequality.

$$dn/dt < -4.5 \times 10^{-6} \quad (7)$$

Here, dn/dt indicates a temperature coefficient of a relative refractive index of the lens material of the positive lens at room temperature. In FIG. 4, temperature coefficient dn/dt of the relative refractive index is shown in the unit [$10^{-6}$].

In a positive lens having a negative temperature coefficient of the refractive index, the influence of a change in shape and the influence of a change in refractive index may be offset when the focus position is shifted due to a local temperature change. According to condition (7), the influence of heat on the change in image 2 to be projected can be reduced by the offset described above, and a variation in the image quality of projection image 20 can be reduced. If temperature coefficient dn/dt of the relative refractive index of the positive lens exceeds the upper limit value of condition (7), it is difficult to offset the influence of the change in the shape of the positive lens due to the local change in temperature by the influence of the change in refractive index.

Condition (8) is expressed by the following inequality.

$$|fp/fw| > 1.3 \quad (8)$$

Here, fp indicates a focal length of one negative lens. As described above, fw indicates the focal length at the wide-angle end of the whole system.

According to condition (8), it is possible to reduce the influence of heat by achieving long focal length fp of the positive lens and thus weakening the power of the positive lens. If the positive lens has a value less than the lower limit value of condition (8), the focus position or the like may sensitively vary depending on image 2 to be projected. With conditions (7), (8), it is possible to reduce the influence of heat on the first to third positive lenses, which easily affects the performance of projection lens system PL1, thus stabilizing the performance of projection lens system PL1.

Moreover, in the present exemplary embodiment, at least one positive lens may satisfy condition (9). In projection lens system PL1 of the first example, as illustrated in FIG. 4, four lens elements, that is, second lens element L2, third lens element L3, twelfth lens element L12, and thirteenth lens element L13 satisfy condition (9).

Condition (9) is expressed by the following inequality.

$$vp < 40 \quad (9)$$

Here, vp indicates the Abbe number of the lens material of the positive lens. As illustrated in FIG. 4 for example, Abbe number vd based on the d line can be adopted as Abbe number vp.

In general, a lens material having a higher Abbe number tends to have a higher transmittance and is thermally advantageous. However, it is difficult to successfully correct the chromatic aberration of projection lens system PL1 only with the positive lens having a value that exceeds the upper limit value of condition (9). By including a positive lens that satisfies condition (9) in projection lens system PL1, it is possible to successfully correct the chromatic aberration while achieving heat resistance when the brightness is increased. In particular, the chromatic aberration can be successfully corrected when a high zoom or a wide angle is achieved in projection lens system PL1. Abbe number vp of at least one positive lens is preferably smaller than 36.

Moreover, in the present exemplary embodiment, at least one negative lens may satisfy following condition (10). In projection lens system PL1 of the first example, as illustrated in FIG. 4, two lenses, that is, first lens element L1 and seventeenth lens element L17 satisfy condition (10).

Condition (10) is expressed by the following inequality.

$$vn < 40 \quad (10)$$

Here, vn indicates the Abbe number of the lens material of the negative lens, like Abbe number vp of the positive lens.

If all the negative lenses have a value exceeding the upper limit value of condition (10), it becomes difficult to successfully correct the chromatic aberration in projection lens system PL1. According to condition (10), it is possible to successfully correct the chromatic aberration particularly in a case of a high zoom or a wide angle while achieving the heat resistance when the brightness is increased. It is preferable that Abbe number vn of at least one negative lens is smaller than 36.

Moreover, in the present exemplary embodiment, at least four positive lenses may satisfy following condition (11). In projection lens system PL1 of the first example, as illustrated in FIG. 4, five lens elements, that is, eighth lens L8, tenth lens element L10, fourteenth lens element L14, sixteenth lens element L16, and eighteenth lens element L18 satisfy condition (11).

Condition (11) is expressed by the following inequality.

$$dn/dt < -4.5 \times 10^{-6} \quad (11)$$

Here, dn/dt indicates the temperature coefficient of the relative refractive index of the lens material of the positive lens at room temperature, as in condition (7).

According to condition (11), the influence of a change in shape due to a local temperature change and the influence of a change in refractive index are offset, and four or more positive lenses that are hardly affected by the influence of heat are incorporated in projection lens system PL1. Consequently, the stability of the performance of projection lens system PL1 can be improved, and the chromatic aberration can be successfully corrected.

3-3. Second Example

The measures for high brightness described above can be implemented not only in projection lens system PL1 of the first example but also in any projection lens system. Projection lens system PL2 of a second example will be described with reference to FIGS. 5 to 7.

Figure 5:
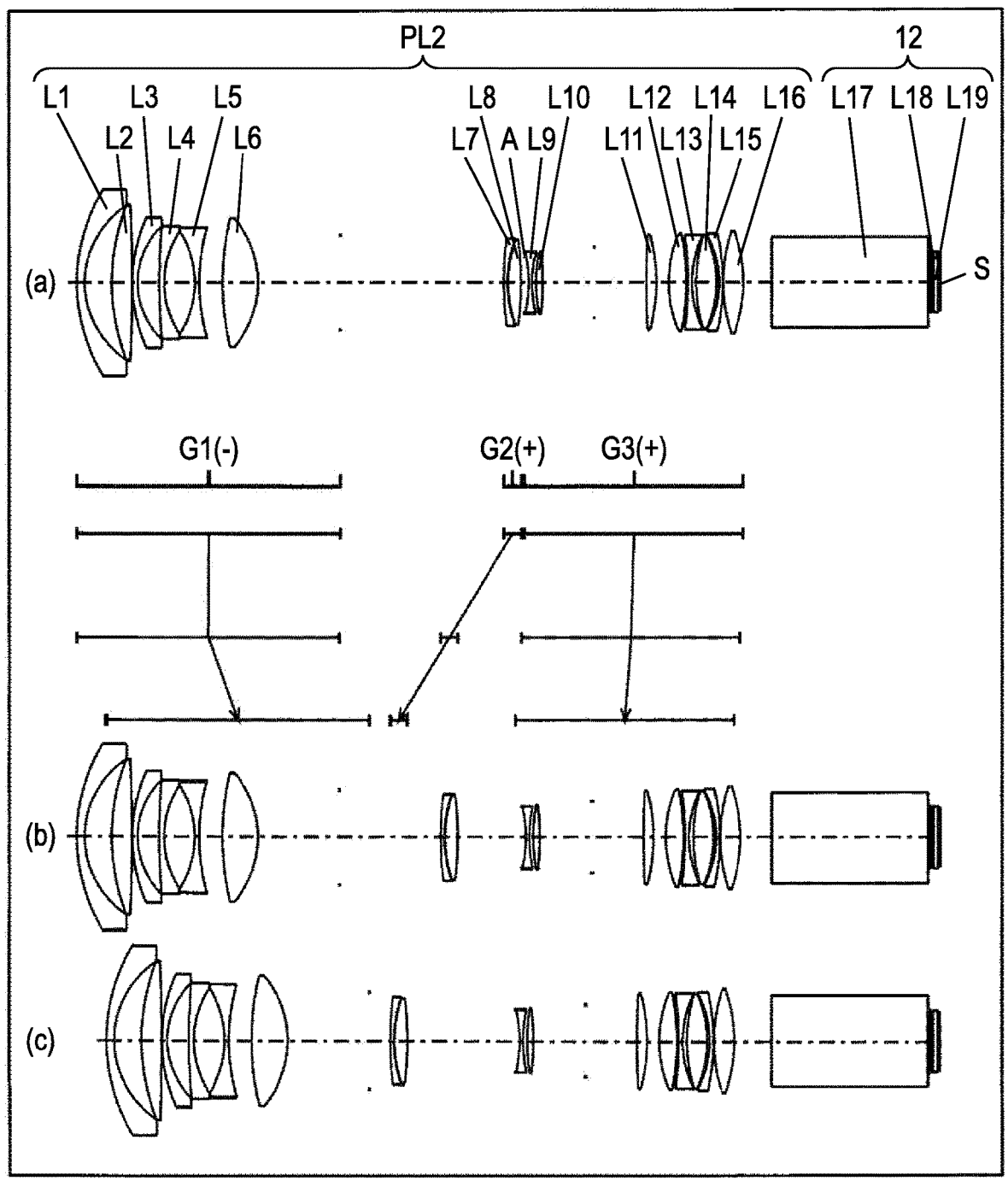
FIG. 5 is a lens arrangement diagram in various states of a projection lens system according to a second example.

FIG. 5 is a lens arrangement diagram in various states of projection lens system PL2 according to the second example. FIGS. 5(a), 5(b), 5(c) are lens arrangement diagrams at the wide-angle end, the intermediate position, and the telephoto end of projection lens system PL2, respectively, similarly to FIGS. 2(a) to 2(c).

Projection lens system PL2 of the second example includes 16 lens elements L1 to L16. In projection lens system PL2, first to sixteenth lens elements L1 to L16 are arranged in order from the magnification side to the reduction side, as in the first example. Projection lens system PL2 of the second example includes three lens groups G1 to G3 to constitute a zoom lens system, as in the first example. FIGS. 5(a) to 5(c) illustrate back glasses L17 to L19 as an example of transmission optical system 12.

In projection lens system PL2 of the second example, first lens group G1 includes first to sixth lens elements L1 to L6, and has a negative power. First lens element L1 has a negative meniscus shape, and its convex surface faces the magnification side. Second lens element L2 has a biconvex shape. Third lens element L3 has a negative meniscus shape, and its convex surface faces the magnification side. Fourth lens element L4 has a negative meniscus shape, and its convex surface faces the magnification side. Fifth lens element L5 has a biconcave shape. Sixth lens element L6 has a biconvex shape.

Second lens group G2 includes seventh and eighth lens elements L7, L8, and has a positive power. Seventh lens element L7 has a negative meniscus shape, and its convex surface faces the magnification side. Eighth lens element L8 has a biconvex shape. Seventh lens element L7 and eighth lens element L8 are bonded to each other.

Third lens group G3 includes ninth to sixteenth lens elements L9 to L16, and has a positive power. Diaphragm A is disposed on the magnification side of ninth lens element L9. Ninth lens element L9 has a biconcave shape. Tenth lens element L10 has a biconvex shape. Eleventh lens element L11 has a biconvex shape. Twelfth lens element L12 has a biconvex shape. Thirteenth lens element L13 has a biconcave shape. Fourteenth lens element L14 has a biconvex shape. Fifteenth lens element L15 has a negative meniscus shape, and its convex surface faces the reduction side. Sixteenth lens element L16 has a biconvex shape.

Figure 6:
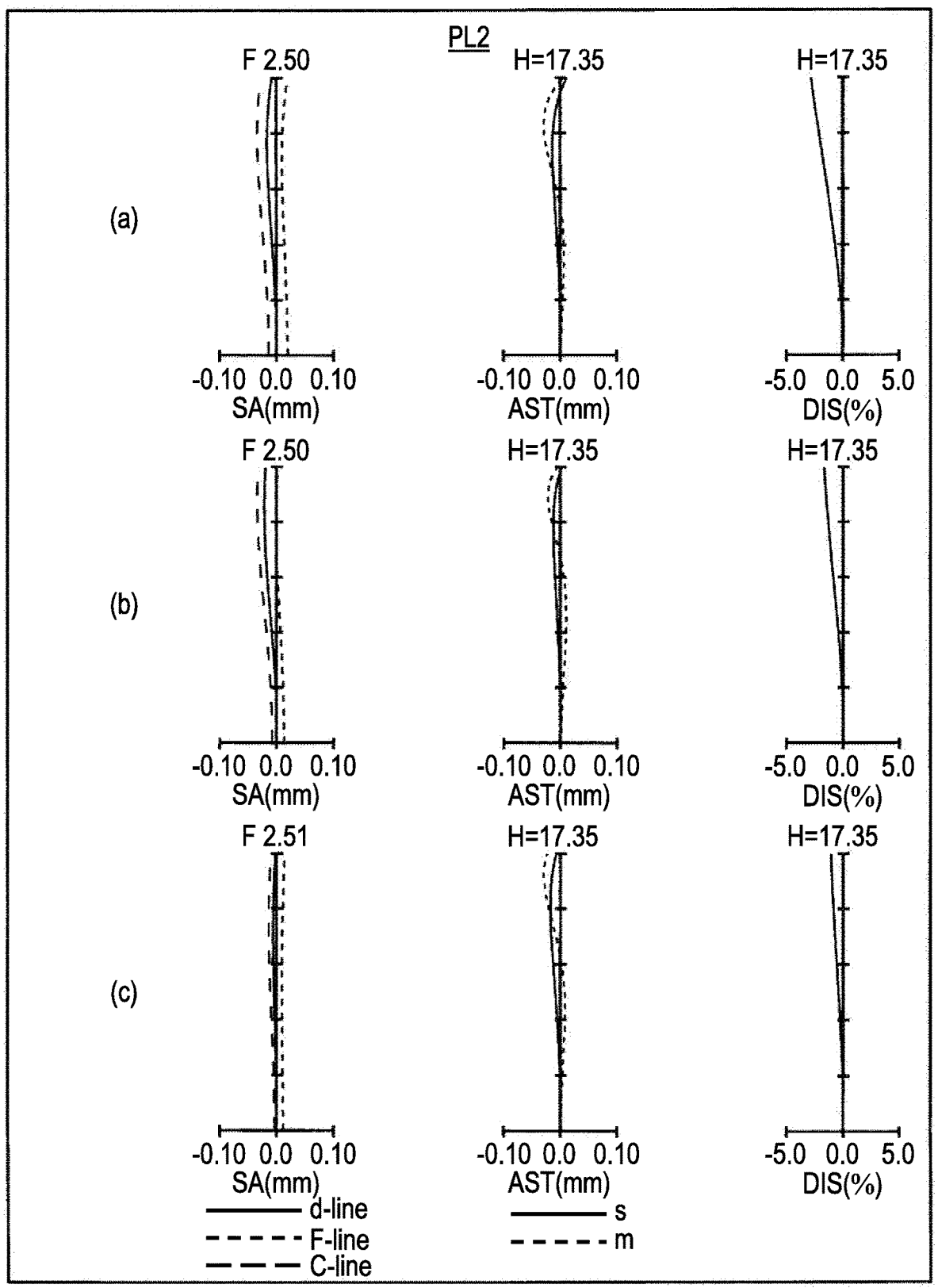
FIG. 6 is an aberration diagram illustrating longitudinal aberrations of the projection lens system according to the second example.

FIG. 6 is an aberration diagram illustrating longitudinal aberrations of projection lens system PL2 according to the second example. FIGS. 6(a), 6(b), 6(c) illustrate aberrations at the wide-angle end, the intermediate position, and the telephoto end of projection lens system PL2, respectively, similarly to FIGS. 3(a) to 3(c). The aberrations illustrated in FIGS. 6(a) to 6(c) are based on a second numerical example to be described later.

FIG. 7 illustrates sufficiency of conditions (1) to (11) in projection lens system PL2 according to the second example. The table illustrated in FIG. 7 shows a correspondence between each of conditions (1) to (11) and each of lens elements L1 to L16 in projection lens system PL2 of the second example, as in the first example. Projection lens system PL2 of the second embodiment can also improve the image quality of projection image 20 when the brightness of image projection device 1 is increased.

3-4. Third Example

Projection lens system PL3 of a third example will be described with reference to FIGS. 8 to 10.

Figure 8:
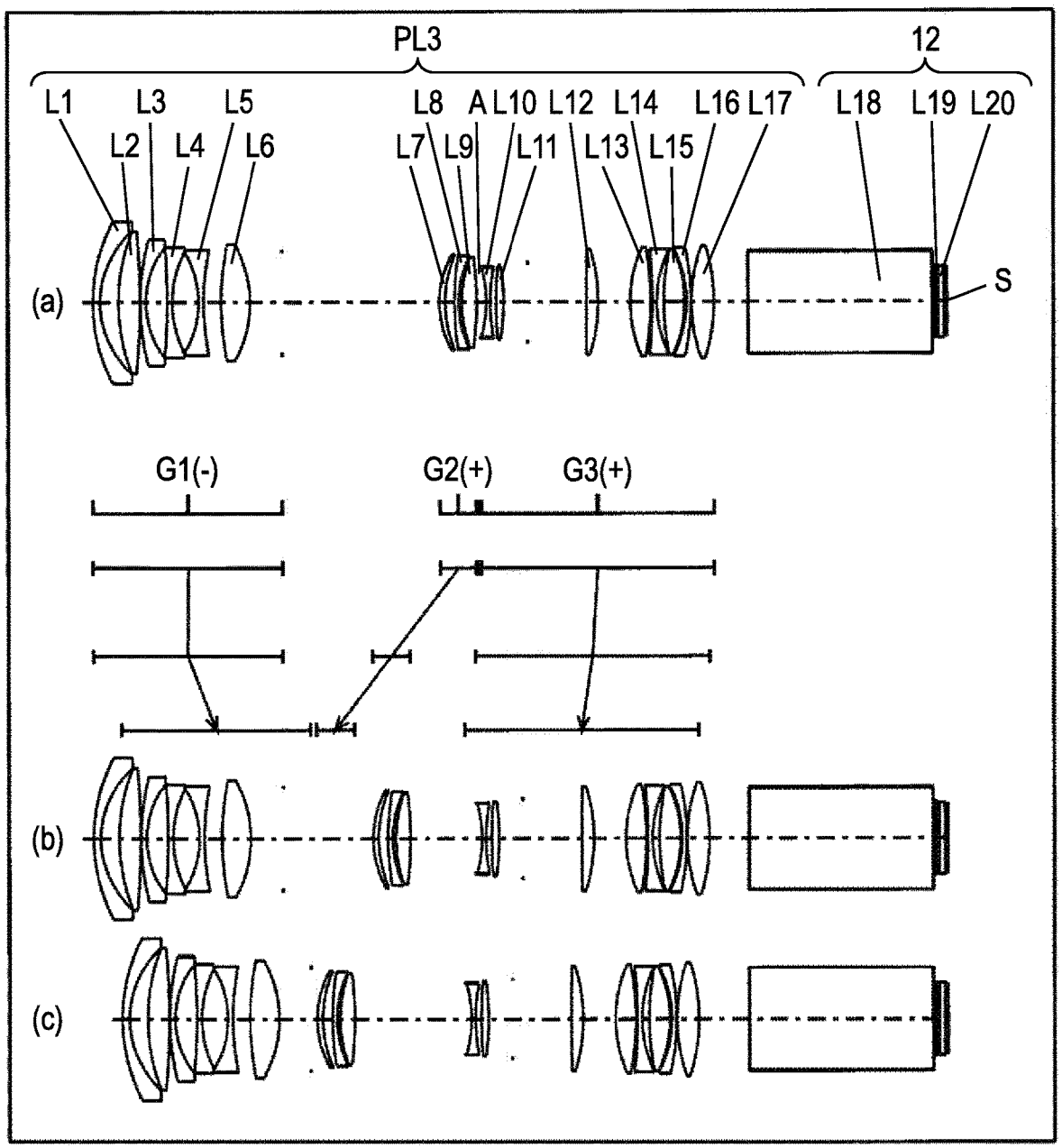
FIG. 8 is a lens arrangement diagram in various states of a projection lens system according to a third example.

FIG. 8 is a lens arrangement diagram in various states of projection lens system PL3 according to the third example. FIGS. 8(a), 8(b), 8(c) are lens arrangement diagrams at the wide-angle end, the intermediate position, and the telephoto end of projection lens system PL3, respectively, similarly to FIGS. 2(a) to 2(c).

Projection lens system PL3 of the third example includes 17 lens elements L1 to L17. In projection lens system PL3, first to seventeenth lens elements L1 to L17 are arranged in order from the magnification side to the reduction side, as in the first example. Projection lens system PL3 of the third example includes three lens groups G1 to G3 to constitute a zoom lens system, as in the first example. FIGS. 8(a) to 8(c) illustrate back glasses L18 to L20 as an example of transmission optical system 12.

In projection lens system PL3 of the third example, first lens group G1 includes first to sixth lens elements L1 to L6, and has a negative power. First lens element L1 has a negative meniscus shape, and its convex surface faces the magnification side. Second lens element L2 has a biconvex shape. Third lens element L3 has a negative meniscus shape, and its convex surface faces the magnification side. Fourth lens element L4 has a biconcave shape. Fifth lens element L5 has a biconcave shape. Sixth lens element L6 has a biconvex shape.

Second lens group G2 includes seventh to ninth lens elements L7 to L9, and has a positive power. Seventh lens element L7 has a positive meniscus shape, and its convex surface faces the magnification side. Eighth lens element L8 has a negative meniscus shape, and its convex surface faces the magnification side. Ninth lens element L9 has a biconvex shape.

Third lens group G3 includes tenth to seventeenth lens elements L10 to L17, and has a positive power. Diaphragm A is disposed on the magnification side of tenth lens element L10. Tenth lens element L10 has a biconcave shape. Eleventh lens element L11 has a biconvex shape. Twelfth lens element L12 has a biconvex shape. Thirteenth lens element L13 has a biconvex shape. Fourteenth lens element L14 has a biconcave shape. Fifteenth lens element L15 has a biconvex shape. Sixteenth lens element L16 has a negative meniscus shape, and its convex surface faces the reduction side. Seventeenth lens element L17 has a biconvex shape.

Figure 9:
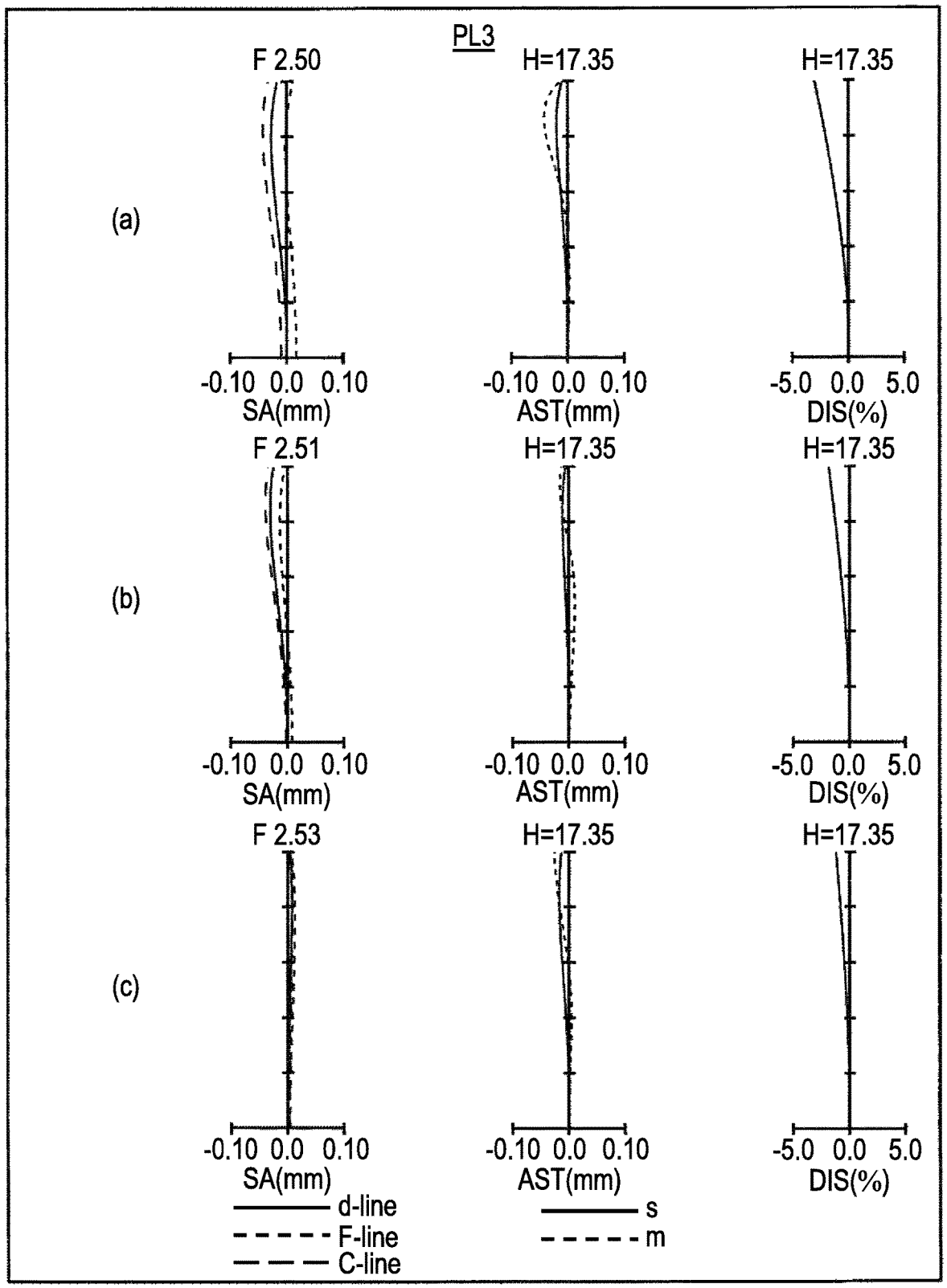
FIG. 9 is an aberration diagram illustrating longitudinal aberrations of the projection lens system according to the third example.

FIG. 9 is an aberration diagram illustrating longitudinal aberrations of projection lens system PL3 according to the third example. FIGS. 9(a), 9(b), 9(c) illustrate aberrations at the wide-angle end, the intermediate position, and the telephoto end of projection lens system PL3, respectively, similarly to FIGS. 3(a) to 3(c). The aberrations illustrated in FIGS. 9(a) to 9(c) are based on a third numerical example to be described later.

FIG. 10 illustrates sufficiency of conditions (1) to (11) in projection lens system PL3 according to the third example. The table illustrated in FIG. 10 shows a correspondence between each of conditions (1) to (11) and each of lens elements L1 to L17 in projection lens system PL3 of the third example, as in the first example. Projection lens system PL3 of the third example can also improve the image quality of projection image 20 when the brightness of image projection device 1 is increased.

3-5. About First to Third Examples

Projection lens systems PL1 to PL3 of the first to third examples described above can project image 2 on the reduction side in image projection device 1 to the magnification side as projection image 20. Projection lens systems PL1 to PL3 constitute a zoom lens system including diaphragm A and a plurality of lens groups G1 to G3. Lens group G1 closest to the magnification side in lens groups G1 to G3 has a negative power. Negative-lead projection lens systems PL1 to PL3 satisfy following condition (12) in the present exemplary embodiment.

Condition (12) is expressed by the following inequality.

$$2 < fr/fw < 4.5 \quad (12)$$

Here, fr indicates the focal length at the wide-angle end on the reduction side of diaphragm A. Condition (12) defines above-described ratio fr/fw of focal length fr to focal length fw at the wide-angle end of a whole system.

Specifically, fr/fw=3.32 is satisfied in projection lens system PL1 of the first example. In projection lens system PL2 of the second example, fr/fw=3.73 is satisfied. In projection lens system PL3 of the third example, fr/fw=2.74 is satisfied.

According to condition (12), the performance of projection lens systems PL1 to PL3 constituting the negative-lead zoom lens system can be successfully achieved. If the ratio exceeds the upper limit value of condition (12), it becomes difficult to maintain the telecentricity on the reduction side while keeping a long back focus. If the ratio is less than the lower limit value of condition (12), it becomes difficult to correct the aberration, and the image quality of projection image 20 projected on the magnification side may be degraded. Ratio fr/fw is preferably larger than 2.5 and less than 4.0.

Second Exemplary Embodiment

A second exemplary embodiment will be described below with reference to the drawings. While the first exemplary embodiment has described an example in which projection lens system PL constitutes a zoom lens system, projection lens system PL is not limited to the zoom lens system. The second exemplary embodiment will describe projection lens system PL configured to form an intermediate image therein.

Hereinafter, description of configurations and operations similar to those of image projection device 1 and projection lens system PL according to the first exemplary embodiment will be appropriately omitted, and fourth to sixth examples will be described as examples of projection lens system PL according to the present exemplary embodiment.

1. Fourth Example

Projection lens system PL4 according to a fourth example of the present disclosure will be described with reference to FIGS. 11 to 14.

Figure 11:
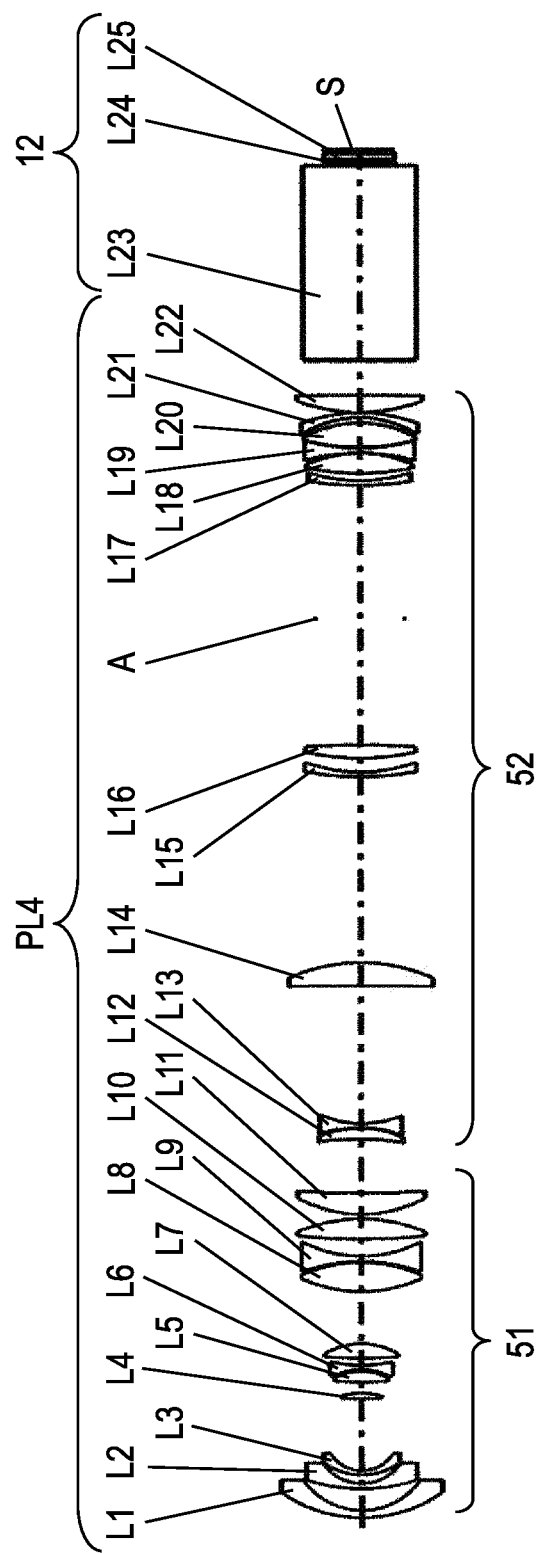
FIG. 11 is a lens arrangement diagram of a projection lens system according to a fourth example.
Figure 12:
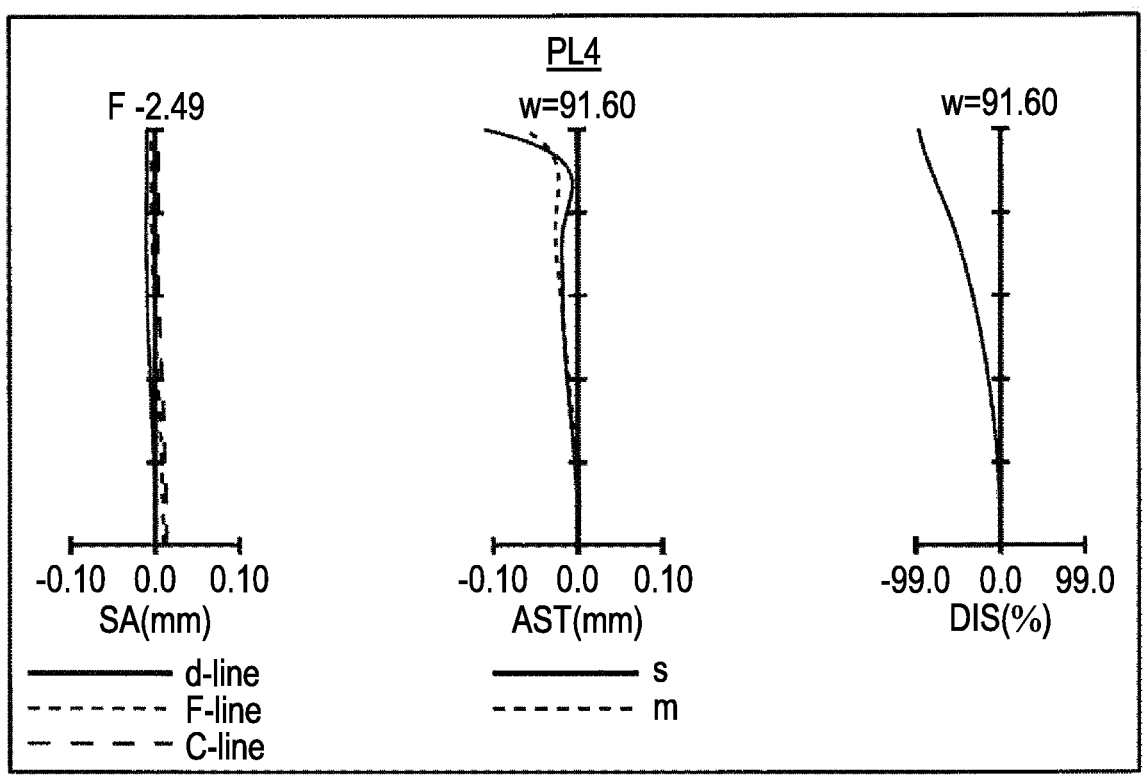
FIG. 12 is an aberration diagram illustrating longitudinal aberrations of the projection lens system according to the fourth example.

FIG. 11 is a lens arrangement diagram of projection lens system PL4 according to the fourth example. FIG. 12 is an aberration diagram illustrating longitudinal aberrations of projection lens system PL4 according to the fourth example. The aberration diagram of the present exemplary embodiment includes a spherical aberration diagram, an astigmatism diagram, and a distortion aberration diagram in this order from the left side of the figure, as in the first exemplary embodiment. In the astigmatism diagram and the distortion aberration diagram according to the present exemplary embodiment, vertical axis "w" indicates a half angle of field.

FIGS. 11, 12 illustrate the arrangement of various lenses and various aberrations, respectively in a focused state where the projection distance of projection lens system PL4 according to the fourth example is 4,000 mm. A fourth numerical example corresponding to projection lens system PL4 of the fourth example will be described later.

As illustrated in FIG. 11, projection lens system PL4 of the fourth example includes 22 lens elements L1 to L22. In the present exemplary embodiment, first to twenty-second lens elements L1 to L22 in projection lens system PL4 are arranged in order from the magnification side to the reduction side, as in the first exemplary embodiment. Further, FIG. 11 also illustrates back glasses L23 to L25 as an example of transmission optical system 12.

In the present exemplary embodiment, first to twenty-second lens elements L1 to L22 in projection lens system PL4 constitute magnification optical system 51 and relay optical system 52. Magnification optical system 51 is located closer to the magnification side than relay optical system 52 is.

Magnification optical system 51 includes first to eleventh lens elements L1 to L11, and has a positive power. First lens element L1 has a negative meniscus shape, and its convex surface faces the magnification side. Second lens element L2 has a negative meniscus shape, and its convex surface faces the magnification side. Third lens element L3 has a negative meniscus shape, and its convex surface faces the magnification side.

Fourth lens element L4 has a biconvex shape. Fifth lens element L5 has a biconvex shape. Sixth lens element L6 has a biconcave shape. Fifth lens element L5 and sixth lens element L6 are bonded to each other. Seventh lens element L7 has a biconvex shape.

Eighth lens element L8 has a biconvex shape. Ninth lens element L9 has a biconcave shape. Eighth lens element L8 and ninth lens element L9 are bonded to each other. Tenth lens element L10 has a biconvex shape. Eleventh lens element L11 has a positive meniscus shape, and its convex surface faces the magnification side.

Relay optical system 52 includes twelfth to twenty-second lens elements L12 to L22, and has a positive power. Twelfth lens element L12 has a positive meniscus shape, and its convex surface faces the reduction side. Thirteenth lens element L13 has a biconcave shape. Twelfth lens element L12 and thirteenth lens element L13 are bonded to each other. Fourteenth lens element L14 has a positive meniscus shape, and its convex surface faces the reduction side. Fifteenth lens element L15 has a negative meniscus shape, and its convex surface faces the magnification side. Sixteenth lens element L16 has a biconvex shape. Diaphragm A is disposed between sixteenth lens element L16 and seventeenth lens element L17.

Seventeenth lens element L17 has a negative meniscus shape, and its convex surface faces the magnification side. Eighteenth lens element L18 has a biconvex shape. Nineteenth lens element L19 has a biconcave shape. Twentieth lens element L20 has a biconvex shape. Nineteenth lens element L19 and twentieth lens element L20 are bonded to each other. Twenty-first lens element L21 has a negative meniscus shape, and its convex surface faces the reduction side. Twenty-second lens element L22 has a biconvex shape.

Figure 13:
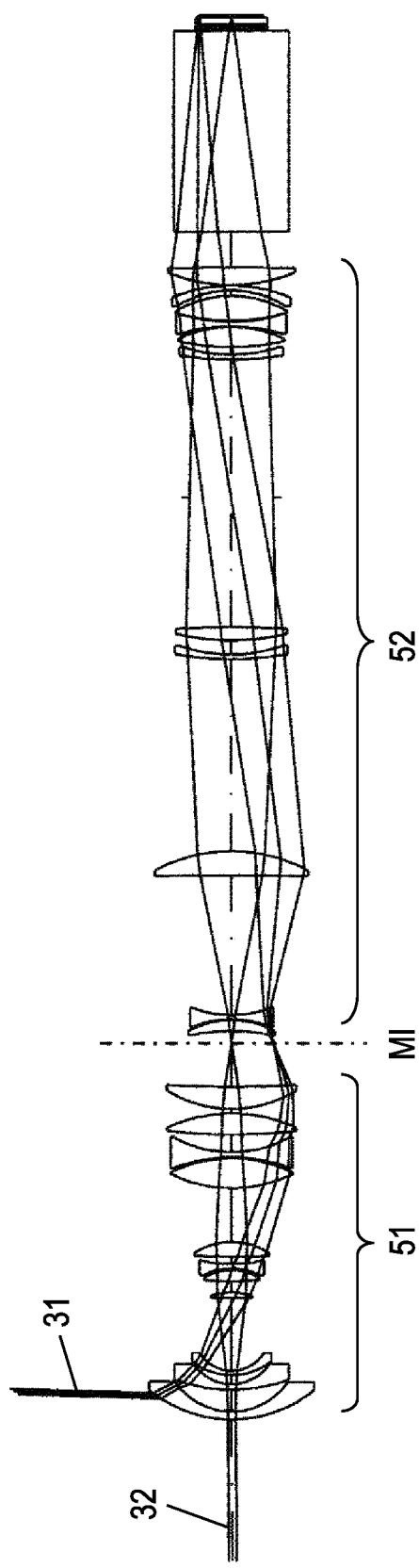
FIG. 13 is an optical path diagram illustrating an optical path of a ray in the projection lens system according to the fourth example.

FIG. 13 is an optical path diagram illustrating an optical path of a ray in projection lens system PL4 according to the fourth example. In the present exemplary embodiment, projection lens system PL4 includes intermediate imaging position MI between magnification optical system 51 and relay optical system 52. Projection lens system PL4 forms an image at intermediate imaging position MI that is conjugate with a reduction conjugate point on image plane S with relay optical system 52 on the reduction side interposed between intermediate imaging position MI and the reduction conjugate point. Further, imaging at intermediate imaging position MI of projection lens system PL4 is performed such that intermediate imaging position MI is conjugate with a magnification conjugate point located at a projection position of screen 4 or the like with magnification optical system 51 on the magnification side interposed between intermediate imaging position MI and the magnification conjugate point.

According to projection optical system PL4 of the present exemplary embodiment, as illustrated in FIG. 13, an angle between most off-axis principal ray 31 and axial ray 32 reaches near a right angle on the magnification side, and thus a wide angle of view of projection image 20 can be achieved.

FIG. 14 illustrates sufficiency of conditions (1) to (11) in projection lens system PL4 according to the fourth example. The table illustrated in FIG. 14 shows a correspondence between each of conditions (1) to (11) and each of lens elements L1 to L22 in projection lens system PL4 of the fourth example, as in the first exemplary embodiment. Projection lens system PL4 of the fourth example can also improve the image quality when the brightness is increased.

2. Fifth Example

Projection lens system PL5 of a fifth example will be described with reference to FIGS. 15 to 18.

Figure 15:
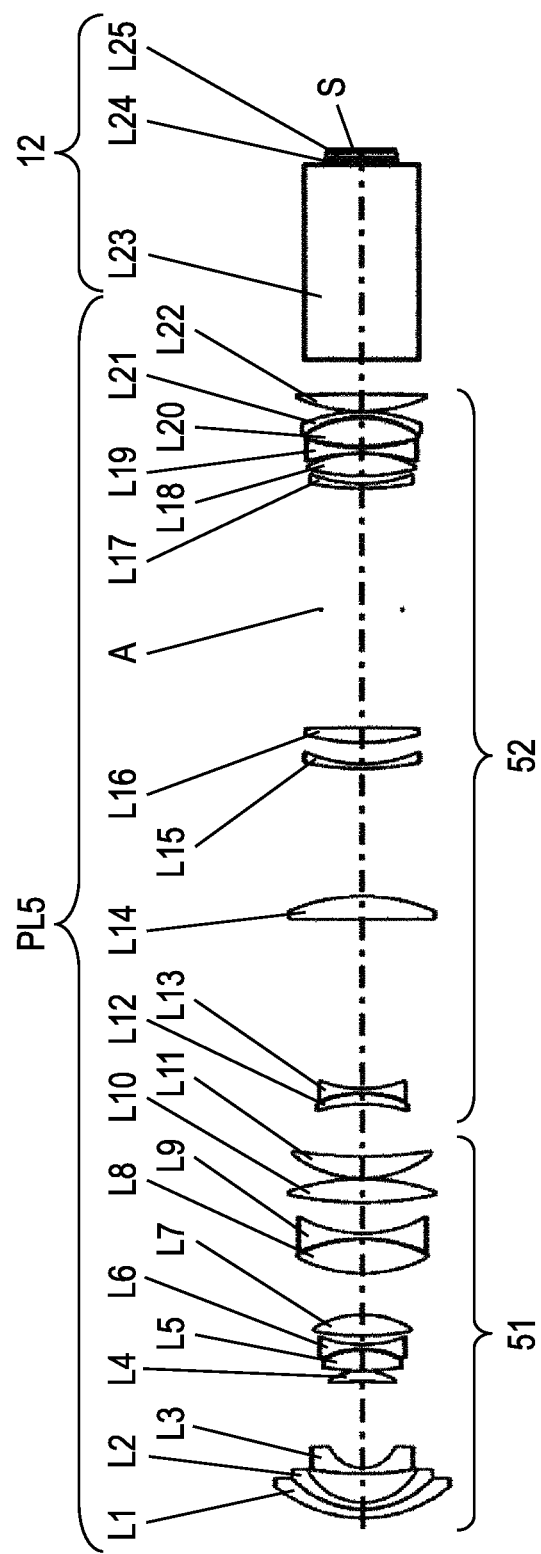
FIG. 15 is a lens arrangement diagram of a projection lens system according to a fifth example.
Figure 16:
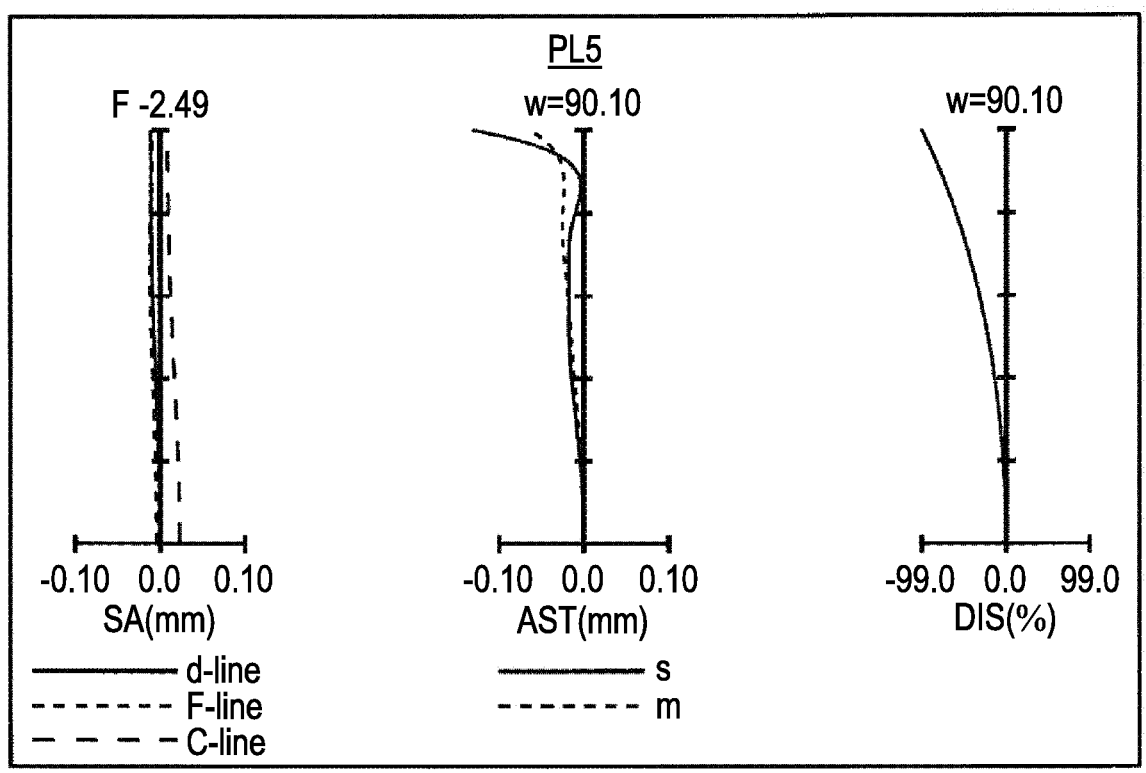
FIG. 16 is an aberration diagram illustrating longitudinal aberrations of the projection lens system according to the fifth example.

FIG. 15 is a lens arrangement diagram of projection lens system PL5 according to the fifth example. FIG. 16 is an aberration diagram illustrating longitudinal aberrations of projection lens system PL5. FIGS. 15, 16 illustrate the arrangement of various lenses and various aberrations, respectively in a focused state where the projection distance of projection lens system PL5 according to the fifth example is 4,000 mm. A fifth numerical example corresponding to projection lens system PL5 of the fifth example will be described later.

Figure 17:
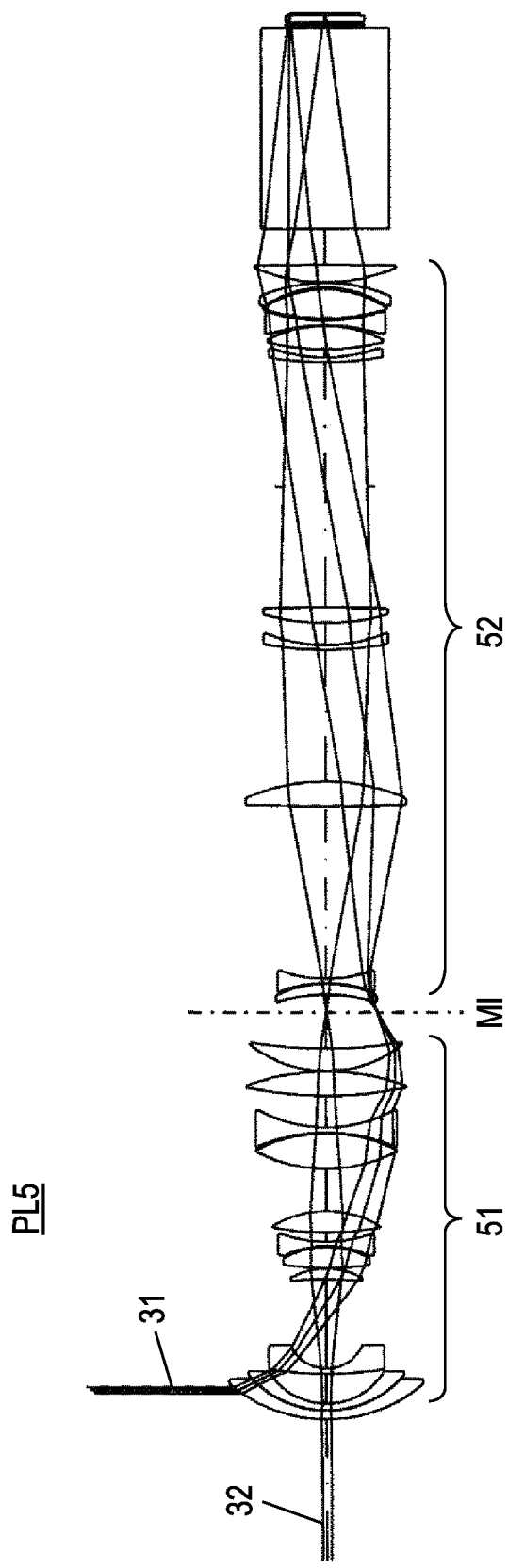
FIG. 17 is an optical path diagram illustrating an optical path of a ray in the projection lens system according to the fifth example.

FIG. 17 illustrates an optical path of a ray in projection lens system PL5 according to the fifth example. Projection lens system PL5 of the fifth example includes magnification optical system 51 closer to the magnification side than intermediate imaging position MI is, and relay optical system 52 closer to the reduction side than intermediate imaging position MI is, as in the fourth example.

In the fifth example, magnification optical system 51 includes first to eleventh lens elements L1 to L11, and has a positive power. First lens element L1 has a negative meniscus shape, and its convex surface faces the magnification side. Second lens element L2 has a negative meniscus shape, and its convex surface faces the magnification side. First lens element L1 and second lens element L2 are bonded to each other. Third lens element L3 has a negative meniscus shape, and its convex surface faces the magnification side.

Fourth lens element L4 has a positive meniscus shape, and its convex surface faces the reduction side. Fifth lens element L5 has a biconvex shape. Sixth lens element L6 has a biconcave shape. Fifth lens element L5 and sixth lens element L6 are bonded to each other. Seventh lens element L7 has a biconvex shape.

Eighth lens element L8 has a biconvex shape. Ninth lens element L9 has a biconcave shape. Eighth lens element L8 and ninth lens element L9 are bonded to each other. Tenth lens element L10 has a biconvex shape. Eleventh lens element L11 has a positive meniscus shape, and its convex surface faces the magnification side.

Relay optical system 52 includes twelfth to twenty-second lens elements L12 to L22, and has a positive power. Twelfth lens element L12 has a positive meniscus shape, and its convex surface faces the reduction side. Thirteenth lens element L13 has a biconcave shape. Twelfth lens element L12 and thirteenth lens element L13 are bonded to each other. Fourteenth lens element L14 has a biconvex shape. Fifteenth lens element L15 has a negative meniscus shape, and its convex surface faces the magnification side. Sixteenth lens element L16 has a biconvex shape. Diaphragm A is disposed between sixteenth lens element L16 and seventeenth lens element L17.

Seventeenth lens element L17 has a negative meniscus shape, and its convex surface faces the magnification side. Eighteenth lens element L18 has a biconvex shape. Nineteenth lens element L19 has a biconcave shape. Twentieth lens element L20 has a biconvex shape. Nineteenth lens element L19 and twentieth lens element L20 are bonded to each other. Twenty-first lens element L21 has a negative meniscus shape, and its convex surface faces the reduction side. Twenty-second lens element L22 has a biconvex shape.

FIG. 18 illustrates sufficiency of conditions (1) to (11) in projection lens system PL5 according to the fifth example. The table illustrated in FIG. 18 shows a correspondence between each of conditions (1) to (11) and each of lens elements L1 to L22 in projection lens system PL5 of the fifth example, as in the first exemplary embodiment. Projection lens system PL5 of the fifth example can also improve the image quality when the brightness is increased.

3. Sixth Example

Projection lens system PL6 of a sixth example will be described with reference to FIGS. 19 to 22.

Figure 19:
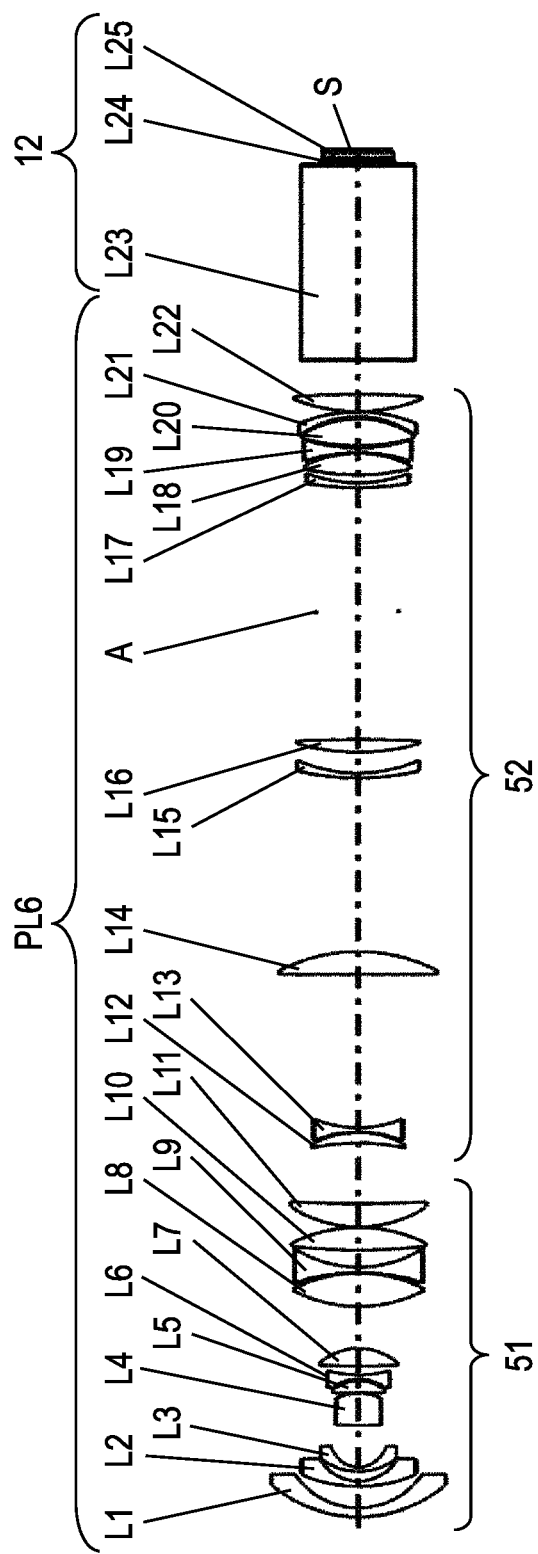
FIG. 19 is a lens arrangement diagram of a projection lens system according to a sixth example.
Figure 20:
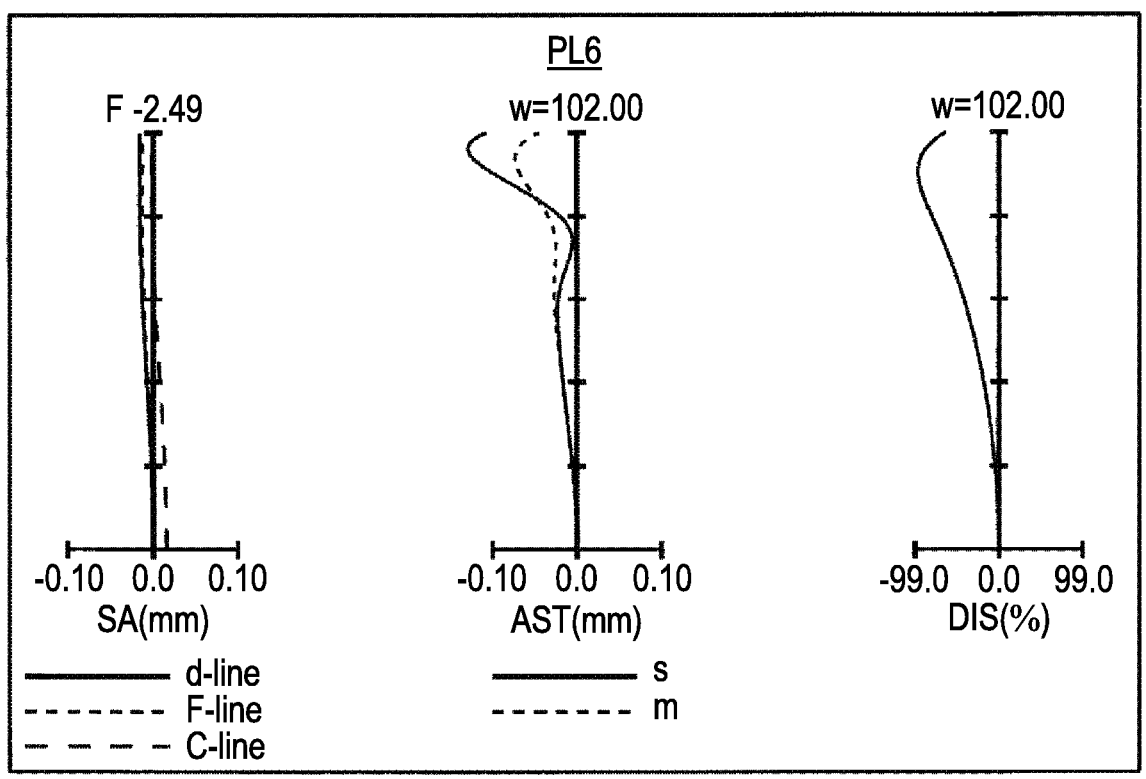
FIG. 20 is an aberration diagram illustrating longitudinal aberrations of the projection lens system according to the sixth example.

FIG. 19 is a lens arrangement diagram of projection lens system PL6 according to the sixth example. FIG. 20 is an aberration diagram illustrating longitudinal aberrations of projection lens system PL6. FIGS. 19, 20 illustrate the arrangement of various lenses and various aberrations, respectively in a focused state where the projection distance of projection lens system PL6 according to the sixth example is 4,000 mm. A sixth numerical example corresponding to projection lens system PL6 of the sixth example will be described later.

Figure 21:
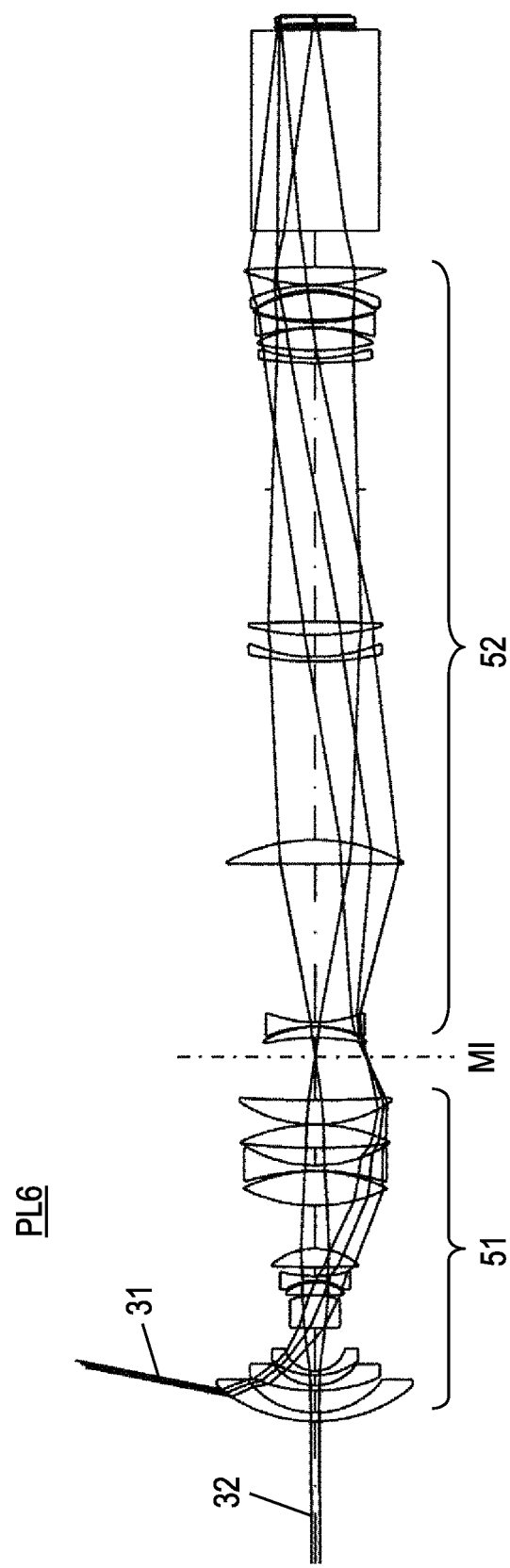
FIG. 21 is an optical path diagram illustrating an optical path of a ray in the projection lens system according to the sixth example.

FIG. 21 illustrates an optical path of a ray in projection lens system PL6 according to the sixth example. Projection lens system PL6 of the sixth example includes magnification optical system 51 closer to the magnification side than intermediate imaging position MI is, and relay optical system 52 closer to the reduction side than intermediate imaging position MI is, as in the fourth example.

In the sixth example, magnification optical system 51 includes first to eleventh lens elements L1 to L11, and has a positive power. First lens element L1 has a negative meniscus shape, and its convex surface faces the magnification side. Second lens element L2 has a negative meniscus shape, and its convex surface faces the magnification side. Third lens element L3 has a negative meniscus shape, and its convex surface faces the magnification side.

Fourth lens element L4 has a biconvex shape. Fifth lens element L5 has a positive meniscus shape, and its convex surface faces the reduction side. Sixth lens element L6 has a biconcave shape. Fifth lens element L5 and sixth lens element L6 are bonded to each other. Seventh lens element L7 has a biconvex shape.

Eighth lens element L8 has a biconvex shape. Ninth lens element L9 has a biconcave shape. Tenth lens element L10 has a biconvex shape. Eleventh lens element L11 has a positive meniscus shape, and its convex surface faces the magnification side.

Relay optical system 52 includes twelfth to twenty-second lens elements L12 to L22, and has a positive power. Twelfth lens element L12 has a positive meniscus shape, and its convex surface faces the reduction side. Thirteenth lens element L13 has a biconcave shape. Twelfth lens element L12 and thirteenth lens element L13 are bonded to each other. Fourteenth lens element L14 has a positive meniscus shape, and its convex surface faces the reduction side. Fifteenth lens element L15 has a negative meniscus shape, and its convex surface faces the magnification side. Sixteenth lens element L16 has a biconvex shape. Diaphragm A is disposed between sixteenth lens element L16 and seventeenth lens element L17.

Seventeenth lens element L17 has a negative meniscus shape, and its convex surface faces the magnification side. Eighteenth lens element L18 has a biconvex shape. Nineteenth lens element L19 has a biconcave shape. Twentieth lens element L20 has a biconvex shape. Nineteenth lens element L19, twentieth lens element L20, and twenty-first lens element L21 are bonded to each other. Twenty-first lens element L21 has a negative meniscus shape, and its convex surface faces the reduction side. Twenty-second lens element L22 has a biconvex shape.

FIG. 22 illustrates sufficiency of conditions (1) to (11) in projection lens system PL6 according to the sixth example. The table illustrated in FIG. 22 shows a correspondence between each of conditions (1) to (11) and each of lens elements L1 to L22 in projection lens system PL6 of the sixth example, as in the first exemplary embodiment. Projection lens system PL6 of the sixth example can also improve the image quality when the brightness is increased.

4. About Fourth to Sixth Examples

Projection lens systems PL4 to PL6 of the fourth to sixth examples described above include magnification optical system 51 and relay optical system 52 so as to have intermediate imaging position MI where imaging is performed inside the projection lens systems. In the present exemplary embodiment, projection lens systems PL4 to PL6 satisfy following condition (13).

Condition (13) is expressed by the following inequality.

$$8 < |fr/f| < 12 \quad (13)$$

Here, fr indicates the focal length on the reduction side of diaphragm A. f indicates the focal length of the whole system.

Specifically, fr/f=10.09 is satisfied in projection lens system PL4 of the fourth example. In projection lens system PL5 of the fifth example, fr/f=9.17 is satisfied. In projection lens system PL6 of the sixth example, fr/f=10.25 is satisfied.

According to condition (13), the performance of projection lens systems PL4 to PL6 having intermediate imaging position MI can be successfully achieved. If the ratio exceeds the upper limit value of condition (13), it becomes difficult to maintain the telecentricity on the reduction side while keeping a long back focus. If the ratio is less than the lower limit value of condition (13), it becomes difficult to correct the aberration, and the image quality of projection image 20 may be degraded. Ratio fr/f is preferably larger than 8.5 and less than 11.

Third Exemplary Embodiment

A third exemplary embodiment will be described below with reference to the drawings. While the first exemplary embodiment has described an example in which projection lens system PL is of a negative-lead type, projection lens system PL may be of a positive-lead type. In the positive-lead type, the lens group closest to the magnification side in a zoom lens system has a positive power. The third exemplary embodiment will describe projection lens system PL that constitutes a positive-lead zoom lens system.

Hereinafter, description of configurations and operations similar to those of image projection device 1 and projection lens system PL according to the first exemplary embodiment will be appropriately omitted, and seventh to ninth examples will be described as examples of projection lens system PL according to the present exemplary embodiment.

1. Seventh Example

Projection lens system PL7 according to a seventh example of the present disclosure will be described with reference to FIGS. 23 to 25.

Figure 23:
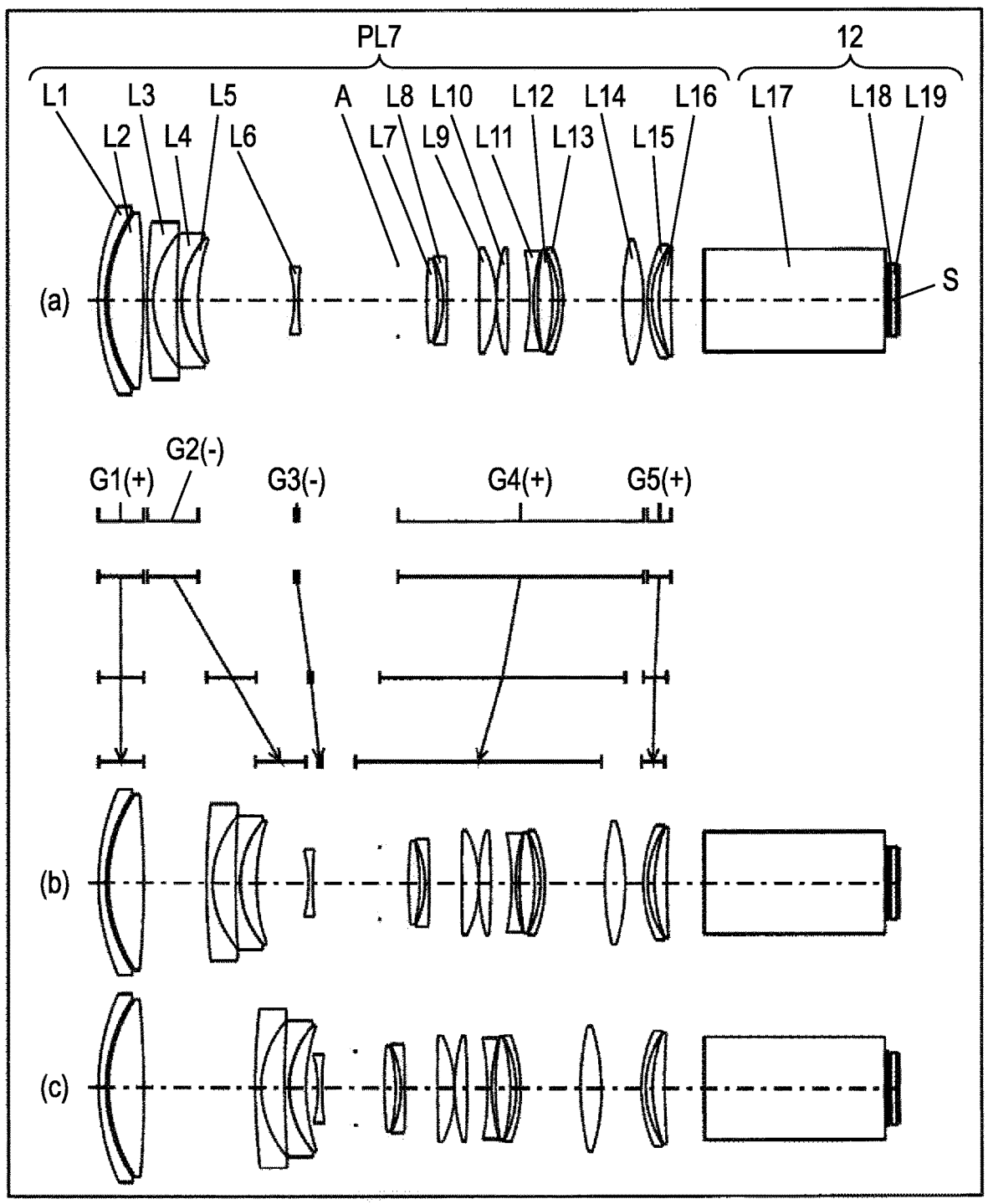
FIG. 23 is a lens arrangement diagram in various states of a projection lens system according to a seventh example.

FIG. 23 is a lens arrangement diagram in various states of projection lens system PL7 according to the seventh example. FIGS. 23(a), 23(b), 23(c) are lens arrangement diagrams at the wide-angle end, the intermediate position, and the telephoto end of projection lens system PL7, respectively, similarly to FIGS. 2(a) to 2(c).

Projection lens system PL7 of the seventh example includes 16 lens elements L1 to L16 constituting five lens groups G1 to G5. As illustrated in FIG. 23(a), first to fifth lens groups G1 to G5 are arranged in order from the magnification side to the reduction side of projection lens system PL7. In the present exemplary embodiment, projection lens system PL7 functions as a zoom lens system by moving each of first to fifth lens groups G1 to G5 along an optical axis during zooming, as in the first exemplary embodiment.

In projection lens system PL7, first to sixteenth lens elements L1 to L16 are arranged in order from the magnification side to the reduction side, as in the first exemplary embodiment. FIGS. 23(a) to 23(c) illustrate back glasses L17 to L19 as an example of transmission optical system 12.

In the projection lens system PL7 of the seventh example, first lens group G1 includes first and second lens elements L1, L2, and has a positive power. First lens element L1 has a negative meniscus shape, and its convex surface faces the magnification side. Second lens element L2 has a biconvex shape.

Second lens group G2 includes third to fifth lens elements L3 to L5, and has a negative power. Third lens element L3 has a negative meniscus shape, and its convex surface faces the magnification side. Fourth lens element L4 has a negative meniscus shape, and its convex surface faces the magnification side. Fifth lens element L5 has a positive meniscus shape, and its convex surface faces the magnification side. Fourth lens element L4 and fifth lens element L5 are bonded to each other.

Third lens group G3 includes sixth lens element L6, and has a negative power. Sixth lens element L6 has a biconcave shape.

Fourth lens group G4 includes seventh to fourteenth lens elements L7 to L14, and has a positive power. Diaphragm A is disposed on the magnification side of seventh lens element L7. Seventh lens element L7 has a biconvex shape. Eighth lens element L8 has a negative meniscus shape, and its convex surface faces the reduction side. Ninth lens element L9 has a biconvex shape. Tenth lens element L10 has a biconvex shape. Eleventh lens element L11 has a biconcave shape. Twelfth lens element L12 has a biconvex shape. Thirteenth lens element L13 has a negative meniscus shape, and its convex surface faces the reduction side. Fourteenth lens element L14 has a biconvex shape.

Fifth lens group G5 includes fifteenth and sixteenth lens elements L15, L16, and has a positive power. Fifteenth lens element L15 has a negative meniscus shape, and its convex surface faces the magnification side. Sixteenth lens element L16 has a positive meniscus shape, and its convex surface faces the magnification side.

Figure 24:
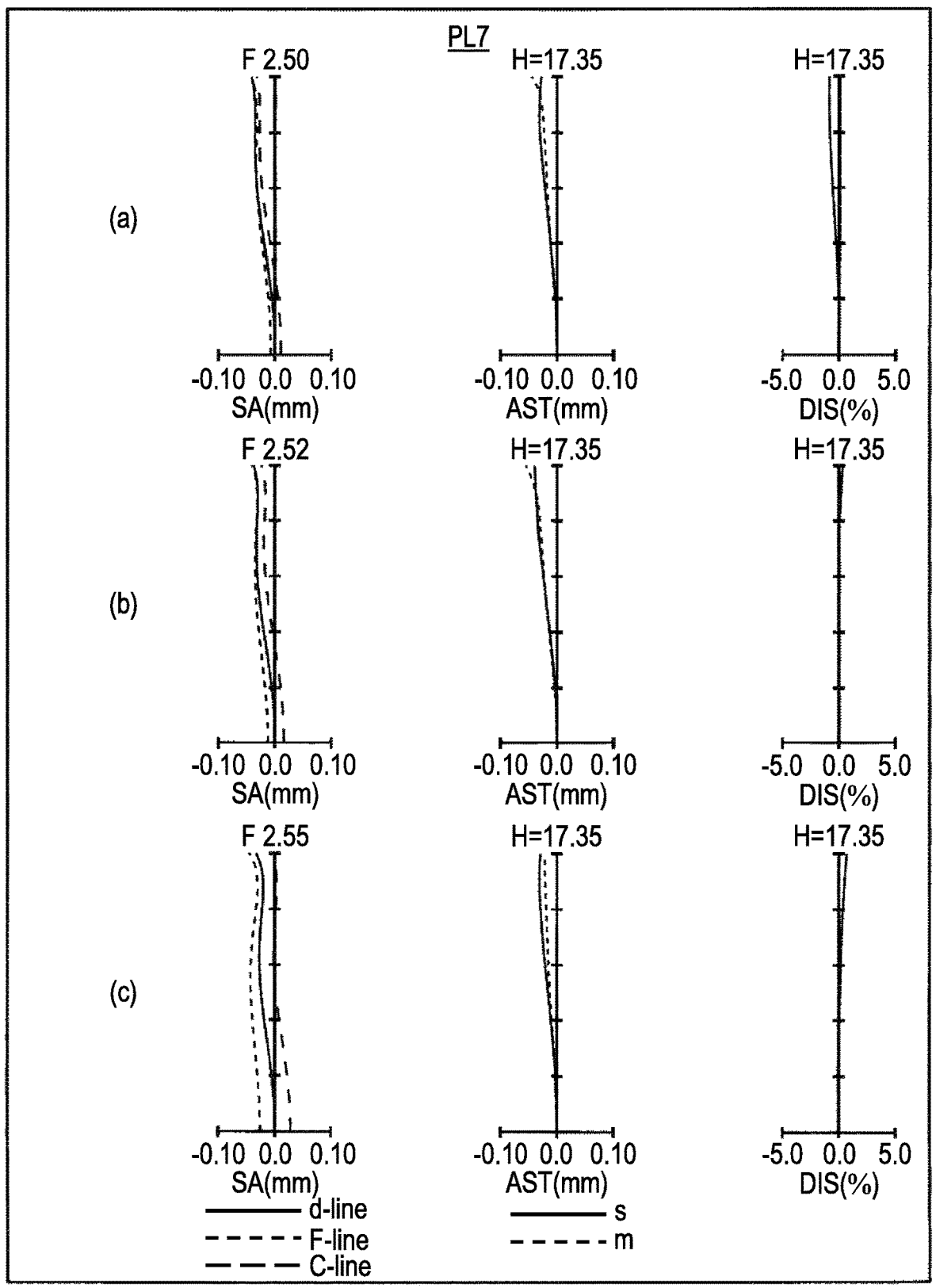
FIG. 24 is an aberration diagram illustrating longitudinal aberrations of the projection lens system according to the seventh example.

FIG. 24 is an aberration diagram illustrating longitudinal aberrations of projection lens system PL7 according to the seventh example. FIGS. 24(a), 24(b), 24(c) illustrate aberrations at the wide-angle end, the intermediate position, and the telephoto end of projection lens system PL7, respectively, similarly to FIGS. 3(a) to 3(c). The aberrations illustrated in FIGS. 24(a) to 24(c) are based on a seventh numerical example to be described later.

FIG. 25 illustrates sufficiency of conditions (1) to (11) in projection lens system PL7 according to the seventh example. The table illustrated in FIG. 25 shows a correspondence between each of conditions (1) to (11) and each of lens elements L1 to L16 in projection lens system PL7 of the seventh example, as in the first exemplary embodiment. Projection lens system PL7 of the seventh example can also improve the image quality when the brightness is increased.

2. Eighth Example

Projection lens system PL8 of an eighth example will be described with reference to FIGS. 26 to 28.

Figure 26:
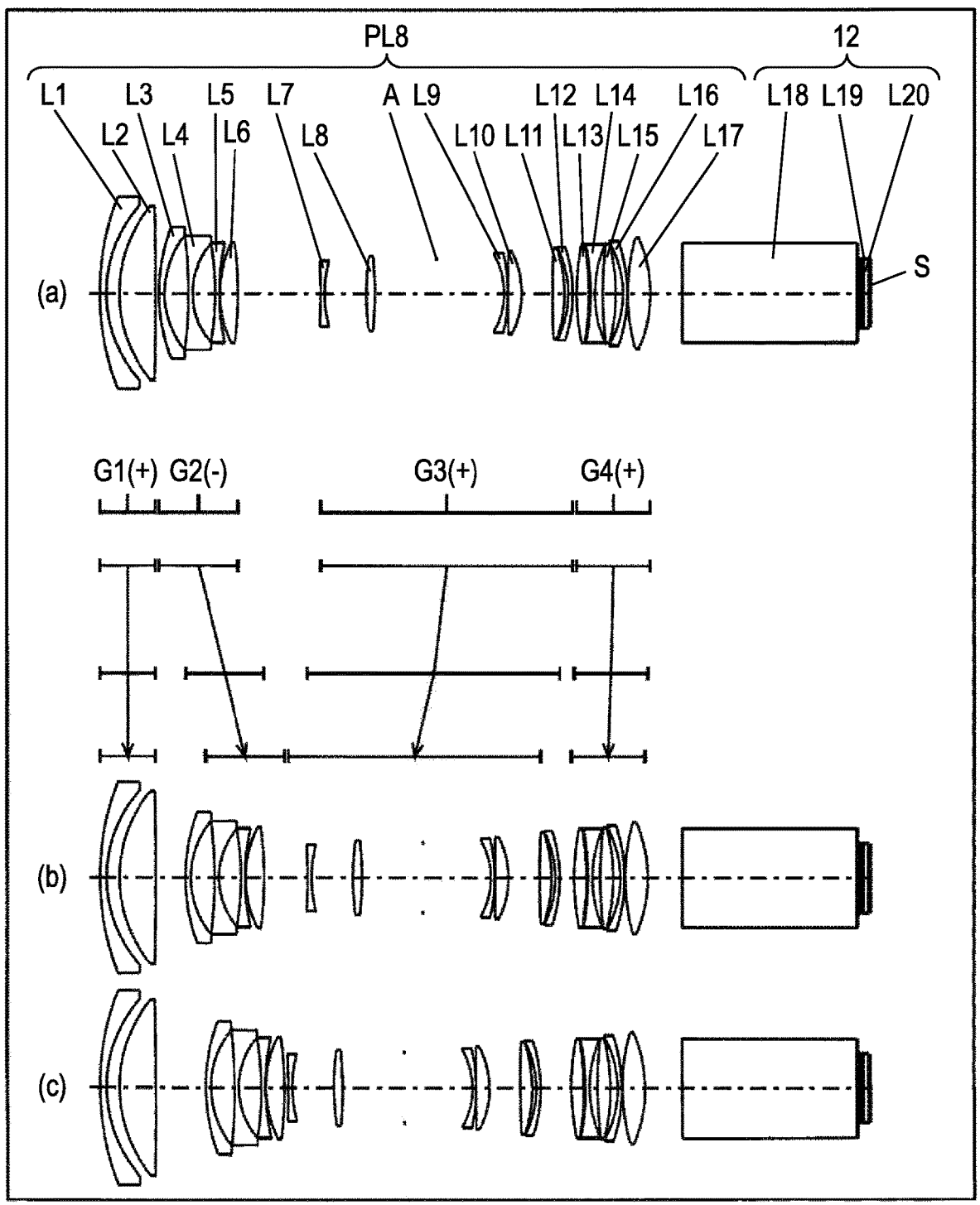
FIG. 26 is a lens arrangement diagram in various states of a projection lens system according to an eighth example.

FIG. 26 is a lens arrangement diagram in various states of projection lens system PL8 according to the eighth example. FIGS. 26(a), 26(b), 26(c) are lens arrangement diagrams at the wide-angle end, the intermediate position, and the telephoto end of projection lens system PL8, respectively, similarly to FIGS. 2(a) to 2(c).

Projection lens system PL8 of the eighth example includes four lens groups G1 to G4 to constitute a zoom lens system, as in the seventh example. Projection lens system PL8 of the eighth example includes 17 lens elements L1 to L17. In projection lens system PL8, first to fourth lens groups G1 to G4 and first to seventeenth lens elements L1 to L17 are arranged in order from the magnification side to the reduction side, as in the seventh example. FIGS. 26(a) to 26(c) illustrate back glasses L18 to L20 as an example of transmission optical system 12.

In projection lens system PL8 of the eighth example, first lens group G1 includes first and second lens elements L1, L2, and has a positive power. First lens element L1 has a negative meniscus shape, and its convex surface faces the magnification side. Second lens element L2 has a biconvex shape.

Second lens group G2 includes third to sixth lens elements L3 to L6, and has negative power. Third lens element L3 has a negative meniscus shape, and its convex surface faces the magnification side. Fourth lens element L4 has a biconcave shape. Fifth lens element L5 has a biconcave shape. Sixth lens element L6 has a biconvex shape.

Third lens group G3 includes seventh to twelfth lens elements L7 to L12, and has a positive power. Seventh lens element L7 has a biconcave shape. Eighth lens element L8 has a biconvex shape. Diaphragm A is disposed between eighth lens element L8 and ninth lens element L9. Ninth lens element L9 has a negative meniscus shape, and its convex surface faces the reduction side. Tenth lens element L10 has a biconvex shape. Eleventh lens element L11 has a biconvex shape. Twelfth lens element L12 has a negative meniscus shape, and its convex surface faces the reduction side.

Fourth lens group G4 includes thirteenth to seventeenth lens elements L13 to L17, and has a positive power. Thirteenth lens element L13 has a biconvex shape. Fourteenth lens element L14 has a biconcave shape. Thirteenth lens element L13 and fourteenth lens element L14 are bonded to each other. Fifteenth lens element L15 has a biconvex shape. Sixteenth lens element L16 has a negative meniscus shape, and its convex surface faces the reduction side. Seventeenth lens element L17 has a biconvex shape.

Figure 27:
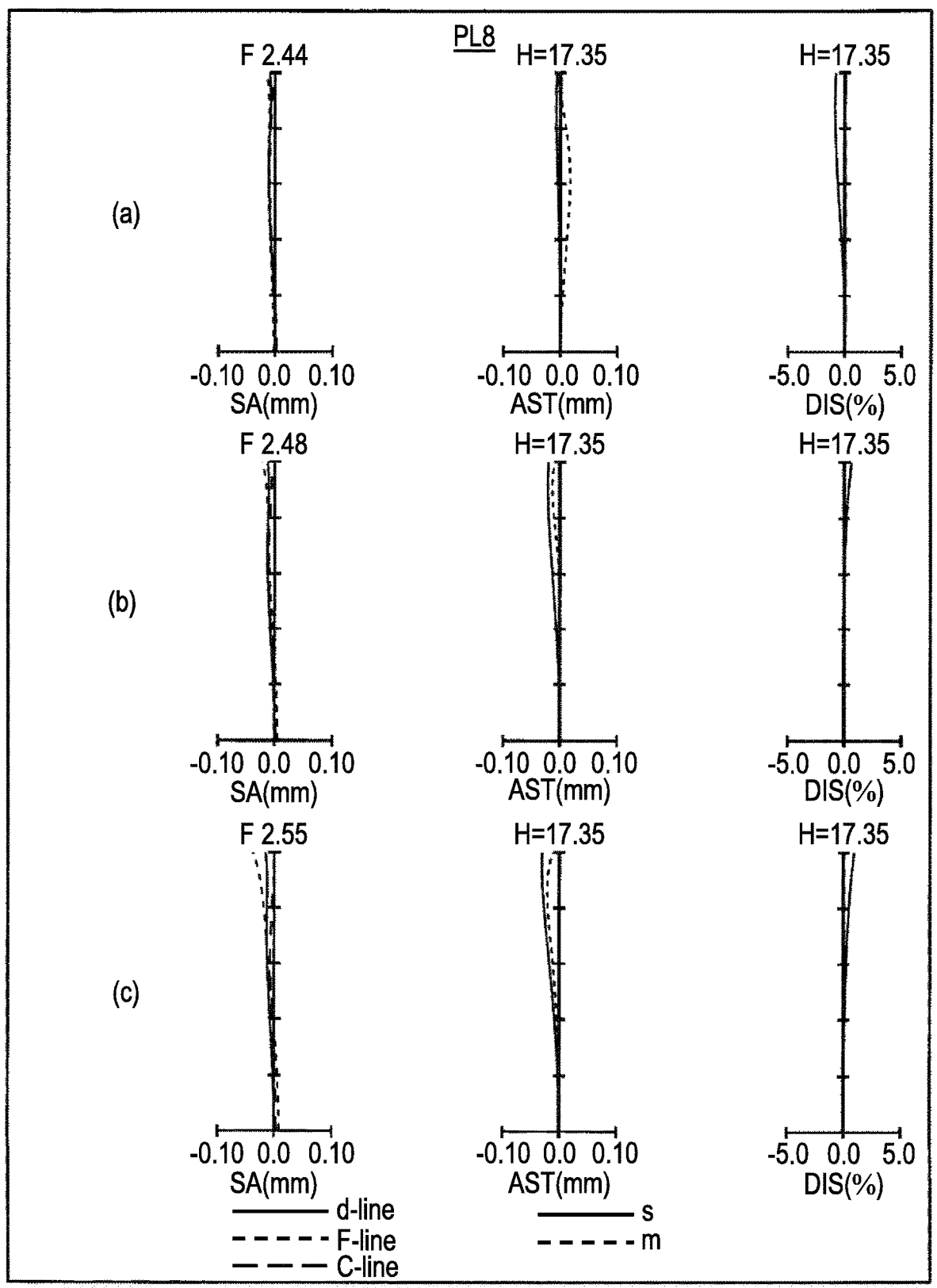
FIG. 27 is an aberration diagram illustrating longitudinal aberrations of the projection lens system according to the eighth example.

FIG. 27 is an aberration diagram illustrating longitudinal aberrations of projection lens system PL8 according to the eighth example. FIGS. 27(a), 27(b), 27(c) illustrate aberrations at the wide-angle end, the intermediate position, and the telephoto end of projection lens system PL8, respectively, similarly to FIGS. 3(a) to 3(c). The aberrations illustrated in FIGS. 27(a) to 27(c) are based on an eighth numerical example to be described later.

FIG. 28 illustrates sufficiency of conditions (1) to (11) in projection lens system PL8 according to the eighth example. The table illustrated in FIG. 28 shows a correspondence between each of conditions (1) to (11) and each of lens elements L1 to L17 in projection lens system PL8 of the eighth example, as in the first exemplary embodiment. Projection lens system PL8 of the eighth example can also improve the image quality when the brightness is increased.

3. Ninth Example

Projection lens system PL9 of a ninth example will be described with reference to FIGS. 29 to 31.

Figure 29:
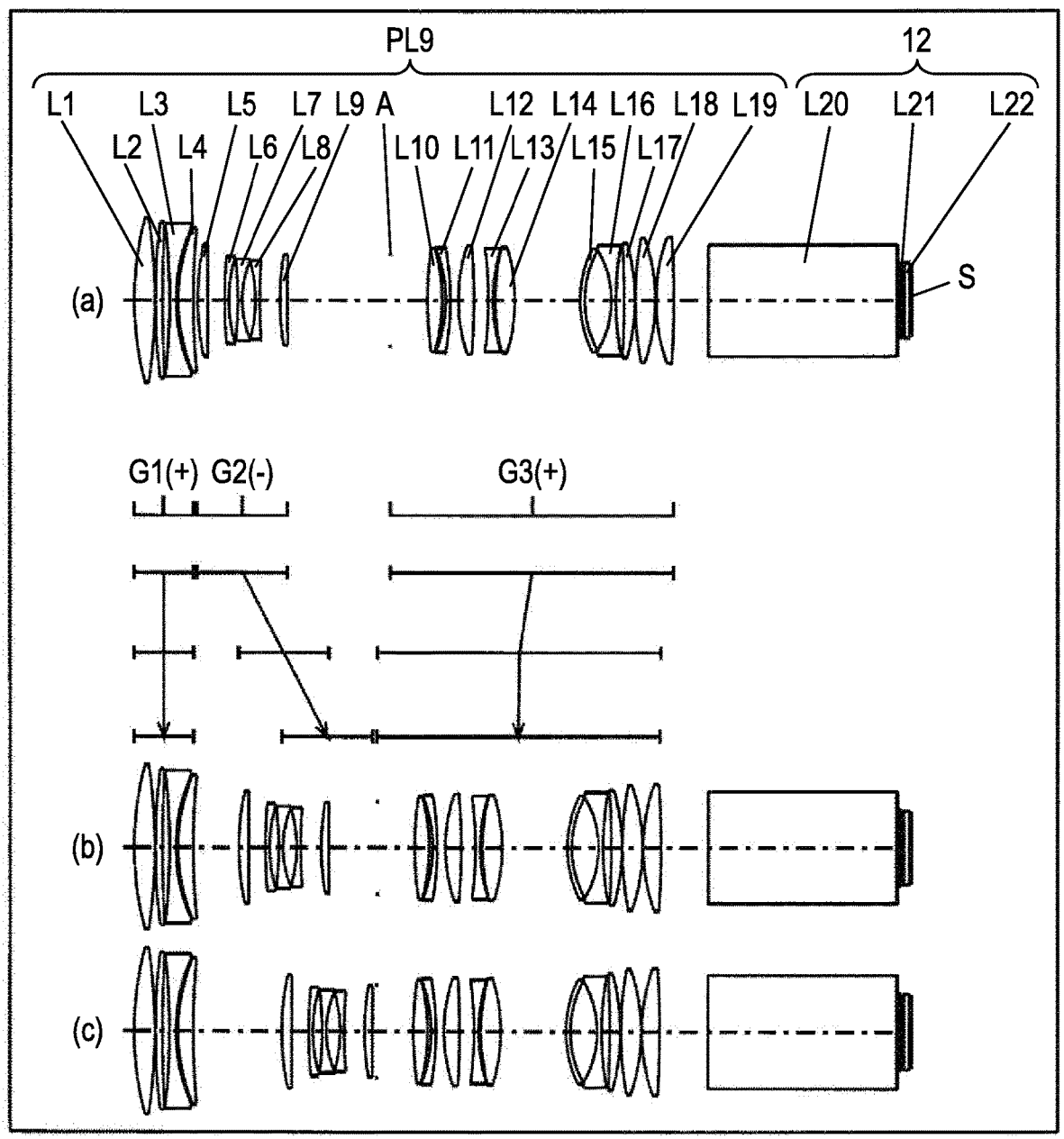
FIG. 29 is a lens arrangement diagram in various states of a projection lens system according to a ninth example.

FIG. 29 is a lens arrangement diagram in various states of the projection lens system PL9 according to the ninth example. FIGS. 29(a), 29(b), 29(c) are lens arrangement diagrams at the wide-angle end, the intermediate position, and the telephoto end of projection lens system PL9, respectively, similarly to FIGS. 2(a) to 2(c).

Projection lens system PL9 of the ninth example includes three lens groups G1 to G3 to constitute a zoom lens system, as in the seventh example. Projection lens system PL9 of the ninth example includes 19 lens elements L1 to L19. In projection lens system PL9, first to third lens groups G1 to G3 and first to nineteenth lens elements L1 to L19 are arranged in order from the magnification side to the reduction side, as in the seventh example. FIGS. 26(a) to 26(c) illustrate back glasses L20 to L22 as an example of transmission optical system 12.

In projection lens system PL9 of the ninth example, first lens group G1 includes first to fourth lens elements L1 to L4, and has a positive power. First lens element L1 has a biconvex shape. Second lens element L2 has a positive meniscus shape, and its convex surface faces the magnification side. Third lens element L3 has a biconcave shape. Fourth lens element L4 has a positive meniscus shape, and its convex surface faces the magnification side. Third lens element L3 and fourth lens element L4 are bonded to each other.

Second lens group G2 includes fifth to ninth lens elements L5 to L9, and has a negative power. Fifth lens element L5 has a positive meniscus shape, and its convex surface faces the magnification side. Sixth lens element L6 has a negative meniscus shape, and its convex surface faces the magnification side. Seventh lens element L7 has a biconcave shape. Eighth lens element L8 has a biconcave shape. Ninth lens element L9 has a positive meniscus shape, and its convex surface faces the magnification side.

Third lens group G3 includes tenth to nineteenth lens elements L10 to L19, and has a positive power. Diaphragm A is disposed on the magnification side of tenth lens element L10. Tenth lens element L10 has a biconvex shape. Eleventh lens element L11 has a negative meniscus shape, and its convex surface faces the reduction side. Twelfth lens element L12 has a biconvex shape. Thirteenth lens element L13 has a biconcave shape. Fourteenth lens element L14 has a biconvex shape. Thirteenth lens element L13 and fourteenth lens element L14 are bonded to each other.

Fifteenth lens element L15 has a negative meniscus shape, and its convex surface faces the magnification side. Sixteenth lens element L16 has a biconcave shape. Seventeenth lens element L17 has a positive meniscus shape, and its convex surface faces the reduction side. Eighteenth lens element L18 has a biconvex shape. Nineteenth lens element L19 has a biconvex shape.

Figure 30:
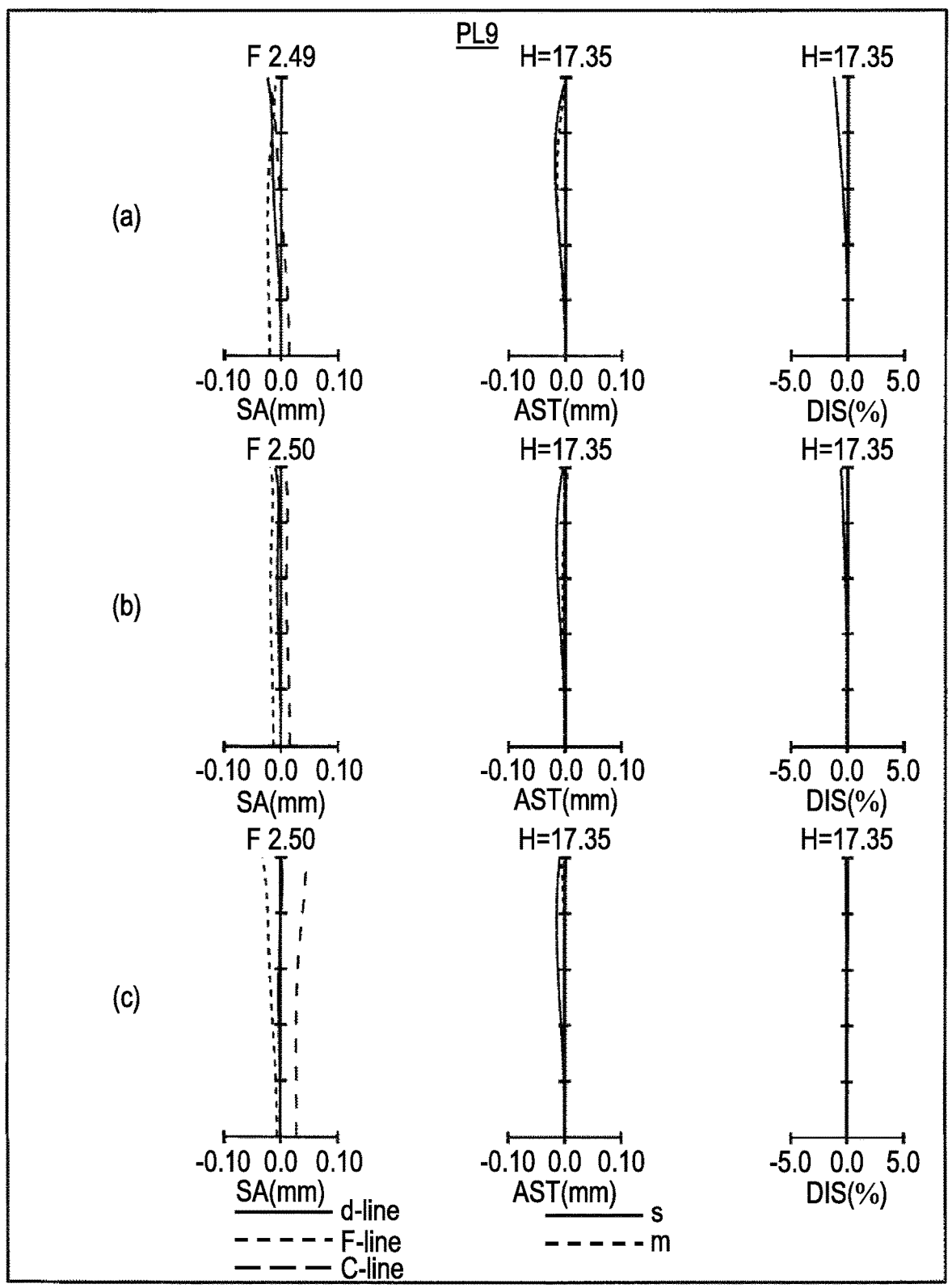
FIG. 30 is an aberration diagram illustrating longitudinal aberrations of the projection lens system according to the ninth example.

FIG. 30 is an aberration diagram illustrating longitudinal aberrations of projection lens system PL9 according to the ninth example. FIGS. 30(a), 30(b), 30(c) illustrate aberrations at the wide-angle end, the intermediate position, and the telephoto end of projection lens system PL9, respectively, similarly to FIGS. 3(a) to 3(c). The aberrations illustrated in FIGS. 30(a) to 30(c) are based on a ninth numerical example to be described later.

FIG. 31 illustrates sufficiency of conditions (1) to (11) in projection lens system PL9 according to the ninth example. The table illustrated in FIG. 31 shows a correspondence between each of conditions (1) to (11) and each of lens elements L1 to L19 in projection lens system PL5 of the fifth example, as in the first exemplary embodiment. Projection lens system PL9 of the ninth example can also improve the image quality when the brightness is increased.

4. About Seventh to Ninth Examples

Projection lens systems PL7 to PL9 of the seventh to ninth examples described above constitute a positive-lead zoom lens system in which lens group G1 closest to the magnification side has a positive power. In the present exemplary embodiment, projection lens systems PL7 to PL9 satisfy following condition (14).

Condition (14) is expressed by the following inequality.

$$0.5 < fr/ft < 2.0 \quad (14)$$

Here, fr indicates a combined focal length of all lenses closer to the reduction side than diaphragm A is in projection lens system PL9. Focal length fr is measured at the telephoto end, for example. Condition (14) defines above-described ratio fr/ft of focal length fr to focal length ft at the telephoto end of the whole system.

Specifically, fr/ft=0.83 is satisfied in projection lens system PL7 of the seventh example. In projection lens system PL8 of the eighth example, fr/ft=1.73 is satisfied. In projection lens system PL9 of the ninth example, fr/ft=0.63 is satisfied.

According to condition (14), the performance of projection lens systems PL7 to PL9 constituting the positive-lead zoom lens system can be successfully achieved. If the ratio exceeds the upper limit value of condition (14), it becomes difficult to maintain the telecentricity on the reduction side while keeping a long back focus. If the ratio is less than the lower limit value of condition (14), it becomes difficult to correct the aberration, and the image quality of projection image 20 may be degraded. Ratio fr/ft is preferably larger than 0.6 and less than 1.8.

NUMERICAL EXAMPLE

The first to ninth numerical examples for the first to ninth examples of projection lens systems PL1 to PL9 described above will be shown below.

1. First Numerical Example

The first numerical example corresponding to projection lens system PL1 of the first example will be shown below. In the first numerical example, Table 1-1 shows surface data, Table 1-2 shows various data, Table 1-3 shows single lens data, Table 1-4 shows zoom lens group data, and Table 1-5 shows zoom lens group magnification.

TABLE 1-1

| SURFACE NUMBER | r | d | nd | vd | EFFECTIVE DIAMETER |
|---|---|---|---|---|---|
| OBJECT PLANE | ∞ | | | | |
| 1 | 107.78040 | 3.50000 | 1.80810 | 22.8 | 46.089 |
| 2 | 53.96420 | 12.67200 | | | 39.876 |
| 3 | 149.51330 | 8.08820 | 1.80518 | 25.5 | 39.759 |
| 4 | −1854.88100 | 2.00000 | | | 39.150 |
| 5 | 165.88760 | 4.58880 | 1.80518 | 25.5 | 35.684 |
| 6 | 446.51990 | 0.20000 | | | 34.872 |
| 7 | 125.85010 | 2.80000 | 1.72916 | 54.7 | 32.582 |
| 8 | 45.71080 | 9.62350 | | | 28.318 |
| 9 | 586.50110 | 2.50000 | 1.49700 | 81.6 | 28.159 |
| 10 | 54.58600 | 14.05410 | | | 26.150 |
| 11 | −52.66630 | 2.50000 | 1.49700 | 81.6 | 26.107 |
| 12 | 174.21610 | 10.48810 | | | 27.567 |
| 13 | 151.95810 | 16.84430 | 1.51680 | 64.2 | 30.780 |
| 14 | −60.24780 | 22.13870 | | | 31.294 |
| 15 | ∞ | VARIABLE | | | 26.292 |
| 16 | 73.49970 | 3.62090 | 1.49700 | 81.6 | 25.646 |
| 17 | 124.75200 | 5.38260 | | | 25.362 |
| 18 | 297.81230 | 2.20000 | 1.57501 | 41.5 | 24.746 |
| 19 | 72.75800 | 1.69030 | | | 24.048 |
| 20 | 101.16570 | 6.47700 | 1.49700 | 81.6 | 24.042 |
| 21 | −172.31200 | VARIABLE | | | 23.873 |
| (DIAPHRAGM) | ∞ | 2.75120 | | | 17.617 |
| 23 | −69.97630 | 2.00000 | 1.48749 | 70.2 | 17.593 |
| 24 | 98.98570 | 2.38590 | | | 18.062 |
| 25 | 144.47980 | 3.69560 | 1.59270 | 35.4 | 18.479 |
| 26 | −142.22100 | 21.27040 | | | 18.611 |
| 27 | ∞ | 30.00000 | | | 19.894 |

TABLE 1-1-continued

| SURFACE NUMBER | r | d | nd | vd | EFFECTIVE DIAMETER |
|---|---|---|---|---|---|
| 28 | −9247.75800 | 5.22340 | 1.59270 | 35.4 | 26.066 |
| 29 | −100.72470 | 7.09560 | | | 26.299 |
| 30 | 74.51100 | 9.57970 | 1.45860 | 90.2 | 27.108 |
| 31 | −153.16810 | 1.03800 | | | 26.926 |
| 32 | −220.70670 | 2.20000 | 1.83481 | 42.7 | 26.533 |
| 33 | 65.38850 | 2.74840 | | | 25.994 |
| 34 | 110.65610 | 10.66540 | 1.43700 | 95.1 | 26.130 |
| 35 | −67.91250 | 1.25350 | | | 26.370 |
| 36 | −60.12320 | 2.20000 | 1.73800 | 32.3 | 26.358 |
| 37 | −128.20760 | 0.20000 | | | 27.358 |
| 38 | 90.61340 | 11.03110 | 1.45860 | 90.2 | 28.602 |
| 39 | −98.83350 | VARIABLE | | | 28.681 |
| 40 | ∞ | 91.00000 | 1.51680 | 64.2 | 25.935 |
| 41 | ∞ | 1.00000 | | | 18.096 |
| 42 | ∞ | 1.00000 | 1.47401 | 65.4 | 17.964 |
| 43 | ∞ | 1.00000 | | | 17.876 |
| 44 | ∞ | 3.00000 | 1.50847 | 61.2 | 17.745 |
| 45 | ∞ | BF | | | 17.485 |
| IMAGE PLANE | ∞ | | | | |

TABLE 1-2

ZOOM RATIO 1.36636

| | WIDE-ANGLE | INTER-MEDIATE | TELE-PHOTO |
|---|---|---|---|
| FOCAL LENGTH | 26.5860 | 30.9495 | 36.3260 |
| F NUMBER | 2.49940 | 2.50721 | 2.52404 |
| ANGLE OF VIEW | 33.9358 | 29.7135 | 25.7951 |
| IMAGE HEIGHT | 17.3500 | 17.3500 | 17.3500 |
| LENS TOTAL LENGTH | 447.4674 | 450.0141 | 433.1061 |
| BF | 1.00903 | 1.01425 | 1.00048 |
| d15 | 84.2517 | 49.4763 | 3.0000 |
| d21 | 2.0000 | 36.4577 | 60.0946 |
| d39 | 16.5000 | 19.3592 | 25.3043 |
| ENTRANCE PUPIL POSITION | 65.3644 | 66.2582 | 66.0624 |
| EXIT PUPIL POSITION | −1557.2131 | −1560.0723 | −1566.0174 |
| FRONT PRINCIPAL POINT POSITION | 91.4967 | 96.5941 | 101.5461 |
| REAR PRINCIPAL POINT POSITION | 420.7075 | 418.8290 | 396.4555 |

TABLE 1-3

| LENS | LENS FIRST SURFACE | FOCAL LENGTH |
|---|---|---|
| 1 | 1 | −137.7465 |
| 2 | 3 | 172.1478 |
| 3 | 5 | 325.4375 |
| 4 | 7 | −99.9195 |
| 5 | 9 | −121.2919 |
| 6 | 11 | −81.0738 |
| 7 | 13 | 85.8013 |
| 8 | 16 | 351.7199 |
| 9 | 18 | −168.0414 |
| 10 | 20 | 129.2710 |
| 11 | 23 | −83.7697 |
| 12 | 25 | 121.5047 |
| 13 | 28 | 171.7761 |
| 14 | 30 | 110.7689 |
| 15 | 32 | −60.2146 |
| 16 | 34 | 98.0840 |
| 17 | 36 | −155.5436 |
| 18 | 38 | 105.0032 |

TABLE 1-4

| GROUP | LENS FIRST SURFACE | FOCAL LENGTH | LENS CONFIGURATION LENGTH | FRONT PRINCIPAL POINT POSITION | REAR PRINCIPAL POINT POSITION |
|---|---|---|---|---|---|
| 1 | 1 | −93.98211 | 111.99770 | −1.58474 | −18.20875 |
| 2 | 16 | 216.18335 | 19.37080 | 6.75803 | 10.41823 |
| 3 | 22 | 88.39034 | 115.33820 | 83.41242 | 120.39718 |

TABLE 1-5

| GROUP | LENS FIRST SURFACE | WIDE-ANGLE | INTER-MEDIATE | TELE-PHOTO |
|---|---|---|---|---|
| 1 | 1 | 0.02297 | 0.02297 | 0.02297 |
| 2 | 16 | −2.23199 | −3.48227 | −13.85352 |
| 3 | 22 | 0.12760 | 0.09519 | 0.02809 |

2. Second Numerical Example

The second numerical example corresponding to projection lens system PL2 of the second example will be shown below. In the second numerical example, Table 2-1 shows surface data, Table 2-2 shows various data, Table 2-3 shows single lens data, Table 2-4 shows zoom lens group data, and Table 2-5 shows zoom lens group magnification.

TABLE 2-1

| SURFACE NUMBER | r | d | nd | vd | EFFECTIVE DIAMETER |
|---|---|---|---|---|---|
| OBJECT PLANE | ∞ | | | | |
| 1 | 110.83190 | 4.50000 | 1.80810 | 22.8 | 55.103 |
| 2 | 57.00040 | 15.67280 | | | 46.161 |
| 3 | 131.45310 | 11.61890 | 1.84666 | 23.8 | 46.043 |
| 4 | −1168.12990 | 0.20000 | | | 45.278 |
| 5 | 99.66540 | 3.00000 | 1.72916 | 54.7 | 38.691 |
| 6 | 49.02990 | 12.54320 | | | 33.625 |
| 7 | 443.00480 | 2.80000 | 1.55032 | 75.5 | 33.447 |
| 8 | 58.98240 | 17.63270 | | | 30.708 |
| 9 | −59.15460 | 2.50000 | 1.49700 | 81.6 | 30.665 |
| 10 | 128.27440 | 13.37030 | | | 32.714 |
| 11 | 171.14040 | 20.70470 | 1.48749 | 70.2 | 37.556 |
| 12 | −60.67690 | 46.97390 | | | 38.031 |
| 13 | ∞ | VARIABLE | | | 27.775 |
| 14 | 231.56720 | 2.20000 | 1.58144 | 40.7 | 25.511 |
| 15 | 82.57340 | 0.20000 | | | 25.016 |
| 16 | 81.63310 | 7.48880 | 1.49700 | 81.6 | 25.020 |
| 17 | −196.19650 | VARIABLE | | | 24.827 |
| (DIAPHRAGM) | ∞ | 2.48220 | | | 17.804 |
| 19 | −80.83110 | 2.00000 | 1.48749 | 70.2 | 17.775 |
| 20 | 87.37540 | 2.38270 | | | 18.114 |
| 21 | 120.36880 | 3.61620 | 1.59270 | 35.4 | 18.493 |
| 22 | −189.77620 | 30.22020 | | | 18.593 |
| 23 | ∞ | 29.99140 | | | 20.662 |
| 24 | 837.27770 | 5.67280 | 1.59270 | 35.4 | 27.395 |
| 25 | −112.75940 | 7.18690 | | | 27.616 |
| 26 | 77.25820 | 10.13380 | 1.45860 | 90.2 | 28.402 |
| 27 | −153.05450 | 1.02370 | | | 28.213 |
| 28 | −213.74150 | 2.20000 | 1.83481 | 42.7 | 27.800 |
| 29 | 65.32170 | 2.53740 | | | 27.215 |
| 30 | 98.17320 | 11.68970 | 1.43700 | 95.1 | 27.365 |
| 31 | −71.59400 | 1.56330 | | | 27.613 |
| 32 | −60.95470 | 2.20000 | 1.73800 | 32.3 | 27.602 |
| 33 | −130.98280 | 0.20000 | | | 28.708 |
| 34 | 99.88370 | 11.85120 | 1.45860 | 90.2 | 30.071 |
| 35 | −92.55720 | VARIABLE | | | 30.161 |
| 36 | ∞ | 91.00000 | 1.51680 | 64.2 | 26.589 |
| 37 | ∞ | 1.00000 | | | 18.151 |
| 38 | ∞ | 1.00000 | 1.47401 | 65.4 | 18.010 |
| 39 | ∞ | 1.00000 | | | 17.914 |
| 40 | ∞ | 3.00000 | 1.50847 | 61.2 | 17.773 |
| 41 | ∞ | BF | | | 17.498 |
| IMAGE PLANE | ∞ | | | | |

TABLE 2-2

| ZOOM RATIO 1.32931 | | | |
|---|---|---|---|
| | WIDE-ANGLE | INTER-MEDIATE | TELE-PHOTO |
| FOCAL LENGTH | 23.6871 | 27.2973 | 31.4874 |
| F NUMBER | 2.49959 | 2.50085 | 2.50838 |
| ANGLE OF VIEW | 37.0162 | 32.8897 | 29.1191 |
| IMAGE HEIGHT | 17.3500 | 17.3500 | 17.3500 |
| LENS TOTAL LENGTH | 499.8013 | 500.0092 | 482.8781 |
| BF | 1.00131 | 1.00920 | 1.00238 |
| d13 | 94.8321 | 58.1504 | 12.0921 |
| d17 | 2.0000 | 37.1341 | 62.4686 |
| d35 | 16.6111 | 18.3587 | 21.9582 |

TABLE 2-2-continued

| ZOOM RATIO 1.32931 | | | |
|---|---|---|---|
| | WIDE-ANGLE | INTER-MEDIATE | TELE-PHOTO |
| ENTRANCE PUPIL POSITION | 71.4309 | 71.8383 | 71.5044 |
| EXIT PUPIL POSITION | 3335.5562 | 3333.8086 | 3330.2091 |
| FRONT PRINCIPAL POINT POSITION | 95.2862 | 99.3592 | 103.2895 |
| REAR PRINCIPAL POINT POSITION | 475.9765 | 472.5289 | 451.1472 |

TABLE 2-3

| LENS | LENS FIRST SURFACE | FOCAL LENGTH |
|---|---|---|
| 1 | 1 | −150.8621 |
| 2 | 3 | 140.1299 |
| 3 | 5 | −135.7424 |
| 4 | 7 | −123.9602 |
| 5 | 9 | −81.0996 |
| 6 | 11 | 94.6600 |
| 7 | 14 | −221.9264 |
| 8 | 16 | 117.0386 |
| 9 | 19 | −85.7966 |
| 10 | 21 | 124.8079 |
| 11 | 24 | 168.0392 |
| 12 | 26 | 113.5250 |
| 13 | 28 | −59.7174 |
| 14 | 30 | 96.7663 |
| 15 | 32 | −156.5760 |
| 16 | 34 | 106.8237 |

TABLE 2-4

| GROUP | LENS FIRST SURFACE | FOCAL LENGTH | LENS CONFIGURATION LENGTH | FRONT PRINCIPAL POINT POSITION | REAR PRINCIPAL POINT POSITION |
|---|---|---|---|---|---|
| 1 | 1 | −102.80219 | 151.51650 | −4.42699 | −34.35141 |
| 2 | 14 | 245.51015 | 9.88880 | 4.07852 | 7.32867 |
| 3 | 18 | 88.38252 | 126.95150 | 90.73331 | 132.48997 |

TABLE 2-5

| GROUP | LENS FIRST SURFACE | WIDE-ANGLE | INTER-MEDIATE | TELE-PHOTO |
|---|---|---|---|---|
| 1 | 1 | 0.02508 | 0.02508 | 0.02508 |
| 2 | 14 | −1.76003 | −2.38799 | −4.32602 |
| 3 | 18 | 0.13178 | 0.11191 | 0.07126 |

3. Third Numerical Example

The third numerical example corresponding to projection lens system PL3 of the third example will be shown below. In the third numerical example, Table 3-1 shows surface data, Table 3-2 shows various data, Table 3-3 shows single lens data, Table 3-4 shows zoom lens group data, and Table 3-5 shows zoom lens group magnification.

TABLE 3-1

| SURFACE NUMBER | r | d | nd | vd | EFFECTIVE DIAMETER |
|---|---|---|---|---|---|
| OBJECT PLANE | ∞ | | | | |
| 1 | 92.39910 | 3.50000 | 1.80518 | 25.5 | 40.533 |
| 2 | 49.78520 | 8.95250 | | | 35.661 |
| 3 | 99.58080 | 10.50950 | 1.73800 | 32.3 | 35.558 |
| 4 | −423.52170 | 0.20000 | | | 34.840 |
| 5 | 130.71780 | 2.80000 | 1.48749 | 70.2 | 31.291 |
| 6 | 46.53950 | 10.47680 | | | 27.334 |
| 7 | −326.42190 | 2.50000 | 1.49700 | 81.6 | 27.142 |
| 8 | 57.90150 | 12.80740 | | | 25.026 |
| 9 | −50.19340 | 2.50000 | 1.49700 | 81.6 | 24.976 |
| 10 | 140.39530 | 8.49020 | | | 26.342 |
| 11 | 147.86110 | 14.35050 | 1.59349 | 67.0 | 28.868 |
| 12 | −63.20500 | 15.76340 | | | 29.277 |
| 13 | ∞ | VARIABLE | | | 25.472 |
| 14 | 52.41280 | 2.79250 | 1.49700 | 81.6 | 23.984 |
| 15 | 64.38550 | 4.61480 | | | 23.651 |
| 16 | 155.59380 | 2.20000 | 1.56732 | 42.8 | 23.383 |
| 17 | 55.82770 | 1.57090 | | | 22.620 |
| 18 | 69.35150 | 7.11910 | 1.49700 | 81.6 | 22.630 |
| 19 | −190.60620 | VARIABLE | | | 22.425 |

TABLE 3-1-continued

| SURFACE NUMBER | r | d | nd | vd | EFFECTIVE DIAMETER |
|---|---|---|---|---|---|
| (DIAPHRAGM) | ∞ | 2.74710 | | | 17.158 |
| 21 | −66.54020 | 2.00000 | 1.48749 | 70.2 | 17.134 |
| 22 | 98.09230 | 2.82800 | | | 17.560 |
| 23 | 234.45100 | 3.54150 | 1.59270 | 35.4 | 17.971 |
| 24 | −146.72000 | 12.07980 | | | 18.164 |
| 25 | ∞ | 28.96150 | | | 19.328 |
| 26 | 1899.45620 | 5.81140 | 1.59270 | 35.4 | 25.811 |
| 27 | −90.88760 | 15.96040 | | | 26.052 |
| 28 | 69.48980 | 9.95460 | 1.45860 | 90.2 | 27.032 |
| 29 | −154.02640 | 0.91520 | | | 26.810 |
| 30 | −240.90810 | 2.00000 | 1.83481 | 42.7 | 26.369 |
| 31 | 63.18500 | 3.41010 | | | 25.665 |
| 32 | 132.89910 | 10.23150 | 1.43700 | 95.1 | 25.786 |
| 33 | −63.96890 | 1.01590 | | | 26.014 |
| 34 | −58.89590 | 2.20000 | 1.73800 | 32.3 | 25.993 |
| 35 | −125.64590 | 0.20000 | | | 26.952 |
| 36 | 86.69430 | 11.00180 | 1.45860 | 90.2 | 28.091 |
| 37 | −97.34420 | VARIABLE | | | 28.176 |
| 38 | ∞ | 91.00000 | 1.51680 | 64.2 | 25.566 |
| 39 | ∞ | 1.00000 | | | 18.066 |
| 40 | ∞ | 1.00000 | 1.47401 | 65.4 | 17.940 |
| 41 | ∞ | 1.00000 | | | 17.856 |
| 42 | ∞ | 3.00000 | 1.50847 | 61.2 | 17.730 |
| 43 | ∞ | BF | | | 17.481 |
| IMAGE PLANE | ∞ | | | | |

TABLE 3-2

| ZOOM RATIO 1.37093 | | | |
|---|---|---|---|
| | WIDE-ANGLE | INTER-MEDIATE | TELE-PHOTO |
| FOCAL LENGTH | 31.4881 | 36.8327 | 43.1680 |
| F NUMBER | 2.49951 | 2.50704 | 2.52632 |
| ANGLE OF VIEW | 29.6093 | 25.6352 | 22.1374 |
| IMAGE HEIGHT | 17.3500 | 17.3500 | 17.3500 |
| LENS TOTAL LENGTH | 419.8112 | 420.0168 | 406.2001 |
| BF | 1.01081 | 1.01648 | 0.99737 |
| d13 | 77.0940 | 44.3060 | 3.0000 |
| d19 | 2.0000 | 32.3714 | 54.4914 |
| d37 | 16.5000 | 19.1165 | 24.5049 |
| ENTRANCE PUPIL POSITION | 66.7945 | 67.6839 | 67.6248 |
| EXIT PUPIL POSITION | −1374.6242 | −1377.2407 | −1382.6291 |
| FRONT PRINCIPAL POINT POSITION | 97.5617 | 103.5320 | 109.4455 |
| REAR PRINCIPAL POINT POSITION | 388.0793 | 382.8505 | 362.5738 |

TABLE 3-3

| LENS | LENS FIRST SURFACE | FOCAL LENGTH |
|---|---|---|
| 1 | 1 | −139.1657 |
| 2 | 3 | 110.1867 |
| 3 | 5 | −149.8825 |
| 4 | 7 | −98.7373 |
| 5 | 9 | −74.0732 |
| 6 | 11 | 76.5439 |
| 7 | 14 | 526.3668 |
| 8 | 16 | −154.7070 |
| 9 | 18 | 103.2530 |
| 10 | 21 | −81.0051 |
| 11 | 23 | 152.7878 |
| 12 | 26 | 146.5011 |
| 13 | 28 | 105.9011 |
| 14 | 30 | −59.7646 |
| 15 | 32 | 100.4043 |
| 16 | 34 | −152.3515 |
| 17 | 36 | 101.9063 |

TABLE 3-4

| GROUP | LENS FIRST SURFACE | FOCAL LENGTH | LENS CONFIGURATION LENGTH | FRONT PRINCIPAL POINT POSITION | REAR PRINCIPAL POINT POSITION |
|---|---|---|---|---|---|
| 1 | 1 | −109.90907 | 92.85030 | −4.61772 | −16.76671 |
| 2 | 14 | 195.72199 | 18.29730 | 6.90200 | 10.53971 |
| 3 | 20 | 86.26237 | 115.05880 | 80.90515 | 124.33705 |

TABLE 3-5

| GROUP | LENS FIRST SURFACE | WIDE-ANGLE | INTER-MEDIATE | TELE-PHOTO |
|---|---|---|---|---|
| 1 | 1 | 0.02677 | 0.02677 | 0.02677 |
| 2 | 14 | −1.86655 | −2.71574 | −6.36214 |
| 3 | 20 | 0.15497 | 0.12457 | 0.06233 |

4. Fourth Numerical Example

The fourth numerical example corresponding to projection lens system PL4 of the fourth example will be shown below. In the fourth numerical example, Table 4-1 shows surface data, Table 4-2 shows various data, and Table 4-3 shows single lens data.

TABLE 4-1

| SURFACE NUMBER | r | d | nd | vd | EFFECTIVE DIAMETER |
|---|---|---|---|---|---|
| OBJECT PLANE | 4200.00000 | | | | |
| 1 | 58.29070 | 3.50000 | 1.90366 | 31.3 | 35.030 |
| 2 | 30.46270 | 9.87360 | | | 25.206 |
| 3 | 74.23120 | 2.50000 | 1.80420 | 46.5 | 23.970 |
| 4 | 20.18290 | 4.02130 | | | 16.791 |
| 5 | 27.53570 | 2.00000 | 1.59349 | 67.0 | 16.464 |
| 6 | 16.59290 | 33.03140 | | | 13.787 |
| 7 | 1306.65610 | 2.50000 | 1.49700 | 81.6 | 7.770 |
| 8 | −33.58300 | 5.21580 | | | 8.270 |
| 9 | 163.20330 | 5.00000 | 1.49700 | 81.6 | 11.098 |
| 10 | −24.49910 | 0.87720 | | | 11.533 |
| 11 | −25.37780 | 2.00000 | 1.59270 | 35.4 | 11.644 |
| 12 | 58.39790 | 3.39920 | | | 13.302 |
| 13 | 283.07260 | 6.69100 | 1.49700 | 81.6 | 14.881 |
| 14 | −29.85650 | 24.49410 | | | 15.620 |
| 15 | 60.11530 | 13.61550 | 1.49700 | 81.6 | 25.697 |
| 16 | −60.11530 | 0.36560 | | | 25.732 |
| 17 | −72.47510 | 2.50000 | 1.64769 | 33.8 | 25.377 |
| 18 | 53.43880 | 7.97450 | | | 25.622 |
| 19 | 251.51420 | 9.56110 | 1.80809 | 22.8 | 27.033 |
| 20 | −67.48230 | 2.10320 | | | 27.471 |
| 21 | 54.36810 | 10.00000 | 1.80809 | 22.8 | 27.449 |
| 22 | 456.19300 | 25.13310 | | | 26.607 |
| 23 | −95.96650 | 5.00000 | 1.48749 | 70.4 | 18.010 |
| 24 | −40.63500 | 0.29540 | | | 17.849 |
| 25 | −47.89710 | 2.00000 | 1.72825 | 28.3 | 17.400 |
| 26 | 47.89710 | 64.25370 | | | 17.143 |
| 27 | −1901.14330 | 11.00000 | 1.67300 | 38.3 | 31.991 |
| 28 | −70.97520 | 87.25490 | | | 32.501 |
| 29 | 129.52100 | 2.20000 | 1.48749 | 70.4 | 23.923 |
| 30 | 69.35160 | 6.47060 | | | 23.437 |
| 31 | 106.68220 | 6.00000 | 1.59270 | 35.4 | 23.561 |
| 32 | −404.62060 | 59.14870 | | | 23.383 |
| (DIAPHRAGM) | ∞ | 62.62650 | | | 18.621 |
| 34 | 137.59820 | 2.20000 | 1.73800 | 32.3 | 21.734 |
| 35 | 67.94860 | 3.50290 | | | 21.716 |
| 36 | 107.89620 | 9.26120 | 1.45860 | 90.2 | 22.307 |
| 37 | −53.81450 | 0.20000 | | | 22.513 |
| 38 | −80.61170 | 2.20000 | 1.73800 | 32.3 | 22.398 |
| 39 | 80.61170 | 0.40000 | | | 23.217 |
| 40 | 90.38150 | 11.26690 | 1.45860 | 90.2 | 23.226 |
| 41 | −47.74290 | 2.50960 | | | 23.617 |
| 42 | −44.25950 | 2.20000 | 1.73800 | 32.3 | 23.686 |
| 43 | −67.28880 | 0.20000 | | | 24.879 |
| 44 | 73.08750 | 8.00000 | 1.80420 | 46.5 | 26.811 |
| 45 | −1277.58600 | 16.38070 | | | 26.621 |
| 46 | ∞ | 91.00000 | 1.51680 | 64.2 | 24.137 |
| 47 | ∞ | 1.00000 | | | 15.245 |
| 48 | ∞ | 1.00000 | 1.47401 | 65.4 | 15.096 |
| 49 | ∞ | 1.00000 | | | 14.996 |
| 50 | ∞ | 3.00000 | 1.50847 | 61.2 | 14.847 |
| 51 | ∞ | BF | | | 14.552 |
| IMAGE PLANE | ∞ | | | | |

TABLE 4-2

| | |
|---|---|
| FOCAL LENGTH | −9.0016 |
| F NUMBER | 2.49133 |
| ANGLE OF VIEW | 91.6000 |
| IMAGE HEIGHT | 14.4018 |
| LENS TOTAL LENGTH | 638.9384 |
| BF | 1.01074 |
| ENTRANCE PUPIL POSITION | 22.8656 |
| EXIT PUPIL POSITION | 4741.8979 |
| FRONT PRINCIPAL POINT POSITION | 13.8810 |
| REAR PRINCIPAL POINT POSITION | 647.9199 |

TABLE 4-3

| LENS | LENS FIRST SURFACE | FOCAL LENGTH |
|---|---|---|
| 1 | 1 | −75.0960 |
| 2 | 3 | −35.1943 |
| 3 | 5 | −75.4904 |
| 4 | 7 | 65.9194 |
| 5 | 9 | 43.2427 |
| 6 | 11 | −29.5838 |
| 7 | 13 | 54.7307 |
| 8 | 15 | 62.8411 |
| 9 | 17 | −47.1225 |
| 10 | 19 | 66.7366 |
| 11 | 21 | 75.5428 |
| 12 | 23 | 140.4130 |
| 13 | 25 | −32.5983 |
| 14 | 27 | 109.2865 |
| 15 | 29 | −309.9497 |
| 16 | 31 | 143.0623 |
| 17 | 34 | −184.3668 |
| 18 | 36 | 79.7309 |
| 19 | 38 | −54.3003 |
| 20 | 40 | 69.9150 |
| 21 | 42 | −182.6403 |
| 22 | 44 | 86.1922 |

5. Fifth Numerical Example

The fifth numerical example corresponding to projection lens system PL5 of the fifth example will be shown below. In the fifth numerical example, Table 5-1 shows surface data, Table 5-2 shows various data, and Table 5-3 shows single lens data.

TABLE 5-1

| SURFACE NUMBER | r | d | nd | vd | EFFECTIVE DIAMETER |
|---|---|---|---|---|---|
| OBJECT PLANE | 4050.00000 | | | | |
| 1 | 62.54190 | 4.00000 | 1.90366 | 31.3 | 40.025 |
| 2 | 43.40300 | 0.20000 | | | 32.241 |
| 3 | 43.42470 | 3.00000 | 1.92286 | 20.9 | 32.095 |
| 4 | 28.60770 | 13.44750 | | | 25.019 |
| 5 | 142.04020 | 2.50000 | 1.59349 | 67.0 | 23.536 |
| 6 | 16.66020 | 40.19710 | | | 14.978 |
| 7 | −190.87630 | 5.00000 | 1.49700 | 81.6 | 13.637 |
| 8 | −29.87760 | 0.20000 | | | 14.435 |
| 9 | 119.72050 | 9.48830 | 1.49700 | 81.6 | 16.581 |
| 10 | −36.90040 | 0.38640 | | | 17.429 |
| 11 | −42.06130 | 2.00000 | 1.59270 | 35.4 | 17.491 |
| 12 | 55.78560 | 4.07030 | | | 19.405 |
| 13 | 113.80070 | 9.77420 | 1.49700 | 81.6 | 21.393 |
| 14 | −43.52370 | 19.40830 | | | 22.003 |
| 15 | 64.10310 | 16.14710 | 1.49700 | 81.6 | 29.629 |
| 16 | −64.10310 | 0.20000 | | | 29.579 |
| 17 | −74.12660 | 2.50000 | 1.64769 | 33.8 | 29.049 |
| 18 | 59.00950 | 14.50800 | | | 28.735 |
| 19 | 162.73460 | 11.09220 | 1.80809 | 22.8 | 32.836 |
| 20 | −96.55920 | 0.20000 | | | 33.037 |
| 21 | 51.05620 | 10.24630 | 1.80809 | 22.8 | 31.284 |
| 22 | 190.75090 | 24.49070 | | | 30.524 |
| 23 | −71.77370 | 5.00000 | 1.48749 | 70.4 | 20.550 |
| 24 | −46.98370 | 0.26930 | | | 20.221 |
| 25 | −54.82480 | 2.00000 | 1.72825 | 28.3 | 19.681 |
| 26 | 54.82480 | 78.98270 | | | 19.151 |
| 27 | 5260.54060 | 11.00000 | 1.67300 | 38.3 | 32.662 |
| 28 | −82.97150 | 60.14730 | | | 33.065 |
| 29 | 129.08740 | 2.00000 | 1.48749 | 70.4 | 26.056 |
| 30 | 64.33920 | 10.00000 | | | 25.510 |
| 31 | 96.61770 | 7.00000 | 1.59270 | 35.4 | 25.640 |
| 32 | −747.95790 | 55.00000 | | | 25.522 |
| (DIAPHRAGM) | ∞ | 56.88490 | | | 18.198 |
| 34 | 131.50790 | 2.20000 | 1.73800 | 32.3 | 23.251 |
| 35 | 65.30700 | 3.71530 | | | 23.275 |
| 36 | 100.52430 | 10.61220 | 1.45860 | 90.2 | 23.955 |
| 37 | −53.31120 | 0.20000 | | | 24.168 |
| 38 | −78.15180 | 2.20000 | 1.73800 | 32.3 | 24.015 |
| 39 | 78.15180 | 1.01200 | | | 24.990 |
| 40 | 90.63280 | 13.05900 | 1.45860 | 90.2 | 25.239 |
| 41 | −47.23820 | 0.86090 | | | 25.634 |
| 42 | −45.46180 | 2.20000 | 1.73800 | 32.3 | 25.642 |
| 43 | −68.28750 | 0.20000 | | | 26.948 |
| 44 | 74.30690 | 8.00000 | 1.80420 | 46.5 | 29.112 |
| 45 | −1234.88000 | 16.20000 | | | 29.038 |

TABLE 5-1-continued

| SURFACE NUMBER | r | d | nd | vd | EFFECTIVE DIAMETER |
|---|---|---|---|---|---|
| 46 | ∞ | 91.00000 | 1.51680 | 64.2 | 26.257 |
| 47 | ∞ | 1.00000 | | | 16.248 |
| 48 | ∞ | 1.00000 | 1.47401 | 65.4 | 16.080 |
| 49 | ∞ | 1.00000 | | | 15.967 |
| 50 | ∞ | 3.00000 | 1.50847 | 61.2 | 15.799 |
| 51 | ∞ | BF | | | 15.467 |
| IMAGE PLANE | ∞ | | | | |

TABLE 5-2

| FOCAL LENGTH | -9.7020 |
|---|---|
| F NUMBER | 2.49196 |
| ANGLE OF VIEW | 90.1000 |
| IMAGE HEIGHT | 15.2985 |
| LENS TOTAL LENGTH | 640.0155 |
| BF | 1.01555 |
| ENTRANCE PUPIL POSITION | 26.5328 |
| EXIT PUPIL POSITION | 11473.0231 |
| FRONT PRINCIPAL POINT POSITION | 16.8390 |
| REAR PRINCIPAL POINT POSITION | 649.6942 |

TABLE 5-3

| LENS | LENS FIRST SURFACE | FOCAL LENGTH |
|---|---|---|
| 1 | 1 | -174.2394 |
| 2 | 3 | -100.6282 |
| 3 | 5 | -32.0394 |
| 4 | 7 | 70.5450 |
| 5 | 9 | 57.9188 |
| 6 | 11 | -40.1541 |
| 7 | 13 | 64.6803 |

TABLE 5-3-continued

| LENS | LENS FIRST SURFACE | FOCAL LENGTH |
|---|---|---|
| 8 | 15 | 67.3046 |
| 9 | 17 | -50.3546 |
| 10 | 19 | 76.4550 |
| 11 | 21 | 83.5348 |
| 12 | 23 | 261.7415 |
| 13 | 25 | -37.3544 |
| 14 | 27 | 121.4723 |
| 15 | 29 | -266.0907 |
| 16 | 31 | 144.8104 |
| 17 | 34 | -178.3050 |
| 18 | 36 | 77.6470 |
| 19 | 38 | -52.6338 |
| 20 | 40 | 69.7918 |
| 21 | 42 | -192.1567 |
| 22 | 44 | 87.3924 |

6. Sixth Numerical Example

The sixth numerical example corresponding to projection lens system PL6 of the sixth example will be shown below. In the sixth numerical example, Table 6-1 shows surface data, Table 6-2 shows various data, and Table 6-3 shows single lens data.

TABLE 6-1

| SURFACE NUMBER | r | d | nd | vd | EFFECTIVE DIAMETER |
|---|---|---|---|---|---|
| OBJECT PLANE | | 5200.00000 | | | |
| 1 | 62.46790 | 4.00000 | 1.90366 | 31.3 | 40.036 |
| 2 | 35.50310 | 9.99990 | | | 29.032 |
| 3 | 65.29260 | 2.50000 | 1.72916 | 54.7 | 26.366 |
| 4 | 21.11420 | 4.58070 | | | 17.761 |
| 5 | 29.11320 | 2.00000 | 1.62041 | 60.3 | 17.189 |
| 6 | 13.41680 | 19.55940 | | | 12.485 |
| 7 | 197.68480 | 15.00000 | 1.49700 | 81.6 | 7.059 |
| 8 | -26.28950 | 0.20000 | | | 10.171 |
| 9 | -2228.75270 | 5.57310 | 1.49700 | 81.6 | 11.148 |
| 10 | -20.02520 | 0.86840 | | | 11.669 |
| 11 | -20.56810 | 2.00000 | 1.59270 | 35.4 | 11.750 |
| 12 | 57.19250 | 3.98030 | | | 13.975 |
| 13 | 433.88500 | 8.40840 | 1.49700 | 81.6 | 16.439 |
| 14 | -27.36790 | 19.51560 | | | 17.377 |
| 15 | 65.80080 | 15.52120 | 1.49700 | 81.6 | 29.255 |
| 16 | -65.80080 | 0.20000 | | | 29.334 |
| 17 | -94.65310 | 2.50000 | 1.64769 | 33.8 | 28.832 |
| 18 | 55.58010 | 7.96650 | | | 29.048 |
| 19 | 276.62580 | 10.51270 | 1.80809 | 22.8 | 29.858 |
| 20 | -69.45390 | 0.20000 | | | 30.305 |
| 21 | 56.40440 | 11.00000 | 1.80809 | 22.8 | 30.906 |
| 22 | 520.65430 | 28.51500 | | | 30.215 |
| 23 | -94.14750 | 5.00000 | 1.48749 | 70.4 | 20.820 |
| 24 | -41.68990 | 0.20000 | | | 20.700 |
| 25 | -50.81930 | 2.00000 | 1.72825 | 28.3 | 19.921 |
| 26 | 50.81930 | 72.03570 | | | 19.466 |
| 27 | -26168.82480 | 10.79210 | 1.67300 | 38.3 | 35.835 |
| 28 | -78.20080 | 81.49680 | | | 36.073 |
| 29 | 123.44890 | 2.20000 | 1.48749 | 70.2 | 27.688 |
| 30 | 67.17520 | 10.00000 | | | 27.134 |

TABLE 6-1-continued

| SURFACE NUMBER | r | d | nd | vd | EFFECTIVE DIAMETER |
|---|---|---|---|---|---|
| 31 | 106.41330 | 6.00000 | 1.59270 | 35.4 | 27.223 |
| 32 | −496.67740 | 60.00000 | | | 27.195 |
| (DIAPHRAGM) | ∞ | 57.73490 | | | 18.222 |
| 34 | 143.68540 | 2.20000 | 1.73800 | 32.3 | 22.851 |
| 35 | 65.87630 | 3.68330 | | | 22.854 |
| 36 | 103.15140 | 10.29040 | 1.45860 | 90.2 | 23.481 |
| 37 | −52.61520 | 0.20000 | | | 23.690 |
| 38 | −78.63750 | 2.20000 | 1.73800 | 32.3 | 23.558 |
| 39 | 78.63750 | 1.07720 | | | 24.517 |
| 40 | 93.52620 | 12.68120 | 1.45860 | 90.2 | 24.762 |
| 41 | −46.50510 | 1.00730 | | | 25.168 |
| 42 | −44.03590 | 2.20000 | 1.73800 | 32.3 | 25.179 |
| 43 | −68.57950 | 0.20000 | | | 26.570 |
| 44 | 79.77200 | 8.00000 | 1.80420 | 46.5 | 28.745 |
| 45 | −376.98300 | 16.20000 | | | 28.696 |
| 46 | ∞ | 91.00000 | 1.51680 | 64.2 | 25.888 |
| 47 | ∞ | 1.00000 | | | 16.217 |
| 48 | ∞ | 1.00000 | 1.47401 | 65.4 | 16.055 |
| 49 | ∞ | 1.00000 | | | 15.945 |
| 50 | ∞ | 3.00000 | 1.50847 | 61.2 | 15.783 |
| 51 | ∞ | BF | | | 15.462 |
| IMAGE PLANE | ∞ | | | | |

TABLE 6-2

| | |
|---|---|
| FOCAL LENGTH | −8.6519 |
| F NUMBER | 2.49176 |
| ANGLE OF VIEW | 102.0000 |
| IMAGE HEIGHT | 15.2911 |
| LENS TOTAL LENGTH | 640.0172 |
| BF | 1.01709 |
| ENTRANCE PUPIL POSITION | 23.9896 |
| EXIT PUPIL POSITION | 3190.3911 |
| FRONT PRINCIPAL POINT POSITION | 15.3612 |
| REAR PRINCIPAL POINT POSITION | 648.6505 |

TABLE 6-3

| LENS | LENS FIRST SURFACE | FOCAL LENGTH |
|---|---|---|
| 1 | 1 | −97.9115 |
| 2 | 3 | −43.8424 |
| 3 | 5 | −42.1679 |
| 4 | 7 | 47.7495 |
| 5 | 9 | 40.6236 |
| 6 | 11 | −25.2813 |
| 7 | 13 | 52.1146 |
| 8 | 15 | 68.8960 |
| 9 | 17 | −53.7142 |
| 10 | 19 | 69.6451 |
| 11 | 21 | 77.4598 |
| 12 | 23 | 148.8358 |
| 13 | 25 | −34.6045 |
| 14 | 27 | 116.5262 |
| 15 | 29 | −306.2142 |
| 16 | 31 | 148.4094 |
| 17 | 34 | −166.8402 |
| 18 | 36 | 77.5883 |
| 19 | 38 | −52.9629 |
| 20 | 40 | 69.7144 |
| 21 | 42 | −173.3243 |
| 22 | 44 | 82.5144 |

7. Seventh Numerical Example

The seventh numerical example corresponding to projection lens system PL7 of the seventh example will be shown below. In the seventh numerical example, Table 7-1 shows surface data, Table 7-2 shows various data, Table 7-3 shows single lens data, Table 7-4 shows zoom lens group data, and Table 7-5 shows zoom lens group magnification.

TABLE 7-1

| SURFACE NUMBER | r | d | nd | vd | EFFECTIVE DIAMETER |
|---|---|---|---|---|---|
| OBJECT PLANE | ∞ | | | | |
| 1 | 119.63260 | 3.60000 | 1.73800 | 32.3 | 46.981 |
| 2 | 82.63570 | 1.37420 | | | 44.342 |
| 3 | 82.10820 | 17.54780 | 1.48749 | 70.2 | 44.063 |
| 4 | −492.95470 | VARIABLE | | | 43.313 |
| 5 | 396.98350 | 3.00000 | 1.45860 | 90.2 | 39.404 |
| 6 | 52.75470 | 11.52230 | | | 33.669 |
| 7 | 498.51150 | 2.30000 | 1.43700 | 95.1 | 33.525 |
| 8 | 48.67720 | 0.20000 | | | 30.904 |
| 9 | 48.59130 | 8.09800 | 1.83481 | 42.7 | 30.911 |
| 10 | 97.69030 | VARIABLE | | | 30.325 |
| 11 | −62.41280 | 2.00000 | 1.51680 | 64.2 | 16.452 |
| 12 | 155.69540 | VARIABLE | | | 15.888 |
| (DIAPHRAGM) | ∞ | 14.27120 | | | 17.573 |
| 14 | 226.47090 | 5.55080 | 1.49700 | 81.6 | 20.448 |
| 15 | −94.70770 | 2.71950 | | | 20.667 |
| 16 | −49.75820 | 2.00000 | 1.51680 | 64.2 | 20.682 |
| 17 | −489.23030 | 16.10820 | | | 21.714 |
| 18 | 1212.41950 | 8.56290 | 1.55032 | 75.5 | 25.755 |
| 19 | −61.90930 | 0.20000 | | | 26.127 |
| 20 | 99.12130 | 6.02390 | 1.59270 | 35.4 | 25.862 |
| 21 | −448.62530 | 10.51210 | | | 25.748 |
| 22 | −129.19760 | 2.00000 | 1.67300 | 38.3 | 24.585 |
| 23 | 88.98480 | 2.01880 | | | 24.777 |
| 24 | 156.03790 | 7.45720 | 1.43700 | 95.1 | 24.903 |
| 25 | −92.95600 | 2.93710 | | | 25.160 |
| 26 | −56.61360 | 2.20000 | 1.67300 | 38.3 | 25.186 |
| 27 | −75.37180 | 29.79590 | | | 25.969 |
| 28 | 139.38740 | 10.39010 | 1.43700 | 95.1 | 30.966 |
| 29 | −107.37960 | VARIABLE | | | 31.014 |
| 30 | 72.00060 | 2.20000 | 1.73800 | 32.3 | 28.559 |
| 31 | 52.17770 | 3.45230 | | | 27.535 |
| 32 | 79.83990 | 5.93100 | 1.43700 | 95.1 | 27.541 |
| 33 | 485.77180 | VARIABLE | | | 27.355 |
| 34 | ∞ | 91.00000 | 1.51680 | 64.2 | 35.000 |
| 35 | ∞ | 1.00000 | | | 35.000 |

TABLE 7-1-continued

| SURFACE NUMBER | r | d | nd | vd | EFFECTIVE DIAMETER |
|---|---|---|---|---|---|
| 36 | ∞ | 1.00000 | 1.47401 | 65.4 | 35.000 |
| 37 | ∞ | 1.00000 | | | 35.000 |
| 38 | ∞ | 3.00000 | 1.50847 | 61.2 | 35.000 |
| 39 | ∞ | BF | | | 35.000 |
| IMAGE PLANE | ∞ | | | | |

TABLE 7-2

ZOOM RATIO 2.09537

| | WIDE-ANGLE | INTERMEDIATE | TELEPHOTO |
|---|---|---|---|
| FOCAL LENGTH | 49.5209 | 71.7754 | 103.7644 |
| F NUMBER | 2.50418 | 2.52428 | 2.55044 |
| ANGLE OF VIEW | 19.4618 | 13.5353 | 9.4178 |
| IMAGE HEIGHT | 17.3500 | 17.3500 | 17.3500 |
| LENS TOTAL LENGTH | 400.0363 | 400.0371 | 400.0365 |
| BF | 1.03636 | 1.03736 | 1.03674 |
| d4 | 2.0000 | 31.0606 | 55.5593 |
| d10 | 48.0327 | 25.8580 | 6.0000 |
| d12 | 49.4939 | 33.4964 | 16.7471 |
| d29 | 2.0000 | 8.9573 | 20.0494 |
| d33 | 16.5000 | 18.6541 | 19.6707 |
| ENTRANCE PUPIL POSITION | 116.3070 | 155.9682 | 177.4489 |
| EXIT PUPIL POSITION | −2340.4497 | −2404.5080 | −2509.0183 |
| FRONT PRINCIPAL POINT POSITION | 164.7803 | 225.6008 | 276.9193 |
| REAR PRINCIPAL POINT POSITION | 349.9194 | 327.0215 | 293.6921 |

TABLE 7-3

| LENS | LENS FIRST SURFACE | FOCAL LENGTH |
|---|---|---|
| 1 | 1 | −377.6776 |
| 2 | 3 | 145.8403 |
| 3 | 5 | −133.0292 |
| 4 | 7 | −123.6350 |
| 5 | 9 | 107.7270 |
| 6 | 11 | −85.9412 |
| 7 | 14 | 135.1438 |
| 8 | 16 | −107.3494 |
| 9 | 18 | 107.2869 |
| 10 | 20 | 137.5355 |
| 11 | 22 | −78.0076 |
| 12 | 24 | 134.5272 |
| 13 | 26 | −354.7417 |
| 14 | 28 | 140.5959 |
| 15 | 30 | −269.5021 |
| 16 | 32 | 217.6663 |

TABLE 7-4

| GROUP | LENS FIRST SURFACE | FOCAL LENGTH | LENS CONFIGURATION LENGTH | FRONT PRINCIPAL POINT POSITION | REAR PRINCIPAL POINT POSITION |
|---|---|---|---|---|---|
| 1 | 1 | 239.39037 | 22.52200 | 4.11345 | 11.19786 |
| 2 | 5 | −146.61717 | 25.12030 | 6.17551 | 12.34573 |
| 3 | 11 | −85.94124 | 2.00000 | 0.37614 | 1.06168 |
| 4 | 13 | 87.46411 | 122.74770 | 77.80724 | 68.40232 |
| 5 | 30 | 1150.60590 | 11.58330 | 0.31837 | 3.02611 |

TABLE 7-5

| GROUP | LENS FIRST SURFACE | WIDE-ANGLE | INTERMEDIATE | TELEPHOTO |
|---|---|---|---|---|
| 1 | 1 | −0.06359 | −0.06359 | −0.06359 |
| 2 | 5 | −1.65677 | −2.46684 | −4.19667 |
| 3 | 11 | 0.16014 | 0.13572 | 0.09912 |
| 4 | 13 | −0.77434 | −0.88298 | −1.02356 |
| 5 | 30 | 0.92112 | 0.91925 | 0.91837 |

8. Eighth Numerical Example

The eighth numerical example corresponding to projection lens system PL8 of the eighth example will be shown below. In the eighth numerical example, Table 8-1 shows surface data, Table 8-2 shows various data, Table 8-3 shows single lens data, Table 8-4 shows zoom lens group data, and Table 8-5 shows zoom lens group magnification.

TABLE 8-1

| SURFACE NUMBER | r | d | nd | vd | EFFECTIVE DIAMETER |
|---|---|---|---|---|---|
| OBJECT PLANE | ∞ | | | | |
| 1 | 140.86220 | 3.50000 | 1.80518 | 25.5 | 50.098 |
| 2 | 70.77190 | 6.65020 | | | 45.723 |
| 3 | 72.95750 | 18.75130 | 1.71300 | 53.9 | 45.230 |
| 4 | −3623.56460 | VARIABLE | | | 44.155 |
| 5 | 99.41190 | 2.80000 | 1.62041 | 60.3 | 34.111 |
| 6 | 48.47160 | 12.35230 | | | 29.676 |
| 7 | −248.16440 | 2.20000 | 1.49700 | 81.6 | 29.418 |
| 8 | 40.54330 | 11.62120 | | | 25.559 |
| 9 | −156.72080 | 2.20000 | 1.49700 | 81.6 | 25.527 |
| 10 | 121.32590 | 0.20000 | | | 25.546 |
| 11 | 60.41060 | 9.57380 | 1.53172 | 48.8 | 25.995 |
| 12 | −211.50600 | VARIABLE | | | 25.775 |
| 13 | −369.79680 | 2.00000 | 1.51680 | 64.2 | 16.956 |
| 14 | 66.72950 | 21.51370 | | | 16.863 |
| 15 | 140.00500 | 4.47440 | 1.73800 | 32.3 | 19.319 |
| 16 | −207.41910 | 31.79060 | | | 19.341 |
| 17 (DIAPHRAGM) | ∞ | 35.45230 | | | 17.653 |
| 18 | −40.60280 | 2.00000 | 1.51680 | 64.2 | 19.262 |
| 19 | −87.84240 | 0.20000 | | | 20.227 |
| 20 | 61053.92850 | 6.91030 | 1.45860 | 90.2 | 20.739 |
| 21 | −47.38380 | 15.98190 | | | 21.009 |
| 22 | 565.18380 | 6.20960 | 1.45860 | 90.2 | 23.518 |
| 23 | −75.02470 | 2.04150 | | | 23.664 |
| 24 | −54.73590 | 2.20000 | 1.62041 | 60.3 | 23.672 |
| 25 | −81.29720 | VARIABLE | | | 24.279 |
| 26 | 132.45390 | 6.38890 | 1.45860 | 90.2 | 25.636 |
| 27 | −162.62640 | 0.87130 | | | 25.599 |
| 28 | −137.17440 | 2.20000 | 1.56732 | 42.8 | 25.547 |
| 29 | 65.21460 | 4.13410 | | | 25.581 |
| 30 | 210.03830 | 6.67350 | 1.45860 | 90.2 | 25.713 |
| 31 | −107.32330 | 3.75380 | | | 25.980 |
| 32 | −55.69280 | 2.20000 | 1.57501 | 41.5 | 26.025 |
| 33 | −87.38950 | 0.20000 | | | 27.087 |
| 34 | 108.80930 | 11.73560 | 1.45860 | 90.2 | 28.715 |
| 35 | −76.22200 | VARIABLE | | | 28.843 |
| 36 | ∞ | 91.00000 | 1.51680 | 64.2 | 35.000 |
| 37 | ∞ | 1.00000 | | | 35.000 |

TABLE 8-1-continued

| SURFACE NUMBER | r | d | nd | vd | EFFECTIVE DIAMETER |
|---|---|---|---|---|---|
| 38 | ∞ | 1.00000 | 1.47401 | 65.4 | 35.000 |
| 39 | ∞ | 1.00000 | | | 35.000 |
| 40 | ∞ | 3.00000 | 1.50847 | 61.2 | 35.000 |
| 41 | ∞ | BF | | | 35.000 |
| IMAGE PLANE | ∞ | | | | |

TABLE 8-2

ZOOM RATIO 1.51231

| | WIDE-ANGLE | INTERMEDIATE | TELEPHOTO |
|---|---|---|---|
| FOCAL LENGTH | 34.1871 | 41.9922 | 51.7016 |
| F NUMBER | 2.43804 | 2.48215 | 2.54999 |
| ANGLE OF VIEW | 27.0946 | 22.3213 | 18.3988 |
| IMAGE HEIGHT | 17.3500 | 17.3500 | 17.3500 |
| LENS TOTAL LENGTH | 400.0069 | 400.0112 | 400.0169 |
| BF | 1.00697 | 1.01140 | 1.01699 |
| d4 | 2.0000 | 15.5123 | 25.9815 |
| d12 | 42.7196 | 22.4145 | 2.0000 |
| d25 | 2.0000 | 7.5016 | 16.0149 |
| d35 | 16.5000 | 17.7911 | 19.2232 |
| ENTRANCE PUPIL POSITION | 86.2320 | 106.7704 | 121.5252 |
| EXIT PUPIL POSITION | −3123.3315 | −20579.1398 | 2644.3686 |
| FRONT PRINCIPAL POINT POSITION | 120.0451 | 148.6944 | 174.2378 |
| REAR PRINCIPAL POINT POSITION | 365.6277 | 357.7302 | 347.8787 |

TABLE 8-3

| LENS | LENS FIRST SURFACE | FOCAL LENGTH |
|---|---|---|
| 1 | 1 | −180.6701 |
| 2 | 3 | 100.5174 |
| 3 | 5 | −155.7483 |
| 4 | 7 | −69.9437 |
| 5 | 9 | −137.2363 |
| 6 | 11 | 89.4665 |
| 7 | 13 | −109.2124 |
| 8 | 15 | 113.8826 |
| 9 | 18 | −148.2324 |
| 10 | 20 | 103.2469 |
| 11 | 22 | 144.8664 |
| 12 | 24 | −278.8791 |
| 13 | 26 | 160.2695 |
| 14 | 28 | −77.6061 |
| 15 | 30 | 155.9150 |
| 16 | 32 | −273.9798 |
| 17 | 34 | 99.7282 |

TABLE 8-4

| GROUP | LENS FIRST SURFACE | FOCAL LENGTH | LENS CONFIGURATION LENGTH | FRONT PRINCIPAL POINT POSITION | REAR PRINCIPAL POINT POSITION |
|---|---|---|---|---|---|
| 1 | 1 | 213.60964 | 28.90150 | 14.32267 | 23.89963 |
| 2 | 5 | −63.46879 | 40.94730 | 5.49345 | 9.13155 |
| 3 | 13 | 115.89625 | 130.77430 | 98.38591 | 133.13053 |
| 4 | 26 | 141.40701 | 38.15720 | 32.06527 | 42.14905 |

TABLE 8-5

| GROUP | LENS FIRST SURFACE | WIDE-ANGLE | INTERMEDIATE | TELEPHOTO |
|---|---|---|---|---|
| 1 | 1 | −0.03682 | −0.03682 | −0.03682 |
| 2 | 5 | −0.43618 | −0.48083 | −0.52225 |
| 3 | 13 | −0.78215 | −0.88669 | −1.02635 |
| 4 | 26 | 0.44715 | 0.43799 | 0.42782 |

9. Ninth Numerical Example

The ninth numerical example corresponding to projection lens system PL9 of the ninth example will be shown below. In the ninth numerical example, Table 9-1 shows surface data, Table 9-2 shows various data, Table 9-3 shows single lens data, Table 9-4 shows zoom lens group data, and Table 9-5 shows zoom lens group magnification.

TABLE 9-1

| SURFACE NUMBER | r | d | nd | vd | EFFECTIVE DIAMETER |
|---|---|---|---|---|---|
| OBJECT PLANE | ∞ | | | | |
| 1 | 158.64130 | 10.01750 | 1.49700 | 81.6 | 40.001 |
| 2 | −273.84120 | 0.20000 | | | 39.683 |
| 3 | 311.49630 | 3.53260 | 1.72916 | 54.7 | 37.942 |
| 4 | 892.25600 | 3.34640 | | | 37.471 |
| 5 | −338.49110 | 3.00000 | 1.59270 | 35.4 | 37.275 |
| 6 | 89.92890 | 1.04080 | | | 34.993 |
| 7 | 93.79050 | 7.31300 | 1.80420 | 46.5 | 34.954 |
| 8 | 413.43320 | VARIABLE | | | 34.549 |
| 9 | 132.04420 | 4.81280 | 1.73800 | 32.3 | 27.125 |
| 10 | 116030.51080 | 8.14920 | | | 26.498 |
| 11 | 261.40000 | 2.00000 | 1.51680 | 64.2 | 21.007 |
| 12 | 74.58540 | 4.43870 | | | 19.860 |
| 13 | −155.90000 | 2.00000 | 1.51680 | 64.2 | 19.705 |
| 14 | 52.13220 | 6.50200 | | | 18.676 |
| 15 | −69.52870 | 2.00000 | 1.51680 | 64.2 | 18.657 |
| 16 | 280.91880 | 9.84000 | | | 19.019 |
| 17 | 140.95680 | 3.55890 | 1.67300 | 38.3 | 21.626 |
| 18 | 2177.04940 | VARIABLE | | | 21.782 |
| (DIAPHRAGM) | ∞ | 17.71620 | | | 22.034 |
| 20 | 182.54690 | 6.93610 | 1.49700 | 81.6 | 24.712 |
| 21 | −95.24080 | 1.72960 | | | 24.801 |
| 22 | −70.16760 | 2.20000 | 1.67300 | 38.3 | 24.767 |
| 23 | −145.58000 | 3.79610 | | | 25.266 |
| 24 | 82.38580 | 7.51860 | 1.59270 | 35.4 | 25.950 |
| 25 | −367.68210 | 6.92370 | | | 25.745 |
| 26 | −185.00590 | 2.20000 | 1.67300 | 38.3 | 24.665 |
| 27 | 87.04700 | 0.89570 | | | 24.890 |
| 28 | 98.30630 | 9.69560 | 1.45860 | 90.2 | 25.024 |
| 29 | −85.49430 | 31.44170 | | | 25.260 |
| 30 | 57.90550 | 2.20000 | 1.73800 | 32.3 | 24.843 |
| 31 | 52.40400 | 12.77430 | | | 24.320 |
| 32 | −50.03880 | 2.20000 | 1.58144 | 40.7 | 24.332 |
| 33 | 156.32030 | 3.92230 | | | 26.627 |
| 34 | −562.03130 | 5.11250 | 1.73800 | 32.3 | 27.111 |
| 35 | −109.13710 | 0.20000 | | | 27.736 |
| 36 | 165.56090 | 9.77870 | 1.45860 | 90.2 | 29.702 |
| 37 | −92.33720 | 0.20000 | | | 29.994 |
| 38 | 90.64700 | 8.68520 | 1.45860 | 90.2 | 30.506 |
| 39 | −479.20080 | VARIABLE | | | 30.315 |
| 40 | ∞ | 91.00000 | 1.51680 | 64.2 | 35.000 |
| 41 | ∞ | 1.00000 | | | 35.000 |
| 42 | ∞ | 1.00000 | 1.47401 | 65.4 | 35.000 |
| 43 | ∞ | 1.00000 | | | 35.000 |
| 44 | ∞ | 3.00000 | 1.50847 | 61.2 | 35.000 |
| 45 | ∞ | BF | | | 35.000 |
| IMAGE PLANE | ∞ | | | | |

TABLE 9-2

ZOOM RATIO 1.89041

| | WIDE-ANGLE | INTERMEDIATE | TELEPHOTO |
|---|---|---|---|
| FOCAL LENGTH | 87.4243 | 120.1521 | 165.2674 |
| F NUMBER | 2.48662 | 2.49963 | 2.50137 |
| ANGLE OF VIEW | 11.3591 | 8.2581 | 5.9941 |
| IMAGE HEIGHT | 17.3500 | 17.3500 | 17.3500 |
| LENS TOTAL LENGTH | 373.7590 | 373.7504 | 373.7506 |
| BF | 1.02465 | 1.01614 | 1.01619 |
| d8 | 2.0000 | 21.7998 | 42.6112 |
| d18 | 49.3474 | 23.4544 | 2.0000 |
| d39 | 16.5087 | 22.6019 | 23.2450 |
| ENTRANCE PUPIL POSITION | 125.4137 | 159.0697 | 195.3564 |
| EXIT PUPIL POSITION | −1351.3105 | −1357.4037 | −1358.0468 |
| FRONT PRINCIPAL POINT POSITION | 207.1836 | 268.5850 | 340.4934 |
| REAR PRINCIPAL POINT POSITION | 285.7040 | 252.4100 | 206.2398 |

TABLE 9-3

| LENS | LENS FIRST SURFACE | FOCAL LENGTH |
|---|---|---|
| 1 | 1 | 203.6785 |
| 2 | 3 | 654.6519 |
| 3 | 5 | −119.5665 |
| 4 | 7 | 149.3241 |
| 5 | 9 | 179.1224 |
| 6 | 11 | −202.6817 |
| 7 | 13 | −75.3495 |
| 8 | 15 | −107.6359 |
| 9 | 17 | 223.7878 |
| 10 | 20 | 126.9830 |
| 11 | 22 | −203.6607 |
| 12 | 24 | 114.2662 |
| 13 | 26 | −87.6719 |
| 14 | 28 | 101.3920 |
| 15 | 30 | −900.2563 |
| 16 | 32 | −64.9375 |
| 17 | 34 | 182.6430 |
| 18 | 36 | 130.8168 |
| 19 | 38 | 167.0194 |

TABLE 9-4

| GROUP | LENS FIRST SURFACE | FOCAL LENGTH | LENS CONFIGURATION LENGTH | FRONT PRINCIPAL POINT POSITION | REAR PRINCIPAL POINT POSITION |
|---|---|---|---|---|---|
| 1 | 1 | 205.74848 | 28.45030 | 0.04786 | 9.41976 |
| 2 | 9 | −66.17959 | 43.30160 | 23.69918 | 26.14645 |
| 3 | 19 | 103.81918 | 136.12630 | 95.45400 | 50.65442 |

TABLE 9-5

| GROUP | LENS GROUP FIRST SURFACE | WIDE-ANGLE | INTERMEDIATE | TELEPHOTO |
|---|---|---|---|---|
| 1 | 1 | −0.01744 | −0.01744 | −0.01744 |
| 2 | 9 | −0.67236 | −0.84167 | −1.14464 |
| 3 | 19 | −0.61499 | −0.67360 | −0.67980 |

The exemplary embodiments have been described above as examples of the technique in the present disclosure. For that purpose, the accompanying drawings and the detailed description have been provided.

The constituent elements illustrated in the accompanying drawings and described in the detailed description may include constituent elements essential for solving the problems, as well as constituent elements that are not essential for solving the problems but required to exemplify the above technique. Therefore, it should not be immediately assumed that the unessential constituent elements are essential constituent elements due to the fact that the unessential constituent elements are described in the accompanying drawings and the detailed description.

Note that the exemplary embodiments described above are provided to exemplify the technique in the present disclosure. Therefore, it is possible to make various changes, replacements, additions, omissions, and the like within the scope of the claims and equivalents thereof.

SUMMARY OF ASPECTS

Hereinafter, various aspects according to the present disclosure will be exemplified.

A first aspect according to the present disclosure is a projection lens system that projects an image of a reduction side into a magnification side. The projection lens system includes a diaphragm, a plurality of positive lenses, and a plurality of negative lenses. In the positive lenses of the projection lens system, a first positive lens that is closer to the magnification side than the diaphragm is and is closest to the diaphragm, a second positive lens that is second closest to the diaphragm after the first positive lens on the magnification side, and a third positive lens that is closer to the reduction side than the diaphragm is and is closest to the diaphragm satisfy following conditions (1) to (3). In the plurality of negative lenses, a first negative lens that is closer to the magnification side than the diaphragm is and is closest to the diaphragm and a second negative lens that is closer to the reduction side than the diaphragm is and is closest to the diaphragm satisfy following conditions (4) to (6). At least one positive lens of the first to third positive lenses satisfies following conditions (7) and (8), $$Tp1 > 99\% \qquad (1)$$

$$Tp2 > 99\% \qquad (2)$$

$$Tp3 > 99\% \qquad (3)$$

$$Tn1 > 99\% \qquad (4)$$

$$Tn2 > 99\% \qquad (5)$$

$$\alpha n1 < 100 \times 10^{-7} [/^\circ C.] \qquad (6)$$

$$dn/dt < -4.5 \times 10^{-6} \qquad (7)$$

$$|fp/fw| > 1.3 \qquad (8)$$

where

Tp1 indicates an internal transmittance of light having a wavelength of 460 nm when a lens material of the first positive lens has a thickness of 10 mm, Tp2 indicates an internal transmittance of light having a wavelength of 460 nm when a lens material of the second positive lens has the thickness mentioned above, Tp3 indicates an internal transmittance of light having a wavelength of 460 nm when a lens material of the third positive lens has the thickness mentioned above, Tn1 indicates an internal transmittance of light having a wavelength of 460 nm when a lens material of the first negative lens has the thickness mentioned above, Tn2 indicates an internal transmittance of light having a wavelength of 460 nm when a lens material of the second negative lens has the thickness mentioned above, $\alpha n1$ indicates a linear expansion coefficient of the lens material of the first negative lens at room temperature, dn/dt indicates a temperature coefficient of a relative refractive index of a lens material of the at least one positive lens at room temperature, fp indicates a focal length of the at least one positive lens, and fw indicates a focal length at the wide-angle end of a whole system.

According to the projection lens system described above, the first to third positive lenses and the first and second negative lenses that are assumed to be easily affected by heat when the brightness of the image projection device is increased and are assumed to easily affect the performance of the projection lens system satisfy conditions (1) and (8) for reducing the influence of heat. As a result, it is possible to reduce a variation in a projection image due to high brightness of the image projection device and improve the image quality.

According to a second aspect, the projection lens system of the first aspect constitutes a substantially telecentric system on the reduction side. Consequently, it is possible to reduce a color shift in the back lens on the reduction side and the like.

According to a third aspect, in the projection lens system of the first aspect, a number of the positive lenses and the negative lenses is at least 15. According to the projection lens system described above, it is possible to successfully correct various aberrations in the projection lens system.

According to a fourth aspect, in the projection lens system of the first aspect, at least one positive lens of the positive lenses satisfies following condition (9), $$\nu p < 40 \qquad (9)$$

where vp indicates an Abbe number of a lens material of the at least one positive lens.

According to the projection lens system described above, by setting the Abbe number of at least one of all positive lenses to be less than the upper limit value of condition (9), it is possible to successfully correct chromatic aberrations while reducing the influence of heat when the brightness is increased. Consequently, it is possible to improve the image quality of the projection image when the brightness is increased.

According to a fifth aspect, in the projection lens system of the first aspect, at least one negative lens of the negative lenses satisfies following condition (10), $$\nu n < 40 \qquad (10)$$

where vn indicates an Abbe number of a lens material of the at least one negative lens.

As a result, it is possible to reduce the influence of heat on the negative lens and improve the image quality of the projection image.

According to a six aspect, at least four positive lenses of the positive lenses satisfy following condition (11), $$dn/dt < -4.5 \times 10^{-6} \qquad (11)$$

where dn/dt indicates a temperature coefficient of a relative refractive index of a lens material of the four positive lenses at room temperature.

As a result, it is possible to reduce the influence of heat by using four or more positive lenses in which the influence of a change in shape due to a local temperature change and the influence of a change in refractive index are offset, and to improve the image quality of the projection image.

According to a seventh aspect, the projection lens system of the first aspect constitutes a zoom lens system including a plurality of lens groups. In the lens groups, a lens group closest to the magnification side has a negative power. The projection lens system satisfies following condition (12), $$2 < fr/fw < 4.5 \qquad (12)$$

where fr indicates a focal length at a wide-angle end closer to the reduction side than the diaphragm is, and fw indicates a focal length at the wide-angle end of a whole system.

The projection lens system described above can improve the image quality of the projection image as a negative-lead zoom lens system.

According to an eighth aspect, the projection lens system of the first aspect includes an intermediate imaging position where an image is formed inside the projection lens system. In the projection lens system, a magnification optical system constituted by a plurality of lenses disposed closer to the magnification side than the intermediate imaging position is has a positive power. A relay optical system constituted by a plurality of lenses disposed closer to the reduction side than the intermediate imaging position is has a positive power. The projection lens system satisfies following condition (13), $$8 < |fr/f| < 12 \qquad (13)$$

where fr indicates a focal length closer to the reduction side than the diaphragm is, and f indicates a focal length of a whole system.

According to the projection lens system described above, it is possible to improve the image quality of the projection image in a lens system using the intermediate imaging position.

According to a ninth aspect, the projection lens system of the first aspect constitutes a zoom lens system including a plurality of lens groups. In the lens groups, a lens group closest to the magnification side has a positive power. The projection lens system satisfies following condition (14), $$0.5 < fr/ft < 2.0 \qquad (14)$$

where fr indicates a focal length closer to the reduction side than the diaphragm is, and ft indicates a focal length at a telephoto end of a whole system.

The projection lens system described above can improve the image quality of the projection image as a positive-lead zoom lens system.

A tenth aspect is an image projection device including the projection lens system of the first aspect and an image forming element that forms an image. The image projection device described above can improve the image quality of an image when the brightness is increased.

INDUSTRIAL APPLICABILITY

The present disclosure is applicable to, for example, an image projection device having a light output of 20,000 lumens or more, and a projection lens system mounted on the image projection device.

REFERENCE MARKS IN THE DRAWINGS 1 image projection device
11 image forming element
PL, PL1 to PL9 projection lens system
L1 to L22 lens element
A diaphragm

The invention claimed is:

1. A projection lens system that projects an image of a reduction side into a magnification side, the projection lens system comprising:
a magnification optical system; and
a relay optical system, wherein:
the magnification optical system and the relay optical system include a plurality of lenses,
the magnification optical system is disposed closer to the magnification side than the relay optical system is,
an intermediate imaging position is located between the magnification optical system and the relay optical system,
a lens closest to the reduction side in the magnification optical system has a positive meniscus shape and a convex surface, the convex surface facing the magnification side,
a lens closest to the magnification side in the relay optical system has a positive meniscus shape and a convex surface, the convex surface facing the reduction side,
a second lens from the magnification side in the relay optical system has a biconcave shape,
the relay optical system includes:
a diaphragm;
a plurality of positive lenses; and
a plurality of negative lenses,
the diaphragm, the plurality of positive lenses, and the plurality of negative lenses are between the second lens from the magnification side and the reductions side,
the plurality of positive lenses include:
a first positive lens that is closer to the magnification side than the diaphragm is, and is closest to the diaphragm in the plurality of positive lenses;
a second positive lens that is second closest to the diaphragm in the plurality of positive lenses after the first positive lens on the magnification side; and
a third positive lens that is closer to the reduction side than the diaphragm is, and is closest to the diaphragm in the plurality of positive lenses,
lens materials of the first to third positive lenses satisfy following conditions (1) to (3), respectively,
the plurality of negative lenses include:
a first negative lens that is closer to the magnification side than the diaphragm is, and is closest to the diaphragm in the plurality of negative lenses; and
a second negative lens that is closer to the reduction side than the diaphragm is, and is closest to the diaphragm in the plurality of negative lenses,
lens materials of the first and second negative lenses satisfying following conditions (4) to (6), respectively, and
at least one positive lens of the first to third positive lenses satisfies following conditions (7) and (8), $$Tp1 > 99\% \tag{1}$$

$$Tp2 > 99\% \tag{2}$$

$$Tp3 > 99\% \tag{3}$$

$$Tn1 > 99\% \tag{4}$$

$$Tn2 > 99\% \tag{5}$$

$$\alpha n1 < 100 \times 10^{-7} [/^\circ C.] \tag{6}$$

$$dn/dt < -4.5 \times 10^{-6} \tag{7}$$

$$|fp/fw| > 1.3 \tag{8}$$

where
Tp1 indicates an internal transmittance of light having a wavelength of 460 nm measured under a condition that a lens material of the first positive lens has a thickness of 10 mm,
Tp2 indicates an internal transmittance of light having a wavelength of 460 nm measured under a condition that a lens material of the second positive lens has a thickness of 10 mm,
Tp3 indicates an internal transmittance of light having a wavelength of 460 nm measured under a condition that a lens material of the third positive lens has a thickness of 10 mm,
Tn1 indicates an internal transmittance of light having a wavelength of 460 nm measured under a condition that a lens material of the first negative lens has a thickness of 10 mm,
Tn2 indicates an internal transmittance of light having a wavelength of 460 nm measured under a condition that a lens material of the second negative lens has a thickness of 10 mm,
$\alpha n1$ indicates a linear expansion coefficient of the lens material of the first negative lens at room temperature,
dn/dt indicates a temperature coefficient of a relative refractive index of a lens material of the at least one positive lens at room temperature,
fp indicates a focal length of the at least one positive lens, and
fw indicates a focal length at a wide-angle end of the projection lens system as a whole.

2. The projection lens system according to claim 1, wherein the projection lens system constitutes a substantially telecentric system on the reduction side.

3. The projection lens system according to claim 1, wherein a number of the plurality of positive lenses and the plurality of negative lenses is at least 15.

4. The projection lens system according to claim 1, wherein
the plurality of positive lenses comprise a positive lens that satisfies a following condition (9), $$vp < 40 \tag{9}$$

where vp indicates an Abbe number of a lens material of the positive lens.

5. The projection lens system according to claim 1, wherein
the plurality of negative lenses comprise a negative lens that satisfies a following condition (10), $$vn<40 \tag{10}$$

where vn indicates an Abbe number of a lens material of the negative lens.

6. The projection lens system according to claim 1, wherein
the projection lens system comprises four positive lenses, each of which satisfies a following condition (11), $$dn/dt<-4.5\times10^{-6} \tag{11}$$

7. The projection lens system according to claim 1, wherein
a second lens from the reduction side in the magnification optical system has a biconvex shape,
a third lens from the reduction side in the magnification optical system has a biconcave shape, and
a fourth lens from the reduction side in the magnification optical system has a biconvex shape.

8. The projection lens system according to claim 1, wherein
the magnification optical system has a positive power,
the relay optical system has a positive power, and
the projection lens system satisfies a following condition (13), $$8<|fr/fw|<12 \tag{13}$$

where fr indicates a focal length of lenses closer to the reduction side than the diaphragm is.

9. The projection lens system according to claim 7, wherein
a third lens from the magnification side in the relay optical system has a positive meniscus shape and a convex surface, the convex surface facing the reduction side, and
a fourth lens from the magnification side in the relay optical system is the second positive lens, the fourth lens having a negative meniscus shape and a convex surface, the convex surface facing the magnification side.

10. An image projection device comprising:
the projection lens system according to claim 1; and
an image forming element that forms the image.

11. A projection lens system that projects an image of a reduction side into a magnification side, the projection lens system comprising:
a magnification optical system; and
a relay optical system, wherein:
the magnification optical system and the relay optical system include a plurality of lenses,
the magnification optical system is disposed closer to the magnification side than the relay optical system is,
an intermediate imaging position is located between the magnification optical system and the relay optical system,
a lens closest to the reduction side in the magnification optical system has a positive meniscus shape and a convex surface, the convex surface facing the magnification side,
the relay optical system includes:
a diaphragm;
a plurality of positive lenses; and
a plurality of negative lenses,
the diaphragm, the plurality of positive lenses, and the plurality of negative lenses are between the second lens from the magnification side and the reductions side,
the plurality of positive lenses include:
a first positive lens that is closer to the magnification side than the diaphragm is, and is closest to the diaphragm in the plurality of positive lenses;
a second positive lens that is second closest to the diaphragm in the plurality of positive lenses after the first positive lens on the magnification side; and
a third positive lens that is closer to the reduction side than the diaphragm is, and is closest to the diaphragm in the plurality of positive lenses,
lens materials of the first to third positive lenses satisfy following conditions (1) to (3), respectively,
the plurality of negative lenses include:
a first negative lens that is closer to the magnification side than the diaphragm is, and is closest to the diaphragm in the plurality of negative lenses; and
a second negative lens that is closer to the reduction side than the diaphragm is, and is closest to the diaphragm in the plurality of negative lenses,
lens materials of the first and second negative lenses satisfying following conditions (4) to (6), respectively, and
at least one positive lens of the first to third positive lenses satisfies following conditions (7) and (8), $$Tp1>99\% \tag{1}$$

$$Tp2>99\% \tag{2}$$

$$Tp3>99\% \tag{3}$$

$$Tn1>99\% \tag{4}$$

$$Tn2>99\% \tag{5}$$

$$\alpha n1<100\times10^{-7}[/^\circ C.] \tag{6}$$

$$dn/dt<-4.5\times10^{-6} \tag{7}$$

$$|fp/fw|>1.3 \tag{8}$$

where
Tp1 indicates an internal transmittance of light having a wavelength of 460 nm measured under a condition that a lens material of the first positive lens has a thickness of 10 mm,
Tp2 indicates an internal transmittance of light having a wavelength of 460 nm measured under a condition that a lens material of the second positive lens has a thickness of 10 mm,
Tp3 indicates an internal transmittance of light having a wavelength of 460 nm measured under a condition that a lens material of the third positive lens has a thickness of 10 mm,
Tn1 indicates an internal transmittance of light having a wavelength of 460 nm measured under a condition that a lens material of the first negative lens has a thickness of 10 mm,
Tn2 indicates an internal transmittance of light having a wavelength of 460 nm measured under a condition that a lens material of the second negative lens has a thickness of 10 mm,
αn1 indicates a linear expansion coefficient of the lens material of the first negative lens at room temperature, dn/dt indicates a temperature coefficient of a relative refractive index of a lens material of the at least one positive lens at room temperature,
fp indicates a focal length of the at least one positive lens, and
fw indicates a focal length at a wide-angle end of the projection lens system as a whole.

\* \* \* \* \*